(12) United States Patent
Hibi et al.

(10) Patent No.: US 8,876,386 B2
(45) Date of Patent: Nov. 4, 2014

(54) FLUID DYNAMIC BEARING DEVICE

(75) Inventors: Kenji Hibi, Kuwana (JP); Kenji Ito, Kuwana (JP); Yasuhiro Yamamoto, Kuwana (JP); Hiroshi Niwa, Kuwana (JP); Isao Komori, Kuwana (JP); Tetsuya Yamamoto, Kuwana (JP)

(73) Assignee: NTN Corporation, Osaka-shi (JP)

( * ) Notice: Subject to any disclaimer, the term of this patent is extended or adjusted under 35 U.S.C. 154(b) by 1154 days.

(21) Appl. No.: 12/281,431

(22) PCT Filed: Feb. 16, 2007

(86) PCT No.: PCT/JP2007/052834
§ 371 (c)(1),
(2), (4) Date: Sep. 2, 2008

(87) PCT Pub. No.: WO2007/099790
PCT Pub. Date: Sep. 7, 2007

(65) Prior Publication Data
US 2009/0046960 A1    Feb. 19, 2009

(30) Foreign Application Priority Data

| Mar. 2, 2006 | (JP) | 2006-056543 |
| Mar. 24, 2006 | (JP) | 2006-083379 |
| Mar. 28, 2006 | (JP) | 2006-088698 |
| May 29, 2006 | (JP) | 2006-148749 |
| Jul. 27, 2006 | (JP) | 2006-204716 |
| Aug. 18, 2006 | (JP) | 2006-223455 |

(51) Int. Cl.
| *F16C 32/06* | (2006.01) |
| *H02K 5/16* | (2006.01) |
| *F16C 33/14* | (2006.01) |
| *H02K 7/08* | (2006.01) |
| *F16C 17/02* | (2006.01) |

(52) U.S. Cl.
CPC ............... *H02K 7/085* (2013.01); *F16C 33/14* (2013.01); *F16C 17/02* (2013.01); *F16C 2370/12* (2013.01)
USPC ............................ 384/114; 384/107; 310/90

(58) Field of Classification Search
USPC ......... 384/100, 107, 114, 115, 120, 121, 123; 360/99.07, 99.08; 310/90
See application file for complete search history.

(56) References Cited

U.S. PATENT DOCUMENTS 4,254,961 A * 3/1981 Fersht et al. .................. 277/410
5,343,104 A    8/1994 Takahashi et al.
(Continued)

FOREIGN PATENT DOCUMENTS

JP    55-152198 A    11/1980
JP    56-111566 A     9/1981
(Continued)

OTHER PUBLICATIONS

International Search Report of PCT/JP2007/052834, date of mailing May 15, 2007.
(Continued)

*Primary Examiner* — Alan B Waits
(74) *Attorney, Agent, or Firm* — Westerman, Hattori, Daniels & Adrian, LLP

(57) ABSTRACT

A fluid dynamic bearing device which can exhibit high bearing performance is provided at low costs by forming a highly accurate bearing gap. At least a region in the outer circumferential surface of a shaft which faces the radial bearing gap is constituted of an electroformed part, and the region of the shaft excluding the electroformed part is constituted of a resin portion.

5 Claims, 34 Drawing Sheets

(56) References Cited

U.S. PATENT DOCUMENTS

| | | | |
|---|---|---|---|
| 5,520,466 A | 5/1996 | Everitt et al. | |
| 5,580,175 A * | 12/1996 | Polch et al. | 384/113 |
| 6,133,660 A | 10/2000 | Suzuki et al. | |
| 6,139,289 A | 10/2000 | Obata et al. | |
| 6,882,074 B2 | 4/2005 | Horng et al. | |
| 2003/0169952 A1 | 9/2003 | Yamashita et al. | |
| 2004/0037984 A1 | 2/2004 | Ueda et al. | |
| 2004/0258335 A1 * | 12/2004 | Shimizu et al. | 384/100 |
| 2005/0023907 A1 | 2/2005 | Neal | |
| 2005/0074191 A1 * | 4/2005 | Braun et al. | 384/100 |
| 2005/0265641 A1 | 12/2005 | Shishido et al. | |
| 2006/0029312 A1 * | 2/2006 | Kiriyama et al. | 384/107 |
| 2006/0029313 A1 * | 2/2006 | Hamada et al. | 384/107 |
| 2006/0045395 A1 | 3/2006 | Shimazu et al. | |

FOREIGN PATENT DOCUMENTS

| | | | |
|---|---|---|---|
| JP | 60-179517 A | | 9/1985 |
| JP | 10-89345 A | | 4/1998 |
| JP | 2000-81028 A | | 3/2000 |
| JP | 2000-235160 A | | 8/2000 |
| JP | 2000-330066 A | | 11/2000 |
| JP | 2002-005174 A | | 1/2002 |
| JP | 2002-39185 A | | 2/2002 |
| JP | 2002-61641 A | | 2/2002 |
| JP | 2003-56552 A | | 2/2003 |
| JP | 2003056569 A | * | 2/2003 |
| JP | 2003-239951 A | | 8/2003 |
| JP | 2005-321089 A | | 11/2005 |

OTHER PUBLICATIONS

U.S. Office Action dated Mar. 26, 2013 cited in copending U.S. Appl. No. 13/481,282 (14 pp).

U.S. Final Office Action dated Sep. 24, 2013 issued in related U.S. Appl. No. 13/481,282 (12 pages).

U.S. Office Action dated Mar. 4, 2014, issued in corresponding U.S. Appl. No. 13/481,282, (13 pages).

Notice of Allowance dated Jul. 16, 2014, issued in corresponding U.S. Appl. No. 13/481,282 (5 pages).

* cited by examiner

Fig. 29
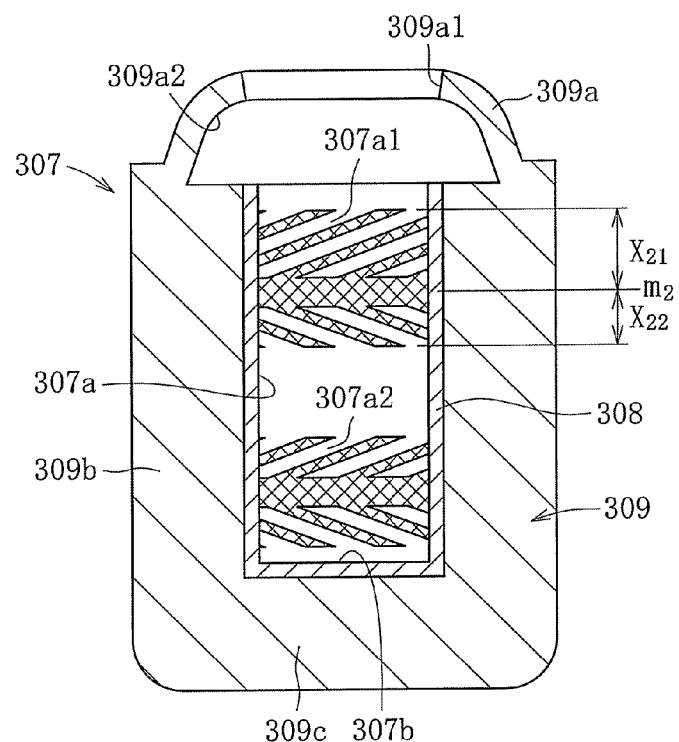
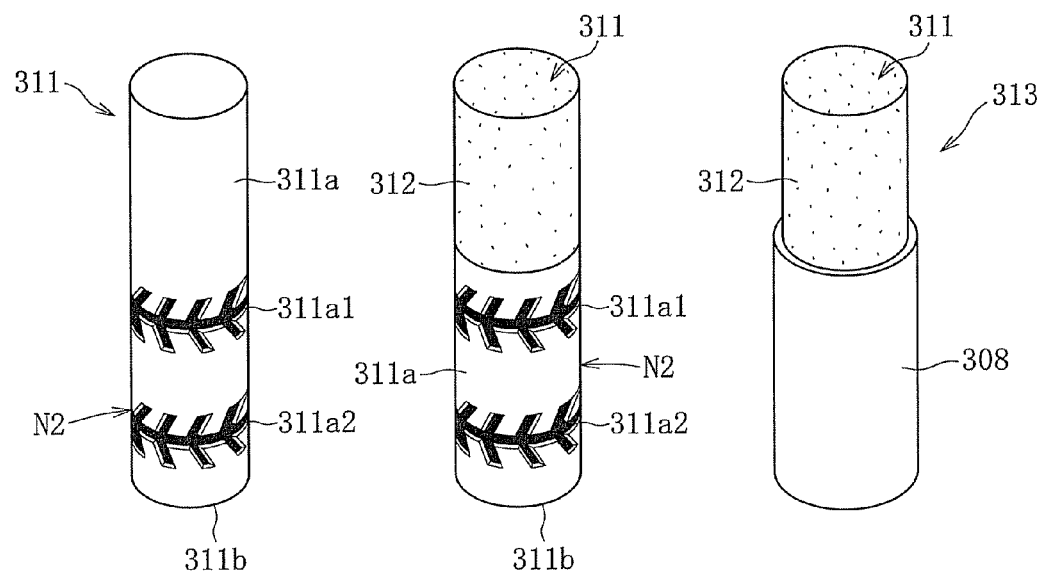
Fig. 30A    Fig. 30B    Fig. 30C

FLUID DYNAMIC BEARING DEVICE

TECHNICAL FIELD

The present invention relates to a fluid dynamic bearing device.

BACKGROUND ART

Fluid dynamic bearing devices are for supporting a rotation-side component of a pair of components which relatively rotate by a film of a fluid occurring in the bearing gap. This type of bearing devices have the features such as high-speed rotation, high rotational accuracy and reduced noise, and are suitably used as bearing devices for motors mounted on various electrical machinery and apparatuses typically including information appliances, more specifically, as bearing devices for spindle motors in disk drives used in magnetic disk apparatuses such as HDD, optical disk apparatuses such as CD-ROM, CD-R/RW and DVD-ROM/RAM, magneto-optic disk apparatuses such as MD and MO, or as bearing devices for polygon scanner motors of laser beam printers (LBP), collar wheel motors of projectors, and bearing devices for motors such as fan motors.

For example, in fluid dynamic bearing devices integrated into spindle motors for HDD, one or both of radial bearing portions which support the shaft member in the radial direction, and a thrust bearing portion which supports the shaft member in the thrust direction are constituted of hydrodynamic bearings in some cases. As is often the case with such bearing devices, hydrodynamic grooves constituting a hydrodynamic pressure producing part are formed on either of the inner circumferential surface of a bearing sleeve and the outer circumferential surface of the shaft member opposing this, and a radial bearing portion is formed in a radial bearing gap between both surfaces (for example, refer to Japanese Unexamined Patent Publication No. 2003-239951 as Patent document 1). A hydrodynamic pressure producing part (thrust hydrodynamic pressure producing part) such as the hydrodynamic grooves provided on both end faces of a flange portion of the shaft member or end faces of components which oppose each other across the thrust bearing gap (for example, end faces of a bearing member, inner bottom faces of a housing, etc.) produces pressure in the thrust bearing gap by the hydrodynamic effect of a lubricating fluid, whereby the thrust bearing portion is formed (for example, refer to Japanese unexamined Patent Publication No. 2002-61641 as Patent document 2).

For these structural components of fluid dynamic bearing devices typically including the shaft member, high processing accuracy and assembly precision are required to ensure high rotational performance as information appliances become more sophisticated. Meanwhile, demand for reduction in cost for fluid dynamic bearing devices is ever increasing.

As a measure for reducing cost in manufacturing fluid dynamic bearing devices, forming the shaft member of a resin is suggested (for example, refer to Japanese Unexamined Patent Publication No. 2000-330066 as Patent document 3).

However, when the shaft member is formed of a resin, the shaft member expands radially outwardly as temperature rises, and the radial bearing gap may be consequently reduced. One may consider forming the bearing sleeve of the same kind of resin to maintain the bearing gap, but it is difficult to form parts made of a resin at high accuracy since the molding dimensions (dimensions of molds) of such parts need to be set considering shrinkage during molding. When the components which form the bearing gap are both formed of a resin, it is even more difficult to obtain the bearing gap at high accuracy because of the influence of molding dimensional variation of both components. Of course, the problem of this type can occur when components on the bearing side such as the bearing sleeve are formed of a resin in order to achieve cost reduction.

Moreover, cost reduction/sealing property tradeoffs entail the following problem: that is, since the various kinds of motors mentioned above extremely dislikes contamination by the lubricant, a sealing gap for preventing leakage of the lubricant is usually provided at the opening of the bearing member. Furthermore, in a region which is radially adjacent to the sealing gap, a lubricant reservoir for providing the bearing gap (radial bearing gap) with the lubricant is provided in some cases. By providing this lubricant reservoir, reduction of bearing life due to shortage of the lubricant is prevented. The above-mentioned sealing gap and lubricant reservoir are formed, for example, between a separate component fixed on the bearing member and the shaft member (for example, refer to Japanese Unexamined Patent Publication No. 2000-235160 as Patent document 4).

In the mean time, with recent trend of lower prices of information appliances and the like, demand for reduction in cost for fluid dynamic bearing devices is ever increasing. However, as in the above Patent document 4, when the sealing gap and the oil reservoir are formed between a component provided separately from the bearing member and the shaft member, the number of parts and assembling man-hours are increased, which inevitably increases the cost.

Moreover, accuracy/cost tradeoffs in the hydrodynamic pressure producing part entail the following problem: That is, as a fluid dynamic bearing device of this type, for example, Japanese Unexamined Patent Publication No. 2005-321089 (Patent document 5) discloses a fluid dynamic bearing device (hydrodynamic bearing device) which supports the shaft member in the radial direction in a non-contact manner by the hydrodynamic effect of the fluid occurring in the radial bearing gap between the inner circumferential surface of the bearing and the outer circumferential surface of the shaft member. Two (upper and lower) regions which serves as a radial bearing face are provided separately in the axial direction on the inner circumferential surface of the bearing, and the hydrodynamic grooves arranged, for example, in a herringbone pattern, are formed in the two regions.

Japanese Unexamined Patent Publication No. 2000-81028 (Patent document 6) discloses a hydrodynamic bearing device in which the bearing is formed of a resin in an attempt to improve its sliding property with the shaft member and moldability of the bearing. In this bearing, the hydrodynamic grooves are formed simultaneously with molding injection of the bearing, and therefore the hydrodynamic grooves can be easily formed.

Forming hydrodynamic grooves simultaneously with injection molding of the bearing can be achieved, for example, by forming a molding portion corresponding to the shape of hydrodynamic grooves on a forming mold, and transferring the shape of the molding portion onto the inner circumferential surface of the bearing in molding of the bearing. In this molding method, however, the resin gets into the recesses on the molding portion of the mold and cures. Therefore, when the mold is released from the inner periphery of the bearing, the molding portion of the mold and the hydrodynamic grooves of the bearing may interfere with each other, thereby damaging the hydrodynamic grooves.

Moreover, the dimensional stability/cost reduction tradeoffs of the fluid dynamic bearing device having a resin portion entail the following problem: That is, for example, Japanese Unexamined Patent Publication No. 2003-56552 (Patent document 7) discloses a bearing part used for a fluid dynamic bearing device of this type which is produced by insert-molding a cylindrical metal part (electroformed part) having an inner hole using a resin.

A bearing part made of resin has the advantage of being lighter and more economical than that made of metal, while it has the disadvantage of large dimensional change due to thermal shrinkage and other causes. In the bearing part of Patent document 7 mentioned above, the cylindrical metal part (electroformed part) is retained on its inner periphery in an attempt to suppress a change in the radial dimension of the bearing part made of resin and improve circularity and the dimensional accuracy of the inside diameter. However, a change in the axial direction of the bearing part is unavoidable, and thus sink marks and other problems due to a difference in a dimensional change occur, which may adversely affect the axial dimension and accuracy of the bearing face.

Patent document 1: Japanese Unexamined Patent Publication No. 2003-239951
Patent document 2: Japanese Unexamined Patent Publication No. 2002-61641
Patent document 3: Japanese Unexamined Patent Publication No. 2000-330066
Patent document 4: Japanese Unexamined Patent Publication No. 2000-235160
Patent document 5: Japanese Unexamined Patent Publication No. 2005-321089
Patent document 6: Japanese Unexamined Patent Publication No. 2000-81028
Patent document 7: Japanese Unexamined Patent Publication No. 2003-56552

OBJECTS TO BE ACHIEVED BY THE INVENTION

In view of the situation described above, a first technical object of the present invention is to provide a fluid dynamic bearing device which can produce high bearing performance by forming a bearing gap at high accuracy and low costs.

Moreover, in view of the situation described above, a second technical object of the present invention is to provide a fluid dynamic bearing device which has good sealing property, lubricity, and long life at low costs.

Moreover, in view of the situation described above, a third technical object of the present invention is to achieve formation of a hydrodynamic pressure producing part of the hydrodynamic bearing device at high accuracy and at low costs.

Moreover, In view of the situation described above, a fourth technical object of the present invention is to improve the dimensional stability of the fluid dynamic bearing device having a resin portion, in particular the dimensional stability in the axial direction.

MEANS FOR ACHIEVING THE OBJECTS

In order to solve the first technical object, the present invention provides a fluid dynamic bearing device comprising a fixed member, a rotational member, and a bearing gap formed between the fixed member and the rotational member, the rotational member being supported by a film of a fluid formed in the bearing gap, in which a component constituting at least one of the fixed member and the rotational member is an injection-molded article having an integral metal plated portion, and the metal plated portion is disposed in a position facing the bearing gap.

The metal plated portion in the present invention includes those formed by a method based on the electroless plating process, as well as those formed by a method based on electrolytic plating process. The electroless plating process referred to herein means the method in which deposition of metal is caused by the action of a reducing agent added to an aqueous solution of a metallic salt without using electricity. Of course, the electroformed part described later in the present specification also includes those formed by a similar method.

According to this constitution, a region of the injection-molded article constituting at least one of the fixed member and the rotational member which faces the bearing gap is covered by the metal plated portion. Therefore, even if, for example, the injection-molded article is formed of a material having a high linear expansion coefficient such as a resin, expansion of the material can be suppressed by the metal plated portion to minimize a change in the bearing gap. Moreover, portions other than the metal plated portion can be formed of an injection material so that the injection-molded article is produced at low costs.

More specifically, there can be provided a hydrodynamic bearing device in which the resin molded article constitutes either the fixed member or the rotational member; the outer circumferential surface is a shaft facing the bearing gap; at least a region of the outer circumferential surface which faces the bearing gap is constituted of a metal plated portion; and a region other than the metal plated portion of the outer circumferential surface is constituted of a resin.

As mentioned above, when a region of the outer circumferential surface of the shaft constituting either the fixed member or the rotational member which faces the bearing gap is formed of the metal plated portion, a region of the outer circumferential surface of the shaft which faces the bearing gap is covered by the metal plated portion. Therefore, even when the resin-formed region of the shaft expands, for example, at a high temperature, radially outward expansion of the resin portion can be suppressed by the metal plated portion covering this to minimize a change in the bearing gap. Therefore, any such shaft that has the above constitution can ensure the bearing gap at high accuracy while achieving size reduction. Moreover, since any metal plated portion can be formed in a very small thickness, the merit of cost reduction produced by forming the portion using a resin can be enjoyed by increasing the ratio of the resin portion as high as possible.

A region of the outer circumferential surface of the shaft which faces the bearing gap can be also formed, for example, with the face on which deposition of the metal plated portion starts. A part having such a constitution is referred to as an electroformed part. It can be obtained by forming a metal by electrolytic deposition on the surface of a master and then peeling the metal from the master. Due to the characteristics of the various kinds of plating processes mentioned above, the surface configuration of the master is accurately transferred onto the surface of the electroformed part on the side of the master (the side where deposition starts) to a very fine level. Thus, by enhancing the surface precision of the master and using the surface of the electroformed part on the side where deposition starts as the surface which forms the bearing gap, a bearing face having high surface accuracy can be obtained at low costs without carrying out any special after-treatment. Moreover, its processing accuracy (surface accuracy) depends only on the surface accuracy of the corresponding master, and does not depend on its size. Therefore, any shaft comprising an electroformed part can ensure high processing accuracy (surface accuracy) while achieving size reduction.

As mentioned above, when the metal plated portion is formed on the outer periphery of the shaft, it is preferable to provide an engaging portion which engages the metal plated portion in the axial direction in the resin portion. During molding of the resin portion, shrinkage occurs towards the center of the shaft. Therefore, adherence force is reduced between itself and the metal plated portion formed on the outer periphery of the resin portion, which may lead to fallout of the resin part in some cases. However, providing the engaging portion in advance as mentioned above can prevent slip-off of the metal plated portion. Such an engaging portion can be formed by using a forming mold for forming a resin portion having a portion corresponding to the engaging portion provided thereon (for example, an annular shoulder is provided) before the metal plated portion is formed. Alternatively, in case where injection molding of the resin portion using the electroformed part (and the master) as an insert is performed, the engaging portion can be also formed by forming the resin portion in a manner of causing the resin to surround both axial ends of the electroformed part.

The shaft having the above constitution may constitute either the rotational member or the fixed member. In this case, at least a portion of the component on the side where the shaft is provided (rotational member or fixed member) can be formed integrally with the resin portion of the shaft.

The bearing gap can be also formed with the master used for forming the metal plated portion (electroformed part) between the master and the outer circumferential surface of the electroformed part. Alternatively, the fixed member can be also formed integrally with the housing in the injection-molding of the resin using the master as an insert. As these all use the master as it is as the bearing sleeve, the outer circumferential surface of the electroformed part and the inner circumferential surface of the master, which form the bearing gap, have the relationship of the transfer origin surface and the transfer destination surface. Accordingly, if the bearing gap is constituted of the electroformed part and the master, a highly accurate bearing gap having very little variation can be obtained, and a matching step of the shaft and the bearing sleeve which may be carried out in a normal procedure can be dispensed with.

Moreover, as information appliances drop in price and request of cost reduction in hydrodynamic bearing devices grows more and more, there rises necessity to consider forming bearing members of resins, in which the effect in reducing material cost seems to be higher than in shafts. In contrast, as information appliances become more sophisticated, demand for hydrodynamic bearing devices having higher rotational accuracy is growing. To deal with such request, it is important to control the bearing gap to have a desired value. However, resins inevitably undergo molding shrinkage, and to obtain a desired bearing gap width, especially in a region which serves as the bearing face, needs precise finishing processes. Therefore, forming bearing members of resins cannot produce sufficient cost merit. Moreover, as stated above, resins generally have greater linear expansion coefficients than metals, and are susceptible to changes in temperature when the bearing is in operation. Furthermore, resins have lower abrasion resistance than metals, and abrasion of the bearing face easily proceeds due to the sliding contact with the shaft member in particular at the time of starting, stopping and the like.

Thus, the present invention provides fluid dynamic bearing device comprising a bearing member constituting a fixed member and having an attachment surface to be attached to a base component, a shaft member which is a constituent of a rotational member, inserted at the inner periphery of the bearing member and comprises a shaft and a flange portion, and a radial hydrodynamic pressure producing part which produces pressure by the hydrodynamic effect of a fluid in a radial bearing gap between the inner circumferential surface of the bearing member and the outer circumferential surface of the shaft, the bearing member being an injection-molded article in which an electroformed part is disposed in at least a portion facing the radial bearing gap of the inner circumferential surface.

As mentioned above, the present invention aims to solve such a problem by disposing an electroformed part in at least the portion facing the radial bearing gap (radial bearing face) of the inner circumferential surface of the bearing member. The electroformed part is, as stated above, a metal layer formed by depositing a metal on the surface of the master, and can be formed by the techniques based on the electrolytic plating process or electroless plating (sometimes collectively referred to as electroforming process). According to these methods, because of the characteristics of the electroforming process, the shape of the surface of the master is transferred onto the inner surface of the electroformed part at high accuracy to a very fine degree. Therefore, highly accurate radial bearing face can be obtained at low costs without performing any special finishing process as long as the surface accuracy of the master is increased in advance. Moreover, since the radial bearing face serves as the metal face, temperature dependence can be lowered than in the case where the radial bearing face is constituted of a resin, and abrasion resistance can be increased to suppress changes in the width of the radial bearing gap. Since the bearing member is injection-molded by inserting an electroformed part having the above characteristics, the mounting processes of components are unnecessary, and a highly accurate bearing member can be obtained at low costs.

The bearing member can have such a constitution that has a small-diameter inner circumferential surface with the electroformed part disposed thereon, a large-diameter inner circumferential surface positioned on the outer diameter side of the flange portion, and a first end face provided between the small-diameter inner circumferential surface and the large-diameter inner circumferential surface. During the operation of the fluid dynamic bearing device, a fluid which fills the inner space has negative pressure in partial regions in some cases. Generation of such negative pressure may cause bubbles and leakage of lubricating oil, which may lower bearing performance. Such problems can be solved by providing on the bearing member a through hole in the axial direction which has an opening at the first end face to ensure a path through which the fluid flows in the inner space of the fluid dynamic bearing device.

In the constitution where the bearing member is provided with the first end face, a thrust hydrodynamic pressure producing part which produces pressure by the hydrodynamic effect of the fluid can be provided in the thrust bearing gap between the first end face of the bearing member and one end face of the flange portion, whereby the flange portion provided on the shaft can be supported in the thrust direction in a non-contact manner. In this case, if the electroformed part is disposed on the first end face of the bearing member, a portion facing the thrust bearing gap (thrust bearing face) can be also formed at low costs and high accuracy in a manner similar to that mentioned above, and the amount of change in the width of the thrust bearing gap can be reduced.

As mentioned above, according to the above constitution, cost reduction and higher rotational accuracy of the fluid dynamic bearing device can be simultaneously achieved.

Moreover, as an example of methods of controlling the accuracy of the width of the radial bearing gap at high accuracy, Patent document 7 mentioned above discloses a bearing device in which the inside diameter side of the bearing member is an electroformed part formed by the electroforming process, and a radial bearing gap is formed between this inner circumferential surface and the outer circumferential surface of the shaft member opposing this. Because of the characteristics of the electroforming process, the accuracy of the inner circumferential surface of the electroformed part is dependent on the accuracy of the surface of the master used in forming the electroformed part. Therefore, the accuracy of the width of the radial bearing gap is rendered readily controllable at high accuracy as long as the surface accuracy of the master is increased in advance.

Including the bearing device described in Patent document 7 mentioned above, the shaft member inserted at the inner periphery of the bearing member is often formed of a high-rigidity metallic material. In this case, the two faces which oppose each other across the radial bearing gap are both made of metal, and it is therefore generally thought that abrasion resistance against sliding contact and the like is improved. However, they are rather more easily worn depending on the difference of their hardness, and rotational accuracy may be thus lowered. In recent years, information appliances such as HDD are rapidly becoming greater in capacity and higher in rotation speed. Accordingly, demand for fluid dynamic bearing devices having even higher rotational accuracy is growing, and reducing the amount of abrasion is one of the significant objects. Accordingly, it is necessary to suppress an increase in the amount of abrasion caused by the difference in hardness between the outer circumferential surface of the shaft member and the inner circumferential surface of the bearing member to provide a fluid dynamic bearing device having excellent rotational accuracy.

To this end, the present invention provides a fluid dynamic bearing device which further comprises, in addition to the shaft in which a region which faces the bearing gap is constituted of a metal plated portion, a bearing member injection-molded with the electroformed part inserted thereinto, the fluid dynamic bearing device having a radial bearing face which forms the bearing gap between itself and the electroformed part formed so as to have a hardness higher than the electroformed part by 100 Hv or more, and is provided on a layer having a high hardness of 350 Hv or higher. The radial bearing face referred to herein means a surface which opposes the inner circumferential surface of the electroformed part across the radial bearing gap, but it is not critical whether or not a hydrodynamic pressure producing part such as hydrodynamic grooves is formed on this face.

It was found by the inventors of the present invention in extensive research that when, for example, the difference in hardness between the radial bearing face of the shaft and the electroformed part is less than 100 Hv, a kind of adhesion phenomenon occurs between the two component, the amount of abrasion is increased by abrasion resulting from this phenomenon, i.e., so-called adhesive wear. Therefore, as mentioned above, by providing the radial bearing face on a high-hardness layer formed so as to have a hardness higher than the electroformed part by 100 Hv or more, abrasion resulting from the difference in hardness between the radial bearing face of the shaft and the electroformed part can be inhibited. Moreover, when the difference in hardness between the two components is less than 100 Hv, failure mode when applied an impact load because of disturbance and the like is the stopping of relative motion as the result of interfacial friction, which may cause the stopping of the bearing (locking). In contrast, if the difference in hardness mentioned above is imparted between the two component, slight abrasion may occur, but at least worst events such as the stopping of the bearing and the like can be avoided. In general, metals which can form the electroformed part are limited and their hardness adjustment is difficult, but hardness adjustment of the shaft can be performed relatively easily and at high accuracy. Therefore, the fluid dynamic bearing device having the above constitution can be easily formed.

Moreover, when the hardness of the radial bearing face itself is lower than 350 Hv, scratches and strike marks are produced on the radial bearing face when integrated and at other occasions to possibly lower the precision of the bearing face, and handling thereof needs extra care. Therefore, the hardness of the radial bearing face is desirably 350 Hv or higher. Handling of the shaft member can be facilitated by employing such a constitution, achieving reduction in production cost.

Recesses which produce hydrodynamic pressure in the radial bearing gap can be provided on the radial bearing face. By employing such a constitution, hydrodynamic pressure can be produced in the radial bearing gap, and the shaft can be supported at high accuracy in a non-contact manner relative to the electroformed part, the amount of abrasion can be kept at a level lower than in the case where recesses of this type are not provided. These recesses can be formed by rolling, etching, cutting or other means, but it is desirably formed by rolling, considering processing accuracy and processing cost.

When the recesses are provided by rolling, A material for constituting the shaft is preferably as soft as possible, considering processability and precision of the recesses. Such a material is preferable also because of the lifetime of the molds used for rolling is extended. Moreover, although varying depending on the type of the metal forming the electroformed part, to make the difference in hardness between the radial bearing face and the electroformed part to 100 Hv or more, the hardness of the radial bearing face needs to be 400 Hv or higher in some cases. However, it is generally difficult to form a highly accurate recess on a hardness layer having a hardness of 400 Hv or higher by rolling.

To this end, in the present invention, a high-hardness layer which meets the above conditions is obtained by performing a hardening process after the rolling of the recess. Nitriding, carburizing, quenching, DLC and various other techniques can be used as the technique for the hardening process. Among these, the nitrided layer hardened by the nitriding process is desirably used to constitute the high-hardness layer. In general, the recesses as a hydrodynamic pressure producing part are formed in a depth as minute as about a few μm to smaller than 20 μm. Therefore, when a technique which requires carburizing, quenching and other heat treatment which are conducted at a high temperature is employed in case where recesses of this type are provided especially on the radial bearing face, deformation of the shaft material and lowered accuracy of the form of the recesses resulting from the deformation may be caused. Moreover, DLC requires great cost.

When the above-mentioned high-hardness layer is formed by a hardening process, the hardness tends to be highest in the surface layer portion. The inventors of the present invention found the following: at this time, it is desirable to perform a hardening process so that the thickness of the high-hardness layer in regions which demarcate the recesses, that is, regions which are in contact with the electroformed part, is twice the depth of the recesses or greater. By employing such a mode, even when the regions which demarcate the recesses are abraded, a hardness of 350 Hv or higher can be stably obtained in the regions which are in contact with the electroformed part, and proceeding of abrasion can be surely inhibited.

As mentioned above, according to the present invention, a fluid dynamic bearing device in which an increase in the amount of abrasion caused by the difference in hardness between the outer circumferential surface of the shaft and the inner circumferential surface of the bearing member can be suppressed and high rotational accuracy can be stably maintained for a long term can be provided.

The fluid dynamic bearing device having the above constitution can be used, for example, as a motor comprising said bearing device. For instance, it can be suitably used in spindle motors for disk drive units such as HDD and small motors such as axial fans.

Moreover, in order to achieve the second technical object mentioned above, the present invention provides a fluid dynamic bearing device having a bearing member, and a shaft member inserted at the inner periphery of the bearing member, in which rotation of the shaft member is supported by forming a film of a lubricating fluid in a radial bearing gap between the bearing member and the shaft member, a protrusion made of a resin and deformed with heating is provided on the bearing member, and a sealing gap and a lubricant reservoir are formed between the protrusion and the shaft member.

In this manner, by forming a sealing gap and a lubricant reservoir between the protrusion formed on the bearing member and the shaft member, the number of parts and assembling man-hour and cost of the fluid dynamic bearing device can be reduced compared to a conventional constitution in which the sealing gap and lubricant reservoir are provided between a separate component fixed on the bearing member and the shaft member.

A portion which faces the sealing gap and lubricant reservoir can be also formed, for example, by cutting part of the bearing member. However, since cutting has the risk of lowering the bearing performance due to the cutting powder produced during the process which may serve as contamination, cutting powder must be carefully removed, which raises processing cost. In contrast, in the present invention, the portions (protrusions) which face the sealing gap and lubricant reservoir are formed by heating and deforming the bearing member simultaneously. Therefore, the problem of contamination associated with the cutting powder and thus increased processing cost are not caused. Moreover, since the protrusions are made of a resin, the process of this type can be easily performed.

A heating temperature when the protrusions are formed is desirably set to a temperature equal to or higher than the glass transition temperature of the base resin constituting the bearing member. Heating the protrusions at a temperature equal to or higher than the glass transition temperature can not only soften the resin to increase the ease and precision of the process, but also modify the resin to maintain a kind of a permanent set state, enabling to prevent a change in shape of the protrusions during use and other times.

In the protrusions, regions which face the lubricant reservoir may have a spiral groove which draws the lubricating fluid into the direction away from the sealing gap, provided thereon. Since such a spiral groove can be formed simultaneously with the formation of the bearing member, the sealing performance of the fluid dynamic bearing device can be further increased without increasing processing cost.

Of all surface of the bearing member, a portion facing the radial bearing gap (so-called "radial bearing face") can be formed by the electroformed part. The electroformed part is a metal layer formed by depositing a metal on the surface of the master, and can be formed by a technique based on the electrolytic plating process or electroless plating process. Due to the characteristics of the electroforming process, of all surface of the electroformed part, the face which is in contact with the master becomes a dense face in which the configuration of the surface of the master is transferred at high accuracy to a very fine level. Therefore, if the radial bearing face is formed by the electroformed part separated from the master, especially by its dense face, a highly accurate radial bearing face can be obtained at low costs without carrying out any special after-treatment. In this case, since the radial bearing face serves as the metal face, changes in the characteristics of the radial bearing face caused by changes in temperature can be reduced than in the case where this radial bearing face is formed of a resin, and higher abrasion resistance, higher rotational accuracy and longer lifetime of the fluid dynamic bearing device can be achieved.

The fluid dynamic bearing device having the above-mentioned constitution can be favorably used in a motor comprising a stator coil and a rotor magnet.

In order to achieve the third technical object, the present invention provides a hydrodynamic bearing device comprising a rotation side member, a fixing-side member, and hydrodynamic pressure producing parts provided on either the rotation side member or fixing-side member for producing the hydrodynamic effect of a lubricating fluid in a bearing gap formed between the two components, the hydrodynamic pressure producing parts being formed by molding a resin with an insert inserted thereinto, and the hydrodynamic pressure producing part being provided with a first region which is provided on the insert and made of a material different from the resin, and a second region which is made of the resin.

In general, the resin undergoes molding shrinkage when it is cured after the injection molding. Therefore, if the insert is placed in the mold with the resin (insert molding), a stepped portion is formed by molding shrinkage of the resin between the first region made of other material than the resin and made of the resin, which can be used as the recesses and projections of the hydrodynamic pressure producing part. When this method is employed, of all surface of the mold, the molding portion of the hydrodynamic pressure producing part needs not be formed to have the recesses and projections corresponding to the configuration of the hydrodynamic pressure producing parts, and may be in any configuration as long as it has a cross section in the form of a perfect circle free of asperities. Therefore, the hydrodynamic pressure producing part does not interfere with the molding portion when it is removed from the mold after being cured, and therefore the high-precision hydrodynamic pressure producing part can be obtained.

The direction of the molding shrinkage of the resin varies depending on the type the resin: some resins undergo molding shrinkage in the direction towards the opposing member, while some undergo molding shrinkage in the direction away from the opposing member. In both cases, a stepped portion can be formed between the resin and the insert, thus allowing forming a hydrodynamic pressure producing part having recesses and projections. The first region can be formed of a material other than a resin such as a metal and a ceramic, or can be also formed of a resin composition comprising a base resin which is different from the base resin of the resin for molding.

By forming the hydrodynamic pressure producing part by insert-forming in such a manner, a hydrodynamic pressure producing part having a complex structure comprising the resin for molding and other materials is obtained. This can achieve diversity of bearing characteristics. For example, when the second region comprising the resin for molding is placed closer to the opposing member than the first region comprising a material other than resins such as a metal (hereinafter referred to as "metals"), the sliding between the hydrodynamic pressure producing part and opposing member is carried out by the resins. Therefore, reduced friction can be achieved, and such constitution can be suitably used for applications which especially require abrasion resistance during operation at a low speed. Meanwhile, in this structure, when the opposing member is a metallic material, difference in linear expansion coefficient between the metallic material and the resin becomes large, and the width of the bearing gap may be varied due to changes in temperature. Therefore, in applications which disfavor this variation, the first region made of metal or other materials can be contrarily moved closer to the opposing member than the second region. According to this structure, the abrasion of the second region by the sliding contact with the opposing member can be prevented, and therefore the lifetime of the bearing can be increased. Such structure can be thus suitably used for applications which disfavors occurrence of contamination by abrasion powder.

An electroformed metal can be also used as an insert. The electroformed metal is produced by being deposited on the surface of the master by a method categorized in electrolytic plating or electroless plating, and is different from a deposited metal produced by normal plating in that so that it can be easily separated from the master. When this electroformed metal is used as an insert in the molding of resin, a bearing in which the second region of the hydrodynamic pressure producing part is made of an electroformed metal and the first region is formed of a resin can be obtained at low costs.

In general, the face of the master of an electroformed metal which comes in contact with the master of an electroformed metal is a dense face on which the configuration of the surface of the master is correctly transferred, and the opposite face thereof is a rough face. If the dense face us used as the first region, the precision of the surface of the first region is remarkably improved by accurately finishing the surface of the master in advance, and therefore the bearing gap between the surface and the opposing member can be formed at high accuracy. In this case, the rough face of the electroformed metal is embedded into the molded resin. Since the resin enters into the recesses of the rough face to produce the anchor effect, prevention of the separation of the resin and the electroformed metal can be ensured.

In order to achieve the fourth technical object, the present invention provides a fluid dynamic bearing device comprising a shaft member, a metal part at whose the inner periphery the shaft member is inserted, and a resin portion on whose inner periphery the metal part is retained, the shaft member being supported rotatably by a lubricating film in the radial bearing gap formed between the outer circumferential surface of the shaft member and the inner circumferential surface of the metal part, wherein the resin portion is orientated on the outer periphery of the metal part in the axial direction.

In this manner, in the present invention, the resin on the outer periphery of the metal part is orientated in the axial direction. In general, the dimensional stability of the resin in the direction of orientation is better than that in the direction perpendicular to the direction of orientation, and therefore improvement in the dimensional stability in the axial direction can be achieved by orientating the resin in the axial direction in such a manner.

This resin portion can be formed, for example, by the injection-molding using the metal part as an insert. In this case, if a material which expands in diameter of its inner circumferential surface during molding shrinkage (for example, liquid crystal polymer (LCP)) is selected as a resin material to be injected, the wall thickness of the metal part and the adhesion between the metal part and the resin portion, etc., can be suitably adjusted so that the metal part can expand in diameter as the resin expands in diameter of its inner circumferential surface. By doing so, a gap can be actively formed between the metal part and an inner mold inserted at the inner periphery of the metal part, whereby separation of these can be facilitated.

EFFECT OF THE INVENTION

As mentioned above, by forming the region of the component constituting at least one of the fixed member and the rotational member, which faces the bearing gap, of the metal plated portion, a fluid dynamic bearing device which can produce high bearing performance by forming a bearing gap at high accuracy can be provided at low costs.

As mentioned above, by forming the sealing gap and the lubricant reservoir between the protrusion formed on the bearing member and the shaft member, a fluid dynamic bearing device which has good sealing property, lubricity, and long life can be provided at low costs.

As mentioned above, by forming the hydrodynamic pressure producing part by molding the resin with the insert inserted thereinto, and providing, in the hydrodynamic pressure producing part, the first region provided on the insert and made of a material different from the resin subjected to molding and the second region made of the resin, a hydrodynamic pressure producing part of the hydrodynamic bearing device can be obtained at high accuracy and at low costs.

As mentioned above, by employing the constitution in which the resin on the outer periphery of the metal part is orientated in the axial direction, the dimensional stability of the fluid dynamic bearing device having a resin portion, in particular the dimensional stability in the axial direction, can be improved.

BEST MODE FOR CARRYING OUT THE INVENTION

The first embodiment of the present invention will be described below with reference to FIGS. 1 to 9. The directions "top and bottom" or "up and down" in the description provided below merely indicate the vertical directions in each drawing for the sake of convenience, and do not specify the installation direction, the mode of use or other conditions of the fluid dynamic bearing device. This also applies to the description of the second embodiment and the following embodiments shown in FIG. 10 and the following drawings.

FIG. 1 shows a cross-sectional view of a motor which comprises a fluid dynamic bearing device 1 according to the first embodiment of the present invention. This motor is used, for example, as shown in this drawing, as a motor for cooling comprising a fan, and comprises a fluid dynamic bearing device 1 which rotatably supports a shaft 2, a rotor plate member 3 provided at one end of the shaft 2, a drive unit 4 comprising, for example, a stator coil 4a and a rotor magnet 4b opposing each other across a gap in the radial direction, and a base 5 having a housing 8 of the fluid dynamic bearing device 1 fixed at its inner periphery. The rotor magnet 4b is fixed on the inside diameter side of the rotor plate member 3 via a yoke 7, and one or more fans (blades) 6 are arranged on its outer diameter side. The fan 6 can be formed integrally with the rotor plate member 3, or can be separately formed and then fixed to the rotor plate member 3.

In the motor having the above constitution, when the stator coil 4a is energized, the rotor magnet 4b is rotated by the excitation between the stator coil 4a and the rotor magnet 4b, whereby the rotor plate member 3 and the fan 6 fixed on the rotor plate member 3 rotates integrally with the shaft 2. Because of this rotation, the fan 6 produces air flow in the direction of the rotational of the motor, and this air flow is transferred to parts to be cooled (not shown) so that the parts to be cooled.

FIG. 2 is a cross-sectional view showing a constitutional example of the fluid dynamic bearing device 1. This fluid dynamic bearing device 1 comprises the housing 8 fixed on the base 5, a bearing member 9 arranged at the inner periphery of the housing 8, the shaft 2 which rotates relative to the housing 8 and the bearing member 9, and a sealing portion 10, positioned at one opening side of the housing 8, which seals a fluid between the shaft 2 and the housing 8. In this embodiment, the rotational member is constituted of the shaft 3 which integrally has the rotor plate member 3. Moreover, the fixed member is constituted of the housing 8, bearing member 9 and sealing portion 10.

The housing 8 has the shape of a bottomed cylinder, and is formed of, for example, a resin material. In this embodiment, the housing 8 is formed by injection-molding of a resin integrally with the sealing portion 10 using the bearing member 9 disposed on the inner periphery side as an insert. An upper end face 8a on the bottom of the housing 8 is in contact with on one end face 12a of the shaft 2 in a state that the shaft 2 is inserted at the inner periphery of the bearing member 9, and constitutes a pivot bearing described later between itself and the shaft 2 in a state that the shaft 2 is rotated.

The bearing member 9 has the shape of a sleeve, and is formed of, for example, a sintered metal comprising one or both of Cu and Fe as main ingredients. An inner circumferential surface 9a of the bearing member 9 is so constituted to form a radial bearing gap between itself and an outer circumferential surface 11a of an electroformed part 11 as a metal plated portion described later. In this embodiment, although not illustrated, a region in which a plurality of hydrodynamic grooves as a hydrodynamic pressure producing part are arranged in a predetermined pattern (for example, a herringbone pattern) is provided on the entire inner circumferential surface 9a or in a partial region thereof. The bearing member 9 may be formed of a metal other than the sintered metal (cast iron, foamed metal, etc), or non-metal materials such as resins and ceramics. When the material has a void therein, the amount and size of the void are not critical.

The sealing portion 10 is arranged on one open end side of the radial bearing gap formed between the bearing member 9 and the shaft 2. The inner circumferential surface 10a of the sealing portion 10 has such a shape that its diameter gradually increases toward the side which is open to the air, and forms a sealing space S having a tapered shape between itself and the outer circumferential surface of the shaft 2 (herein, a large diameter face 12c of the resin portion 12) opposing this surface.

The shaft 2 is constituted of the electroformed part 11 as a metal plated portion and the resin portion 12. More specifically, in the outer circumferential surface of the shaft 2, at least a region which faces the radial bearing gap is constituted of the electroformed part 11, and a region of the shaft 2 excluding the electroformed part 11 is constituted of the resin portion 12. In this embodiment, the shaft 2 which integrally has the resin portion 12 and the rotor plate member 3 is formed by injection-mold of a resin, using the electroformed part 11 having a cylindrical shape as an insert. Although the width of the radius of the radial bearing gap is much smaller than the widths of the radii of the shaft 2 and the bearing member 9 dimension, and is illustrated in a larger dimension than actual in FIG. 2. The radial bearing gaps in FIGS. 6 and 9, which are described later, are also illustrated in the same manner.

The shaft having the above constitution 2 is produced, for example, by the following steps:

The shaft 2 is produced by the procedure comprising a step of masking the surface of a master 21 used in an electrolytic plating process with an insulating material, a step of conducting an electrolytic plating process on the master 21 subjected to the masking to form the electroformed part 11, a step of conducting molding (insert molding) of the shaft 2 by using the electroformed part 11 and the master 21 as inserts, and a step of separating the electroformed part 11 from the master 21, in the order stated.

The master 21, which serves as the master of the electroformed part 11, is formed of, for example, stainless steel in the form of a sleeve. Of all surface of the master 21, a region in which the electroformed part 11 of the inner circumferential surface 21a is expected to be formed is given a shape based on the outer circumferential surface 11a of the electroformed part 11 which should be formed by deposition forming. In this embodiment, as shown in FIG. 3, the inner circumferential surface 21a having a shape corresponding to a perfect circle is formed so that the outer circumferential surface 11a of the electroformed part 11 has a cross section in the form of a perfect circle. In this case, the accuracy of the surface of the inner circumferential surface 21a directly affects the accuracy of the surface the outer circumferential surface 11a of the electroformed part 11 which serves as the radial bearing face. Therefore, it is desirable that the surface of the inner circumferential surface 21a is finished as accurately as possible.

The material of the master 21 may be any material as long as it has masking property, conductive and chemical resistance, and any metal or non-metal substance can be selected. Examples include, in addition to stainless steel, chromium-based alloys and nickel-based alloys.

As shown in FIG. 3, the surface of the master 21, excluding the region in which the electroformed part 11 is expected to be formed, is subjected to masking. In this embodiment, a masked portion 22 is formed in a region excluding the outer circumferential surface and both end faces of the master 21 having the form of a sleeve and a region in which the electroformed part 11 of the inner circumferential surface 21a is expected to be formed (the region shown with the dotted pattern in FIG. 3). A material having insulation and resistance to corrosion by electrolyte solutions as a covering material for forming the masked portion 22 is selected and used.

The electrolytic plating process is carried out by immersing the master 21 into an electrolyte solution containing metal ions such as Ni and Cu, and energizing the electrolyte solution to cause a target metal to electrolytically deposit on the inner circumferential surface 21a of the master 21 in a region excluding the masked portion 22. The electrolyte solution may contain, if necessary, sliding material such as PTFE and carbon, or stress relief material s such as saccharin. In this embodiment, an electrolyte solution containing PTFE particles as a sliding is used. The type of the deposition metal is suitably selected depending to the hardness required for the bearing face, resistance to a lubricating oil (oil resistance) and other required characteristics.

By carrying out the steps mentioned above, as shown in FIG. 4, the thin cylindrical electroformed part 11 is formed in a region which is not covered with the masked portion 22 of the inner circumferential surface 21a of the master. If the thickness of the electroformed part 11 is too small, durability of the bearing face (outer circumferential surface 11a) is lowered and other problems are caused, while if it is too thick, peeling property from the master 21 may be lowered. Therefore, it is set to have the optimum thickness, for example, thickness ranging from 5 μm to 200 μm, depending on the required bearing performance, bearing size, use and other. As a means for forming the electroformed part 11, in addition to the methods based on electrolytic plating stated above, deposition-forming the target metal on the surface of the master by the action of a reducing agent, methods based on the so-called electroless plating can be also employed.

The electroformed part 11 formed by the above steps is provided and disposed, for example, integrally with the master 21 as an insert in a molding for insert-forming the resin portion 12. In this case, as shown in FIG. 5, forming molds 23, 24 used have, a cavity 25 based on the shaft 2 (and rotor plate member 3) when the mold is clamped. A molten resin is charged into the cavity 25, for example, from a gate 26 by using these forming molds 23, 24 and the molten resin is cured, whereby the resin portion 12 having the shape shown in this drawing and the electroformed part 11, and further the shaft 2 integrally having the rotor plate member 3 in this embodiment are formed.

The material of the resin portion 12, that is, the material charged into the cavity 25 of the forming molds 23, 24, may be any material as long as it is a material having a freezing point lower than the material of the electroformed part 11, and usable examples include resins and metals. Among these, examples of resin materials which can be used as base resins include crystalline resins such as liquid crystal polymers (LCP), polyphenylene sulfide (PPS), polyether ether ketone (PEEK), polyacetal (POM) and polyamide (PA), and non-crystalline resin such as polyphenylsulfone (PPSU), polyethersulfone (PES), polyamideimide (PEI) and polyamide-imide (PAI). Moreover, reinforcements (regardless of whether it is fibrous, powdery, or in other forms), lubricants, conductive agents and various other kinds of fillers may be added, if necessary.

After the molding, a molded article in which the master 21, the electroformed part 11, and the resin portion 12 (the resin portion 12 and the rotor plate member 3 In this embodiment) are integrated is removed from the molds 23, 24. This molded article is divided into the shaft 2 and the master 21 in the following separation step.

In the separation step, the outer circumferential surface 11a of the electroformed part 11 is peeled off from the inner circumferential surface 21a of the master 21 for example, by impacting the master 21 or the electroformed part 11. By doing so, the master 21 is drawn off from the electroformed part 11 and resin portion 12, obtaining the shaft 2 as a finished product.

Examples of means usable for separating the electroformed part 11 include, in addition to the above means, a method of heating (or cooling) the electroformed part 11 and the master 21 to produce a difference in thermal expansion between the two components, and employing the two means (impacting and heating) in combination, among others.

The thus-formed shaft 2 is inserted at the inner periphery of the bearing member 9 fixed on the housing 8, and the lubricating oil is poured from the side which is open to the air (the side of the sealing portion 10) of the radial bearing gap. Accordingly, the fluid dynamic bearing device 1 in which the inner space of the bearing including the radial bearing gap is filled with the lubricating oil is accomplished. Moreover, the sealing space S is formed between the inner circumferential surface 10a of the sealing portion 10 and the outer circumferential surface of the shaft 2 (herein, a large diameter face 12c of the resin portion 12) opposing this surface. In a state that the inner space of the bearing is filled with the lubricating oil as mentioned above, it is so designed that the oil level of the lubricating oil is always maintained within sealing space S.

In the fluid dynamic bearing device having the above constitution 1, while the shaft 2 is in rotation, the outer circumferential surface 11a of the electroformed part 11 opposes the inner circumferential surface 9a of the bearing member 9 as a radial bearing face. Moreover, the radial bearing gap is formed between the region in which the hydrodynamic grooves formed on the inner circumferential surface 9a are arranged (not shown) and the outer circumferential surface 11a of the electroformed part 11. As the shaft 2 rotates, the lubricating oil in the inner space of the bearing is drawn into the radial bearing gap by the hydrodynamic grooves formed on the inner circumferential surface 9a, and the pressure in this gap is increased. By the hydrodynamic effect of such a hydrodynamic pressure producing part (hydrodynamic groove), a radial bearing portion R which supports the shaft 2 in the radial direction in a non-contact manner is formed in the radial bearing gap. Simultaneously, one end face 12a of the shaft 2 is supported in a contact manner (supported pivotally) by the upper end face 8a on the bottom of the housing 8 opposing this face, and accordingly the thrust bearing portion T which rotatably supports the shaft 2 in the thrust direction is formed between the faces 12a, 8a.

In this manner, forming the outer circumference portion of the shaft 2 including the radial bearing face of the metal plated portion (the electroformed part 11 herein) and constituting the portions of the shaft 2 other than the electroformed potion 11 by the resin portion 12 enables inhibiting radially outward expansion of the resin portion 12 by the electroformed part 11 provided on the outer diameter side. Accordingly, expansion of the shaft 2 toward the outer diameter side as the temperature rises and great changes in the radial bearing gap formed between the shaft 2 and the inner circumferential surface 9a of the bearing member 9 can be avoided so that the bearing gap can be maintained to have an appropriate interval.

Since as stated above, the electroformed part 11 is formed by the electrolytic plating process or by a method based on the electroless plating process, due to the characteristics of the process, the shape of the surface of the master 21 (the shape of the inner circumferential surface 21a herein) is transferred onto the surface of the electroformed part 11 on the side where deposition starts (outer circumferential surface 11a) highly accurately to a very fine level. Accordingly, if the accuracy of the surface of the inner circumferential surface 21a of the master 21 is increased and the surface of the electroformed part 11 on the side where deposition starts is used as the radial bearing face, the highly accurate outer circumferential surface 11a can be obtained at low costs, especially without conducting post-processes such as face-finishing. Moreover, the processing accuracy (surface accuracy) thereof depends only on the accuracy of the corresponding surface of the master 21 and does not depend on its size. Therefore, the outer circumferential surface 11a of the electroformed part 11 having high surface accuracy can be obtained even when the shaft 2 is reduced in size. Accordingly, the fluid dynamic bearing device 1 having high surface accuracy and thus a highly accurate bearing gap can be formed at low costs, while achieving its size reduction.

When the electrolytic plating process is carried out on the master 21 having a shape of this type, the function of preventing slip-off of the electroformed part 11 can be imparted to the shaft 2 by utilizing the tendency that the outermost surface of the electroformed part 11 formed at the inner periphery of the master 21 (the inner circumferential surface 11b herein) becomes rough. That is, by forming the resin portion 12 in a state that the inner circumferential surface 11b of the electroformed part 11 is roughened to an appropriate degree, the adherence force with the small diameter face 12b of the resin portion 12 serving as a surface which is in close contact with the electroformed part 11 can be increased, whereby slip-off of the electroformed part 11 can be prevented.

By molding the shaft 2 using the electroformed part 11 as an insert, molding of the portion other than the electroformed part 11 of the shaft 2 (resin portion 12) and mounting of these components can be simultaneously carried out in one step, which leads to cost reduction. Moreover, by insert-molding of both the electroformed part 11 and the master 21 integrally, it can be easily formed integrally with the resin portion 12 even when the wall thickness of the electroformed part 11 is small, and therefore the handling characteristics of the electroformed part 11 alone needs not be considered.

by forming the shaft 2 by injection-molding of resin using the electroformed part 11 as an insert, components which should be attached at one end of the shaft 2, for example, the rotor plate member 3, can be formed integrally with the shaft 2. Accordingly, while the fluid dynamic bearing device 1 is in use, leakage of the lubricating oil from between the shaft 2 and a component attached at one end of the shaft 2 (between the fixing faces) can be prevented.

Although one constitutional example of the first embodiment has been described above, this embodiment is not limited to the above constitutional example, and other forms may be also formed as long as the shaft 2 is constituted of the metal plated portion facing the radial bearing gap face and the resin portion 12.

In the above constitutional example, the case where the resin portion 12 constituting the shaft 2 is designed to have a shape with different diameters, in which the electroformed part 11 is fixed on the outer periphery of the small-diameter portion to be integrated therewith, but other constitutions may be also employed in order to increase the force which prevents slip-off of the electroformed part 11. For example, forming one end of the resin portion 12 in the cavity 25 to have a large diameter in advance allows forming the resin portion 12 in a manner that the resin surrounds the upper and lower ends of the electroformed part 11. By doing so, for example, as shown in FIG. 6, a large diameter portion 12d having a diameter larger than the small-diameter portion having the electroformed part 11 provided on its outer periphery can be provided on one end side of the resin portion 12 (the side of the tip of the shaft 2), so that the large diameter portion 12d can be engaged as an engaging portion with the electroformed part 11 in the axial direction. Therefore, the force which prevents slip-off of the electroformed part 11 can be increased. Moreover, as shown in this drawing, slip-off prevention force can be further increased by nipping the electroformed part 11 from both sides in the axial direction.

Alternatively, as shown in FIG. 7, a masked portion 27 (two portions in this drawing) is provided in a part of the region in which the electroformed part 11 is expected to be formed on the inner circumferential surface 21a of the master, and then the electroformed part 11 is formed in the region other than masked regions 22, 27. In this manner, the electroformed part 11 is not formed on the masked portion 27 and is left as it is, whereby a recess (a hole herein) 28 can be formed in a portion corresponding to the masked portion 27 of the electroformed part 11 having a cylindrical shape. Therefore, forming the shaft 2 (resin portion 12) by inserting the electroformed part 11 having this recess 28 causes the molten resin to flow into a space (recess 28) formed by the masked portion 27 and be cured. The portion which flows into the recess 28 and is cured acts as an engaging portion which engages with the electroformed part 11 in the axial direction, which can be used for preventing slip-off of the electroformed part 11. The shape of the recess 28 is optional as long as it acts as a slip-off prevention for the electroformed part 11. The shape which can be employed may be a hole shown in FIG. 8, a strip extending in the circumferential direction and various other shapes. Of course, the engaging portion stated above can be formed not only by the electroformed part 11 but also by, for example, modifying the shape of the mold for the resin portion 11 or by other means as long as the metal plated portion is formed.

The above constitutional example shows as an example the case where the fluid dynamic bearing device 1 is constituted by inserting the electroformed part 11 separated and drawn out from the master 21 at the inner periphery of the bearing member 9 fixed integrally on the housing 8 after the insert-molding of the shaft 2, but the master 21 can be used as the bearing member 9 as it is. For example, although not illustrated, after the electroformed part 11 is separated and drawn out from the master 21, the housing 8 shown in FIG. 2 is integrally formed of a resin with the master 21 inserted into the forming mold. By inserting the shaft 2 at the inner periphery of the master 21 arranged on the inner periphery side of the housing 8 in this manner, the master 21 can be used as the bearing member. Of course, after the electroformed part 11 and the master 21 are separated, the master 21 can be used as the bearing member 9 as it is without drawing out the electroformed part 11 (the shaft 2 comprising the electroformed part 11). In this case, the outer circumferential surface 11a of the electroformed part 11 and the inner circumferential surface 21a of the master 21 which form the radial bearing gap have the relationship of the transfer origin surface and the transfer destination surface. Accordingly, if the bearing gap is constituted by the electroformed part and the master, a highly accurate bearing gap having very little variation can be obtained. Moreover, since variation in dimension actually occurs for each product, for example, matching is normally carried out between a plurality of the shaft 2 produced and the bearing member 9 so that the radial bearing gap falls within a predetermined range. When the bearing gap is formed by the method of this type, the matching step stated above can be dispensed with, and it is thus efficient.

In the above constitutional example, the case where the rotational member of the fluid dynamic bearing device 1 is constituted of the shaft 2 which consist of the electroformed part 11 and resin portion 12, but on the other hand, it is also possible to constitute the fixed member of the fluid dynamic bearing device 1 of the shaft 2. FIG. 9 shows an example thereof (second constitutional example), in which in the fluid dynamic bearing device 1 shown in this drawing, the shaft 2 constituted of the electroformed part 11 and resin portion 12 is formed integrally with the housing 8. Moreover, a cylinder part 13 having the bearing member 9 as an insert is formed, and this cylinder part 13 is provided integrally with the rotor plate member 3. The sealing portion 10 is formed integrally with cylinder part 13. Therefore, In this embodiment, the fixed member is constituted of the shaft 2 and the housing 8, and the rotational member is constituted of the bearing member 9, the sealing portion 10, and the cylinder part 13. In this case, a lower end face 13b of a lid portion 13a covering the upper end side of the cylinder part 13 is supported in a contact manner (pivotally supported) by one end face 12a of the shaft 2 opposing this face, whereby the rotational member having the bearing member 9 and cylinder part 13 is rotatably supported in the thrust direction. The constitution stated above is applicable as long as a metal plated portion, which includes but not limited to the electroformed part 11, is provided on the shaft 2.

An example of the invention according to this embodiment applied to the fluid dynamic bearing device 1 has been described above, but the fluid dynamic bearing device 1 having the above constitution can be suitably applied as a bearing device not only for fan motors shown as examples, but for spindle motors for disk drives typically including spindle motors for HDD and motors for various electrical machinery and apparatuses. For example, when the fluid dynamic bearing device 1 according to this embodiment is applied to motors for HDD, in case where the fluid dynamic bearing device 1 is used for a hub for mounting a disk or a polygon scanner motor, a turntable for retaining a polygon mirror and other components are attached to the shaft 2, or are formed integrally with the shaft 2 as illustrated. At this time, parts other than the electroformed part 11 and the master 21, for example, the yoke 7 and the rotor magnet 4b comprising this can be also integrally formed.

In the above description, a constitution in which a plurality of hydrodynamic grooves are arranged in a predetermined pattern (herringbone pattern, etc.) As a hydrodynamic pressure producing part constituting a radial bearing portion R, is shown as an example, but the invention according to this embodiment is not limited to this. That is, the fluid dynamic bearing device 1 according to this embodiment may have any constitution as long as the shaft 2 constituted of the electroformed part 11 and resin portion 12 which have the radial bearing face is provided therein, and the absence or presence of the hydrodynamic pressure producing part is not critical. Therefore, in the fluid dynamic bearing device 1 according to this embodiment, the hydrodynamic pressure producing part may be provided on the side of the bearing member 9 or the side of the shaft 2, or a so-called fluid cylindrical bearing having no hydrodynamic pressure producing part may be constituted. Moreover, the hydrodynamic pressure producing part is not limited to the arrangement pattern stated above, but a hydrodynamic pressure producing part having an optional configuration (for example, a hydrodynamic groove region in a spiral pattern, step bearing, multi-arc bearing, etc.) can be constituted.

In the above description, the case where the thrust bearing portion T is constituted of the pivot bearing is shown as example, the thrust bearing portion T can be also constituted by providing a thrust bearing gap between the faces 12a, 8a opposing in the axial direction, as in the radial bearing portion R, and providing the hydrodynamic pressure producing part which produces the hydrodynamic effect in this gap on either of the two faces. Of course, in such a case, various hydrodynamic pressure producing parts such as hydrodynamic groove arrangement regions having a herringbone pattern and a spiral pattern, as in the radial bearing portion, can be employed.

In the above description, the lubricating oil is shown as an example of as the fluid which fills the inside of the fluid dynamic bearing device 1 and can form a fluid film of the fluid in the radial bearing gap, but fluids which can produce a fluid film of the fluid in the bearing gap, for example, gases such as air, lubricants having fluidity such as magnetic fluids, lubricating greases, other substances can be also used.

The second embodiment of the present invention will be described below with reference to FIGS. 10 to 18.

FIG. 10 shows a constitutional example of a spindle motor for information appliances incorporating a hydrodynamic bearing device 101 according to a second embodiment of the present invention. This spindle motor for information appliances is used for disk drive units such as HDD, and comprises a hydrodynamic bearing device 101, a disk hub 103 attached to a the shaft member 102 of the hydrodynamic bearing device 101, a stator coil 104 and a rotor magnet 105 which, for example, oppose each other across a gap in the radial direction, and a base member 106. The stator coil 104 is attached of to the outer periphery of a base member 106, while the rotor magnet 105 is attached to the inner periphery of the disk hub 103. The disk hub 103 retains one or more disks D such as magnetic disks on its outer periphery. A bearing member 107 of the hydrodynamic bearing device 101 is attached to the inner periphery of the base member 106. When the stator coil 104 is energized, the rotor magnet 105 is rotated by the electromagnetic force generated between the stator coil 104 and the rotor magnet 105, and accordingly the disk hub 103 and the shaft member 102 are integrally rotated.

FIG. 11 shows an example of the hydrodynamic bearing device 101. This hydrodynamic bearing device 101 have the shaft member 102 having a shaft portion 102a at the rotational center, and an attachment surface for attaching to the base member 106 on its outer circumferential surface, and comprises a bearing member 107 having an inner periphery at which the shaft portion 102a can e inserted, a lid member 110 which seals an opening at one end side of the bearing member 107, and a sealing member 111 positioned at the other end side of the bearing member 107. For the sake of explanation, the side of the lid member 110 is referred to as the lower side, and the side of the sealing member 111 is referred to as the upper side in the description below.

The shaft member 102 is formed of, for example, a metallic material such as stainless steel, and is constituted of the shaft portion 102a and a flange portion 102b provided integrally or separately at one end of the shaft portion 102a. Alternatively, it can have a hybrid structure, in which the shaft portion 102a is constituted of a metal and the flange portion 102b is constituted of a resin. An outer circumferential surface 102a1 of the shaft portion 102a in this embodiment is formed so as to have a perfect circle cross section free from irregularities. Moreover, the end faces 102b1, 102b2 of the flange portion 102b are formed so as to have a flat surface free from irregularities.

The bearing member 107 is constituted of an electroformed part 108 formed by the electroforming process described later in detail, and a retainer 109 formed by injection-molding with the electroformed part 108 inserted thereinto. This retainer 109 is formed of, for example, a resin composition. A base resin constituting the resin composition is not particularly limited as long as it can be injected, and usable examples include noncrystalline resins such as polysulfone (PSU), polyethersulfone (PES), polyphenylsulfone (PPSU), and polyamideimide (PEI), and crystalline resins such as liquid crystal polymer (LCP), polyether ether ketone (PEEK), polybutylene terephthalate (PBT), and polyphenylene sulfide (PPS). These base resins contain, if necessary, various kinds of fillers such as reinforcements (regardless of whether it is fibrous, powdery, or in other forms), lubricants, and conductive agents, singly or in combination of two or more kinds.

Metallic materials, as well as resin materials, are also usable as the injection material. Examples of usable metallic materials include metallic materials having low melting points such as magnesium alloys and aluminium alloys. In addition, the retainer 109 can be also formed by the so-called MIM molding, in which a mixture of a metal powder and a binder is injection-molded, and the molded article is degreased and sintered. Furthermore, ceramics can be also used as the injection material.

The retainer 109 is constituted of a cylindrical sleeve member 109a having the electroformed part 108 disposed at its inner periphery, a first large diameter portion 109b extending downwardly from the outer diameter side of the sleeve member 109a and positioned on the outer diameter side of the flange portion 102b of the shaft member 102, and a second large diameter portion 109c extending upwardly from the outer diameter side of the sleeve member 109a. The components 109a to 109c are formed as an integral part having no interfaces. In the illustrated example, the inner peripheries of the first large diameter portion 109b and the second large diameter portion 109c are formed so as to have the same diameter, but they may have different diameters.

Two regions (upper and lower regions) which serve as radial bearing faces A of radial bearing portions R1, R2 are provided separately in the axial direction on an inner circumferential surface (small-diameter inner circumferential surface) 107a of the bearing member 107 (electroformed part 108). In these two regions, as shown in FIG. 12, a plurality of hydrodynamic grooves 107a1, 107a2, respectively, arranged, for example, in a herringbone pattern are formed as radial hydrodynamic pressure producing parts. The upper hydrodynamic grooves 107a1 are formed asymmetrically in the axial direction relative to the axial center (axial center of the region between the upper and lower inclined grooves) m, and the axial dimension X1 of the region above the axial center m is larger than the axial dimension X2 of the region therebelow. Meanwhile, the lower hydrodynamic grooves 107a2 are formed symmetrically in the axial direction, and the axial dimensions of the upper and lower regions of the grooves are equal to the above axial dimension X2. In this case, while the shaft member 102 is in rotation, the upper hydrodynamic grooves 107a1 have relatively greater drawing force (pumping force) of the lubricating oil by the hydrodynamic grooves than the symmetrical lower hydrodynamic groove 107a2. When such a pumping force is not required, the upper hydrodynamic grooves 107a1 may be symmetrical in the axial direction as the lower hydrodynamic groove 107a2. Moreover, as in the illustrated example, the electroformed part 108 can be provided entirely on the small-diameter inner circumferential surface 107a of the bearing member 107, or can be provided only in the region which serves as the radial bearing face A. In this case, the electroformed part 108 is discontinuous in the axial direction.

On an entire lower end face 107b of the bearing member 107 (a first end face provided between the small-diameter inner circumferential surface 107a and a first large-diameter inner circumferential surface 107c) or in a partial annular region thereof, a thrust bearing face B of a first thrust bearing portion T1 is formed, and a plurality of hydrodynamic grooves 107b1 arranged in a spiral pattern as shown in FIG. 12B are formed on the thrust bearing face B as the thrust hydrodynamic pressure producing part.

A lid member 110 having the shape of an approximate bottomed cylinder formed of a resin or a metallic material is fixed on the inner circumferential surface (first large-diameter inner circumferential surface) 107c of the first large diameter portion 109b of the bearing member 107 (retainer 109). This lid member 110 comprises a cylindrical side portion 110a and a bottom 110b which seals the lower end opening of the side portion 110a, and these are integrally formed. A thrust bearing face C of the second thrust bearing portion T2 is formed on the entire upper end face 110b1 of the bottom 110b or in a partial annular region thereof, and a plurality of hydrodynamic grooves arranged for example, in a spiral pattern, are formed (not illustrated) on the thrust bearing face C as a thrust hydrodynamic pressure producing part.

The outer circumferential surface 110a1 of the lid member 110 is fixed to the inner circumferential surface 107c of the first large diameter portion 109b of the bearing member 107 (retainer 109) by press fitting, adhesion or other suitable means. At this time, the flange portion 102b of the shaft member 102 is accommodated in a space formed between the lower end face 107b of the bearing member 107 and the upper end face 110b1 of the bottom 110b of the lid member 110. The upper end face 110a2 of the side portion 110a of the lid member 110 is in contact with the lower end face 107b of the bearing member 107, whereby the thrust bearing gap described later is controlled to have a specified width.

An annular sealing member 111 formed of a metallic material or a resin material is fixed to the inner circumferential surface 107e of the second large diameter portion 109c of the bearing member 107 (retainer 109) by press fitting, adhesion, or other suitable means employing these methods in combination. The diameter of the inner circumferential surface 111a of the sealing member 111 increases from bottom to top in a tapering manner, and an annular sealing space S1 whose dimension in the radial direction gradually increases from bottom to top is formed between this inner circumferential surface 111a and the outer circumferential surface 102a1 of the shaft portion 102a opposing the inner circumferential surface 111a. The inner space of the hydrodynamic bearing device 101 sealed by the sealing member 111 is filled with, for example, the lubricating oil as a lubricating fluid, and inside of the hydrodynamic bearing device 101 is filled with the lubricating oil. In this state, the oil level of the lubricating oil is always maintained within the range of the sealing space S1. In order to reduce the number of parts and assembling man-hour, the sealing member 111 can be formed integrally with the bearing member 107.

In the hydrodynamic bearing device 101 having the above constitution, when the shaft member 102 rotates, the regions formed separately in two (upper and lower) portions of the electroformed part 108 constituting the bearing member 107 and serving as the radial bearing faces A oppose the outer circumferential surface 102a1 of the shaft member 102 across the radial bearing gap. Rotation of the shaft member 102 generates the hydrodynamic pressure in the lubricating oil filling each radial bearing gap, and the first and second radial bearing portions R1, R2 which rotatably support the shaft member 102 in the radial direction in a non-contact manner are formed by the pressure. Accordingly, a first radial bearing portion R1 and a second radial bearing portion R2 which rotatably support the shaft member 102 in the radial direction in a non-contact manner are formed.

When the shaft member 102 rotates, the regions serving as the thrust bearing faces B formed on the lower end face 107b of the bearing member 107 oppose the upper end face 102b1 of the flange portion 102b of the shaft member 102 across the thrust bearing gap. Simultaneously, when the shaft member 102 rotates, the regions serving as the thrust bearing faces C formed the upper end face 110b1 of the lid member 110 oppose the lower end face 102b2 of the flange portion 102b of the shaft member 102 across the thrust bearing gap. As the shaft member 102 rotates, the hydrodynamic pressure of the lubricating oil is generated in the two thrust bearing gaps, and the shaft member 102 is rotatably supported by the pressure in both thrust directions in a non-contact manner. Accordingly, the first thrust bearing portion T1 and the second thrust bearing portion T2 which rotatably support the shaft member 102 in the thrust direction in a non-contact manner are formed.

While the hydrodynamic bearing device 101 is in operation, the lubricating oil charged in the inner space may have negative pressure in part of the region. Generation of such negative pressure may lead to generation of bubbles, leakage of the lubricating oil, generation of vibration and other problems, causing lowered rotational performance. To this end, in this embodiment, to prevent generation of local negative pressure, the following constitution is employed, as mentioned above: the configuration of the hydrodynamic grooves on the upper inner periphery of bearing member 107 is rendered asymmetrical in the axial direction so that pumping ability downward in the axial direction is imparted to the lubricating oil filling the radial bearing gap, and a circulation path 112 for returning the lubricating oil pushed toward the bottom to the upper end of the radial bearing gap is provided to forcefully circulate the lubricating oil inside the hydrodynamic bearing device 101.

The circulation path 112 shown in FIG. 11 as an example is constituted of a through hole 112a in the axial direction which runs from the sealing space S1 which is open to the air and opens to the first end face 107b of the bearing member 107, a first radial passage 112b formed on the lower end face 111b of the sealing member 111, a circular passage 112c formed on the upper end face 107d of the bearing member 107, and a second radial passage 112d which communicates the circular passage 112c with the upper end of the radial bearing gap. The illustrated example shows the case where the first radial passage 112b is formed on the lower end face 111b of the sealing member 111, and the second radial passage 112d is formed on the upper end face 107d of the bearing member 107, but these radial passages 112b, 112d may be formed on their opposing faces.

By providing the circulation path 112 In this manner, the lubricating oil is caused to circulate inside the bearing device while the hydrodynamic bearing device 101 is in operation, through the thrust bearing gap, the through hole 112a in the axial direction, the first radial passage 112b, the circular passage 112c, the second radial passage 112d, and the upper end of the radial bearing gap, in the order stated. Accordingly, generation of local negative pressure of the lubricating oil within the inner space of the hydrodynamic bearing device 101 can be prevented, allowing to achieve maintaining high bearing performance. In the illustrated example, the through hole 112a is formed so as to have a constant diameter in the axial direction, but it can be designed to have different diameters in different portions in the axial direction (for example, the diameter is gradually decreased from bottom to top in the axial direction).

The manufacturing process of the above hydrodynamic bearing device 101 will be described now concentrating on the manufacturing process of the bearing member 107 with reference to drawings.

FIGS. 13A to 13C partially show the manufacturing process of the bearing member 107 in the above hydrodynamic bearing device 101. More specifically, FIG. 13A shows a step of producing a master member 113; FIG. 13B shows a step of masking required portions of the master member 113; and FIG. 13C shows a step of forming an electroformed member 115 by electroforming process. After conducting these steps, a step of molding the electroformed part 108 of the electroformed member 115 using a resin material, and a step of separating the electroformed part 108 and the master member 113 are carried out to produce the bearing member 107.

In the step shown in FIG. 13A, the master member 113 in the form of a solid shaft formed of a conductive material, for example, stainless steel subjected to a quenching process, nickel-chromium steel, other nickel alloys, or chromium alloys or the like is formed. The master member 113 can be also formed of non-iron metallic materials other than these metallic materials, such as ceramics which have been subjected to a conductive treatment (e.g., forming conductive coatings on the surfaces).

In a partial region of the outer circumferential surface 113a of the master member 113, a molding portion N which molds the electroformed part 108 of the bearing member 107 is formed. The molding portion N has such the shape of the inverse of the pattern of projections and recesses on the inner circumferential surface of the electroformed part, and in two portions in the axial direction thereon, the row of recesses 113a1, 113a2 which form a bulging portion between the hydrodynamic grooves 107a1 and 107a2 are formed in the circumferential direction. Of course, the shapes of the recesses 113a1, 113a2 may be formed in correspondence with the shape of the hydrodynamic pressure producing part, for example, in a spiral pattern.

In the step shown in FIG. 13B, the masking 114 (shown by the dotted pattern in FIG. 13B) is applied onto the outer surface of the master member 113 (masking step), excluding the molding portion N. An existing product which is non-conductive and has corrosion resistance to electrolyte solutions is suitably selected and used as a covering material for the masking 114.

The electroforming process is conducted by immersing the master member 113 in an electrolyte solution containing metal ions such as Ni and Cu, and then energizing the master member 113 to cause a target metal to deposit (electrolytically deposit) in the region (molding portion N) in the outer surface of the master member 113 in which the masking 114 is not applied. Sliding material such as carbon and PTFE (polytetrafluoroethylene), or stress relief materials such as saccharin, if necessary, may be added to the electrolyte solution. The type of the electrolytically deposited metal is suitably selected depending on physical properties such as hardness and fatigue strength, and chemical properties required for the bearing faces of the hydrodynamic bearing.

The electroformed part 108 can be also formed by methods based on electroless plating, as well as the methods based on electrolytic plating mentioned above. In such a case, conductivity of the master member 113 and insulation of the masking 114 are unnecessary.

By carrying out the steps mentioned above, as shown in FIG. 13C, an electroformed member 115 in which the electroformed part 108 is attached to the molding portion N of the master member 113 in a manner of covering the molding portion N is formed. At this time, the shapes of the recesses 113a1, 113a2 formed in the molding portion N are transferred onto the inner circumferential surface of the electroformed part 108, and a plurality of the hydrodynamic grooves 107a1, 107a2 shown in FIG. 12A are formed separately in the axial direction. If the thickness of the electroformed part 108 is too large, peeling property from the master member 113 is lowered, while on the other hand, if it is too small, durability of the electroformed part 108 is lowered. Therefore, it is set to an optimum thickness depending on required bearing performance, bearing size, and applications (for example, about 5 μm to 200 μm).

Subsequently, the electroformed member 115 formed by the above steps is transported to be subjected to the molding step. Although not illustrated, in the molding step, the electroformed member 115 is set in a predetermined mold as an insert, and then injection molding (insert molding) is carried out by using the above resin material. After the injection of the resin material, the resin material is cured and removed from the mold, obtaining as shown in FIG. 14, obtaining a molded article in which the electroformed member 115 comprising the master member 113 and the electroformed part 108 are integrated with the retainer 109. At this time, on the lower end face 107b of the bearing member 107, a plurality of the hydrodynamic grooves 107b1 arranged in a spiral pattern shown in FIG. 12B are molded simultaneously with the injection molding. The through hole 112a in the axial direction, circular passage 112c, and second radial passage 112d can be also formed simultaneously with the injection molding.

This molded article is then transported to be subjected to the separation step, the electroformed part 108 is peeled off from the outer periphery of the master member 113, whereby the molded article is divided into a unit of the electroformed part 108 and retainer 109 integrated (bearing member 107) and the master member 113. In this separation step, for example, the electroformed member 115 or the bearing member 107 is impacted, the inner circumferential surface of the electroformed part 108 is expanded in diameter in the radial direction to form a fine gap (1 μm to a few μm in radius dimension) between the same and the outer circumferential surface of the master member 113, and the master member 113 is drawn out from the inner periphery of the electroformed part 108. Moreover, the master member 113 can be also separated by utilizing the difference in thermal expansion between the electroformed part 108 and the master member 113.

The shaft member 102 is produced separately from the master member 113 is inserted into the shaft member 107 separated from the master member 113 in the manner described above, other components are mounted thereon, and the inner space of the bearing member 107 is filled with the lubricating oil, whereby the hydrodynamic bearing device 101 shown in FIG. 11 is accomplished. Meanwhile, the separated master member 113 can be repeatedly used in the electroforming process, and therefore the highly accurate bearing member 107 can be produced in quantity stably and at low costs.

As shown in the above, in this constitutional example, the bearing member 107 has the electroformed part 108 in at least a portion facing the radial bearing gap face of the inner circumferential surface (radial bearing face A). The electroformed part 108 is a metal layer formed in the electroforming process, and because of the characteristics of the electroforming process, the shape of the surface of the master member 113 is transferred onto the inner circumferential surface of the electroformed part 108 highly accurately to a very fine level. If especially the molding portion N in the master member 113 is formed at high accuracy, the radial bearing face A of the electroformed part 108 can be formed at high accuracy and at low costs without carrying out any special after-treatment.

Since the linear expansion coefficient of the radial bearing face A is lower than in a conventional constitution in which the radial bearing face A is provided in the resin portion, the amount of variation of the radial bearing gap width associated with changes in temperature can be reduced. Furthermore, because the abrasion resistance of the radial bearing face A is increased, the amount of abrasion of the radial bearing face A can be reduced even if it is repeatedly subjected to sliding contact with the shaft member 2 at the time of starting, stopping and the like. Thus, according to this embodiment of the invention, cost reduction and higher rotational accuracy of the hydrodynamic bearing device 101 can be simultaneously achieved.

In the above description, the hydrodynamic bearing device 101 in which the radial bearing face A is provided on the electroformed part 108 has been described, but a thrust bearing face (thrust bearing face B in this embodiment), in addition to the radial bearing face A, can be provided on the electroformed part 108. FIG. 15 shows an example (second constitutional example) of such a constitution, in which the electroformed part 108 is constituted of a radial electroformed part 1081 having the radial bearing face A, and a thrust the electroformed part 1082 having the thrust bearing face B formed integrally with the radial electroformed part 1081. By also providing the thrust bearing face B on the electroformed part 108 in such a manner, high rotational accuracy can be also obtained in the first thrust bearing portion T1 because of the above-mentioned characteristics of the electroforming process. The other constitutional components and functions are the same as in the hydrodynamic bearing device 101 shown in FIG. 11, and therefore are referred to as by the same reference numerals and their redundant explanation is omitted.

The bearing member 107 shown in FIG. 15 can be formed, for example, by using a master member 123 as shown in FIG. 16. This master member 123 is constituted of a first cylindrical portion 123a having a small diameter, and a second cylindrical portion 123b having a large diameter, which is continuous with the first cylindrical portion 123a in the axial direction. In the outer circumferential surface of the first cylindrical portion 123a, the masking 114 is applied to the surface excluding a partial axial region which is continuous with the upper end face of the second cylindrical portion 123b and the upper end face of the second cylindrical portion 123b. When an electroforming process is carried out by using this master member 123, the electroformed part 125 in which the radial electroformed part 1081 and the thrust electroformed part 182 are integrally formed is obtained. Moreover, by conducting insert molding using the electroformed part 125, the bearing member 107 shown in FIG. 15 is formed.

In the form shown in FIG. 15, the case where the radial electroformed part 181 and the thrust electroformed part 182 are an integral structure is shown as example, but the two components may be separate. When the two components are rendered separate, for example, the region in which of the masking 114 is formed may be changed.

The first and second constitutional examples of the hydrodynamic bearing device according to the second embodiment are shown above as examples, but the invention according to these embodiments is not limited to these constitutions, and can be suitably used in the constitutional examples of the hydrodynamic bearing devices shown below. In the description provided below, components and elements having the same functions as those in the embodiment shown in FIG. 11 are referred to as by the same reference numerals and their repeated explanation is omitted.

FIG. 17 is a cross-sectional view of the hydrodynamic bearing device 101 according to third constitutional example. The hydrodynamic bearing device 101 in this drawing has a constitution different from the hydrodynamic bearing device shown in this drawing mainly in that the second thrust bearing portion T2 is formed between an upper end face 107d on the outer diameter side of the bearing member 107 and a lower end face 103a1 of a plate member 103a in a disk hub 103 opposing this end face, and the sealing space S1 is formed between a tapering outer circumferential surface 107f of the bearing member 107 and of an inner circumferential surface 103b1 of a cylinder member 103b of the disk hub 103. In this drawing, a constitution in which only the radial bearing face A is provided on the electroformed part 108 is shown as an example, but a constitution similar to that of the embodiment shown in FIG. 15 may be also employed, in which either the thrust bearing face B which forms the first thrust bearing portion T1 or the thrust bearing face C which forms the second thrust bearing portion T2 is provided on the electroformed part 108 which integral with or separate from the radial bearing face A.

FIG. 18 shows another constitutional example (fourth constitutional example) of the hydrodynamic bearing device 101. The hydrodynamic bearing device 101 in this drawing has a constitution different from the embodiment shown in this drawing mainly in that flange portions 121, 122 are provided separately in two portions of the shaft member 102 in the axial direction; that thrust bearing portions T1, T2 are provided between one end faces of these two flange portions and both end faces 109a2, 109a3 of the bearing member 107; and that and the sealing space is provided in opening portions at both ends of the bearing member 107 and sealing spaces S2, S3 are provided between the outer circumferential surfaces 121a, 122a of the flange portions 121, 122 and the large-diameter inner circumferential surfaces of the bearing member 107. Similarly to the second constitutional example shown in FIG. 15, in this constitutional example, either the thrust bearing face B which forms the first thrust bearing portion T1 or the thrust bearing face C which forms the second thrust bearing portion T2 can be provided on the electroformed part 108 which integral with or separate from the radial bearing face A.

In the constitutional example shown above, hydrodynamic grooves in a herringbone pattern and a spiral pattern are shown as an example of the radial hydrodynamic pressure producing part, but the invention according to this embodiment is not limited to this. For example, a plurality of arcuate faces, axial grooves, or harmonic waveform surfaces may be provided as a radial hydrodynamic pressure producing part, and a so-called multi-arc bearing, step bearing, or non-cylindrical bearing may be employed (not illustrated) as either of the radial bearing portions R1, R2 or both of them. These hydrodynamic pressure producing parts can be formed on the electroformed part 108 of the bearing member 107 as in the above-mentioned embodiment. As the method of forming the hydrodynamic pressure producing part is based on the steps for forming the hydrodynamic grooves, so a detailed description thereof will be omitted.

While in the above-mentioned constructions two radial bearing portions are axially spaced apart from each other as in a case of the radial bearing portions R1 and R2, it is also possible to provide a single radial bearing portion extending over the vertical region of the inner peripheral surface of the bearing member 107, or three or more radial bearing portions.

While in the embodiment described above, the case where radial hydrodynamic pressure producing parts such as hydrodynamic grooves are formed in the electroformed part 108 which constitutes the bearing member 107 is shown as an example, but The radial hydrodynamic pressure producing parts can be also formed on an outer circumferential surface 102a1 of the shaft portion 102a which oppose the electroformed part 108 across the radial bearing gap by means of machining such as rolling and cutting, or by means of such as etching and ink jet printing. In this case, the electroformed part 108 is formed as a cylindrical surface with no surface asperities.

Further, while in the above description the thrust hydrodynamic pressure producing parts of a spiral configuration or a herringbone configuration are shown as examples, in the thrust hydrodynamic pressure producing part, a plurality of hydrodynamic grooves in the form of radial grooves can be provided at predetermined circumferential intervals and one or both of the thrust bearing portions T1, T2 can be formed by a so-called step bearing, a so-called corrugated bearing (with corrugated step form) or the like (not shown). Further, the thrust hydrodynamic pressure producing part may be formed at both end faces of the flange portion 102b which opposes the bearing member 107 and the lid member 110 across the thrust bearing gap, or in other portions.

While in the above description, lubricating oil is used as the lubricating fluid filling the inner space of the hydrodynamic bearing device 101, it is also possible to use some other fluid capable of generating dynamic pressure in each bearing gaps, for example, a magnetic fluid, or a gas such as air.

The third embodiment of the present invention will be described below with reference to FIGS. 19 to 26.

FIG. 19A shows a constitutional example of the fluid dynamic bearing device 201 according to the third embodiment of the present invention. This fluid dynamic bearing device 201 comprises, as main constitutional components, a shaft member 202, and a bearing member 203 having the shaft member 202 inserted at the inner periphery.

The bearing member 203 is formed of the electroformed part 204 formed by depositing nickel, copper and other metal ions on the surface of the master by the electroforming process, and a molding portion 205 formed by injection-molding a resin with this part inserted thereinto, in the form of a bottomed cylinder. In this constitutional example, the electroformed part 204 is formed by depositing nickel ions, and its hardness is about 200 Hv. An inner circumferential surface 204a of the electroformed part 204 is formed as a cylindrical surface having no surface asperities, and an inner bottom face 204b is formed as a flat surface having no asperities.

The shaft member 202 is made of metal material to have a constant diameter, and its lower end face 202b is formed in the shape of a convex sphere. On the outer circumferential surface 202a of the shaft member 202, regions which serve as radial bearing faces A1 which form a radial bearing gap 206 between themselves and the inner circumferential surface 204a of the electroformed part 204 are provided separately in two upper and lower portions, and recesses 207 which produce hydrodynamic pressure in a radial bearing gap 206 are formed on these radial bearing faces A1, respectively. In this constitutional example, the recesses 207 comprise inclined grooves 207a, 207b of different inclining directions, a plurality of which are arranged in the circumferential direction so as to form hydrodynamic pressure producing parts in a herringbone configuration.

This shaft member 202 is, as shown in FIG. 19B, roughly constituted of a core portion 208 and a surface layer portion 209 having the above radial bearing face A1 in its cross section in the radial direction. The surface layer portion 209 is formed so as to have hardness higher than the core portion 208. In this surface layer portion 209, the thickness d1 of the region demarcating the recesses 207 is at least twice the depth d2 the recesses 207 formed on the radial bearing face A1. Moreover, the surface layer portion 209 is formed so as to have a hardness higher than that of the electroformed part 204 by 100 Hv or more, more desirably 150 Hv or more, and is formed so as to have a hardness of 350 Hv or higher. That is, this surface layer portion 209 constitutes a high-hardness layer in the present invention. For example, when the electroformed part 204 is formed by depositing nickel ions and its hardness is about 200 Hv as mentioned above, it is formed so that the hardness of the surface layer portion 209 is 350 Hv or higher. While in FIG. 19B, the depth d2 of the recesses 207 and the thickness d1 of the surface layer portion 209 are exaggerated so as to facilitate understanding, and the actual depth d2 of the recesses 207 is approximately several µm to ten and several µm.

The manufacturing process of the above shaft member 202 will be described below with reference to drawings.

In this embodiment, the shaft member 202 is formed by the procedure comprising a rolling step (a) for forming the recesses 207 by rolling on the radial bearing face A1; a surface hardening process step (b) for forming the surface layer portion 209 by conducting a surface hardening process; and a barrel processing step (c) for subjecting a region which demarcates the recesses 207 to a barrel process.

(a) Rolling Step

FIG. 20 conceptionally shows a step for forming the recesses 207 on the outer circumferential surface 211a of the shaft material 211 constituting the above-mentioned shaft member 202 by rolling. Projection molds having a shape corresponding to the recesses 207 to be transferred to the shaft material 211 are provided on the rolling contact surface of either one or both of a pair of rolling dies 212, 213 (flat dies in the example illustrated) (not illustrated). Herein, a metallic material having low hardness of about 200 to 300 Hv is used as the shaft material 211. In general, when the hardness is 400 Hv or higher, highly accurate processing is difficult by the rolling process. Accordingly, by using such a shaft material 211, rolling ease can be increased to form the recesses 207 at high accuracy, and increased lifetime of the rolling dies 212, 213 can be also achieved.

When the rolling dies 212, 213 are relatively moved in a state that the shaft material 211 is nipped between the above-mentioned rolling dies 212, 213, the recesses 207 (hydrodynamic pressure producing parts) shown in FIG. 19A are formed by rolling in a region in the outer circumferential surface 211a of the shaft material 211 which serve as the radial bearing face A1. At this time, in the region where the recesses 207 are provided on the shaft material 211, a first work hardening layer 214a is formed by rolling, as shown in FIG. 21B. Simultaneously, a first work hardening layer 214b is also formed by rolling in part of the region demarcating the recesses 207.

Performing rolling causes the material which was originally in the recesses 207 to be extruded thereabout, and as shown in FIG. 21B, bulges of the material (elevated portions 215) are consequently formed at the edges of the region demarcating the recesses 207 is formed.

(b) Surface Hardening Process Step

After the recesses 207 are formed on the shaft material 211 by rolling, the thus-process shaft material 211 is subjected to a surface hardening process. Nitriding, carburizing, quenching, DLC and other known surface hardening process methods can be employed as the surface hardening process. In this embodiment, a nitriding process is employed, by which processing can be carried out at a temperature relatively lower (about 500 to 600° C.) than in hardening process methods requiring heat treatments at high temperatures such as carburizing and quenching, and less cost is required than in DLC. By selecting such a surface hardening process technique, deformation of the shaft material 211 in heat treatment can be suppressed, and highly accurate recesses 207 can be provided at low costs.

When a nitriding process is carried out, as shown in FIG. 21C, nitrogen is diffused and penetrated into the surface of the shaft material 211, and a nitriding layer 214 comprising a nitride of the material metal and nitrogen is formed. The nitriding layer 214 is formed in a manner of containing the first work hardening layers 214a, 214b formed by the rolling process. The hardness of this nitriding layer 214 is highest at its outermost surface (in general, 600 Hv or higher in this embodiment), and decreases toward the inside (core portion 208). The inventors of the present invention conducted analysis and found that if the nitriding process is proceeded in such a manner that the thickness d1 of the nitriding layer 214 in the demarcating region of the recesses 207 is twice the depth d2 of the recesses 207 or larger, a hardness of 350 Hv or higher can be stably obtained inside the demarcating region of the recesses 207. Therefore, by forming the nitriding layer 214 in such a mode, even if the regions which demarcate the recesses 207 are worn, a difference in hardness between the regions and the electroformed part 204 of the bearing member 203 of at least 100 Hv or higher, more strictly 150 Hv or higher, can be ensured.

Examples of specific techniques of nitriding process (including soft nitriding process) include gas nitriding and plasma nitriding, while for example, gas soft nitriding and salt bath soft nitriding, among others, can be selected as specific techniques of the soft nitriding.

Depending on the technique of the nitriding process, the nitriding layer 214, that is, the radial bearing face A1 of the shaft member 202 may have significantly high hardness. The inventors of the present invention conducted analysis and found that when the difference in hardness between the radial bearing face A1 and the electroformed part 204 is 1300 Hv or higher, aggression against the soft electroformed part 204 is increased, and so-called aggressive abrasion is produced, which increases the amount of abrasion. Accordingly, the nitriding process is desirably conducted so that the hardness of the radial bearing face A1 of the shaft member 202 is about 1500 Hv or lower.

(c) Barrel Processing Step

In this embodiment, the shaft material 211 is subjected to the nitriding process, and is then is subjected to a barrel process. For example, centrifugal barrel processing, fluid barrel processing, and a combination of these can be selected as the technique for the barrel processing. By conducting barrel processing, as shown in FIG. 22, elevated portion 215 formed around the recesses 207 is removed, and the outer circumferential surface 211a of the shaft material 211 (excluding the recesses 207) is leveled to be a smooth surface. Moreover, at this time, a surface processed by barrel processing is formed in at least the region of the elevated portion 215 in which in the surface of the region demarcating the recesses 207.

As the media used in barrel processing, those having the size of the shaft material 211, specifically, those having such a size that the inner bottom face and inner wall face of the recesses 207 are not affected by barrel processing, are used. Accordingly, work hardening by collision of the media occurs only in a region which demarcates the recesses 207, and the surface layer portion 209 in such a region is constituted of the first hardened layer formed in the preceding nitriding process and the second hardened layer 214c formed on its surface by barrel processing. This second hardened layer 214c is formed in a manner of overlapping the outermost layer portion of the nitriding layer 214 formed previously.

Metals, ceramics, resins and various other substances can be used as media for the barrel processing. From the perspective of forming the second hardened layer 214c by the barrel processing, media made of a metal or a ceramic having a relatively high hardness or a ceramic having a relatively high hardness are desirably used. The shape of the media may be spherical, polygonal, cylindrical (bar shape) and various other shapes.

When the recesses 207 are formed by rolling as in this embodiment, burr may occur on the peripheral edges 216 of the recesses 207 (refer to FIG. 22), but burr can be removed or the peripheral edges 216 of the recesses 207 can be chamfered to an appropriate degree by conducting a barrel processing using a medium having an appropriate dimension as mentioned above. Accordingly, abrasion (damage) of the electroformed part 204 while the bearing is in operation can be minimized.

In the manner described above, the shaft member 202 which is roughly composed of two sections: the core portion 208 and the surface layer portion 209 having a hardness higher than the core portion 208, in its cross section, is formed.

The fluid dynamic bearing device 201 is formed in the manner described above, and the inner space of the bearing member 203 into which the shaft member 202 is inserted is filled with, for example, a lubricating oil as the fluid (lubricating fluid).

In the fluid dynamic bearing device 201 having the above constitution, when the shaft member 202 rotates, the radial bearing face A1 of the outer circumferential surface 202a of the shaft member 202 opposes the inner circumferential surface 204a of the bearing member 203 (electroformed part 204) across the radial bearing gap 206. As the shaft member 202 rotates, the hydrodynamic pressure of the lubricating oil is generated in the radial bearing gap 206 by the recesses 207 formed on the radial bearing face A1 (hydrodynamic pressure producing part), and the shaft member 202 is supported by the pressure rotatably in the radial direction in a non-contact manner. Accordingly, a first radial bearing portion R11 and a second radial bearing portion R12 which support the shaft member 202 rotatably in the radial direction in a non-contact manner are formed.

When the shaft member 202 rotates, the lower end face 202b of the shaft member 202 is supported the inner bottom face 204b of the bearing member 203 in a contact manner. Accordingly, a thrust bearing portion T11 comprising a pivot bearing which supports the shaft member 202 rotatably in the thrust direction is formed.

As mentioned above, in this constitutional example, the radial bearing face A1 of the shaft member 202 is provided in the surface layer portion 209 formed so as to have a hardness of 350 Hv or higher, and the difference in hardness between radial bearing face A1 and the electroformed part 204 formed by depositing nickel ions having a hardness of about 200 Hv is 100 Hv or higher (more strictly, 150 Hv or higher). Therefore, when the bearing is in operation and at other times, abrasion resulting from a slight difference in hardness (especially, adhesive wear) can be minimized. Moreover, since the radial bearing face A1 is provided in the surface layer portion 209 formed so as to have a hardness of 350 Hv or higher, damages of the radial bearing face A1 of the shaft member 202 when integrated and at other occasions can be avoided. Furthermore, when the difference in hardness between the radial bearing face A1 and the electroformed part 204 is less than 100 Hv, failure mode when applied an impact load because of disturbance and the like suffer froms seizure, which may result in stopping of the bearing (locking). In contrast, if the difference in hardness between the two components mentioned above is imparted, slight abrasion may occur, but at least worst events such as stopping of the bearing and the like can be avoided.

In this constitutional example, since the recesses 207 (hydrodynamic pressure producing parts) which produce hydrodynamic pressure in the radial bearing gap 206 is provided on the radial bearing face A1, the shaft member 202 can be supported at high accuracy in the radial direction in a non-contact manner, and an increase in the amount of abrasion can be suppressed to a greater degree.

A constitutional example of the third embodiment has been described above, but the present invention is not limited to this constitutional example, and other constitutions may be also formed.

FIG. 23 shows the second constitutional example of the fluid dynamic bearing device 201 according to this embodiment. The fluid dynamic bearing device 201 shown in this drawing has a constitution different from that of the fluid dynamic bearing device shown in FIG. 19A in that the electroformed part 204 which constitutes the bearing member 203 is positioned on the inside diameter side, and that it is constituted of a the first electroformed part 241 which form the radial bearing gap 206 between an inner circumferential surface 241a of the electroformed part 204 and the radial bearing face A1 of the shaft member 202, and the second electroformed part 242 which covers the first electroformed part 241. In the form of the illustrated example, the first electroformed part 241 is formed so as to have a hardness higher than the second the electroformed part 242. This constitution is obtained by, for example, subjecting the first electroformed part 241 to an electroforming process using an electrolyte solution containing a reinforcement such as SiC (silicon carbide), and then conducting an electroforming process using an electrolyte solution containing no reinforcement.

In this case, since the first electroformed part 241 is formed so as to have a hardness of about 400 Hv, which is higher than that in the above-mentioned first embodiment, a constitution similar to that of the above-mentioned first constitutional example is obtained by forming the surface layer portion 209 whose hardness is at least 500 Hv or higher, more desirably 550 Hv or higher, on the shaft member 202. Otherwise, this embodiment is substantially the same as the constitution shown in FIG. 19A. Therefore, like reference numerals are used to denote like parts, and a redundant description thereof will be omitted.

In the above description, the recesses 207 are constituted of the inclined grooves 207a, 207b which have inclination directions different from each other, and these recesses 207 are arranged in a herringbone configuration to constitute the hydrodynamic pressure producing parts. However, the configuration of the hydrodynamic pressure producing parts may be other shapes as long as it can produce hydrodynamic pressure in the radial bearing gap 206. For example, the following configuration may be employed: the recesses 207 are formed by axial grooves, and these are arranged in the circumferential direction (in this case, the radial bearing portion is a step bearing); and the recesses 207 are formed so that the radial bearing gap 206 becomes a wedge-shaped gap (multi-arc bearing). Furthermore, the recesses 207 can be formed as dimples (holes), as well as grooves.

In the above description was described the case where the recesses 207 (hydrodynamic pressure producing parts) are provided on the outer circumferential surface 202a of the shaft member 202, and hydrodynamic pressure is generated in the radial bearing gap by the hydrodynamic pressure producing parts to constitute the radial bearing portions R11, R12 of the hydrodynamic bearing. However, by providing no recesses 207 on the radial bearing face A1 of the shaft member 202 and form the radial bearing face A1 to be a smooth surface, the radial bearing portions R11, R12 can be also constituted of cylindrical bearings (not illustrated). Even in this case, if the surface layer portion 209 whose hardness is different from that the electroformed part 204 by 100 Hv or more and which has a hardness of at least 350 Hv or higher is provided on the shaft member 202, the amount of abrasion resulting from the difference in hardness between the radial bearing face A1 of the shaft member 202 and the hardness of the electroformed part 204 can be reduced when it is brought into sliding contact with the electroformed part 204, whereby a lowered rotational accuracy can be avoided. Of course, in this case, there is no necessity to constitute the shaft member 202 of the core portion 208 and surface layer portion 209, which have different hardness, considering moldability of the recesses 207, and it suffices to use the shaft member 202 which meets the above conditions as a whole.

In the above description, the form in which the thrust bearing portion T11 is constituted of a pivot bearing is shown, but the thrust bearing portion T11 is not limited to the pivot bearing, and it can be also constituted of a hydrodynamic bearing, as well as radial bearing portion. When the thrust bearing portion is constituted of a hydrodynamic bearing, for example, a partial region of the shaft member 202 which opposes the inner bottom face 204b of the bearing member 203 (electroformed part 204) is formed so as to be a flat surface, and recesses (grooves) arranged in a herringbone configuration or other configurations may be provided on this flat surface or on the inner bottom face 204b of the electroformed part 204.

In the above description, the lubricating oil is shown as an example of the lubricating fluid filling the inside of the fluid dynamic bearing device 201, but fluids which can produce hydrodynamic pressure in the bearing gaps, for example, magnetic fluids and gases such as air, among others, can be also used as well.

The fluid dynamic bearing device 201 described above can be integrated and used in, for example, spindle motors for information appliances. A constitutional example in which the fluid dynamic bearing device 201 shown in FIG. 19A is integrated in a spindle motor will be described below with reference to FIG. 24.

FIG. 24 shows an example of a motor having the fluid dynamic bearing device 201 integrated therein. The motor shown in the this drawing is used, for example, as a spindle motor for disk drive units such as HDD, and comprises the fluid dynamic bearing device 201 which rotatably supports the shaft member 202, a rotor (disk hub) 231 provided on the shaft member 202 integrally or separately, a stator coil 232 and rotor magnet 233 which are, for example, caused to oppose each other across a gap in the radial direction, and a bracket 234. The stator coil 232 is attached to the outer periphery of the bracket 234, and the rotor magnet 233 is attached to the inner periphery of the disk hub 231. A single or a plurality of disks D1 (two in the illustrated example) are retained such as a magnetic disk on the disk hub 231. When the stator coil 232 is energized, the rotor magnet 233 is rotated by the electromagnetic force between the stator coil 232 and the rotor magnet 233, and accordingly the disks D1 retained on the disk hub 231 and disk hub 231 are rotated integrally with the shaft member 202.

The fluid dynamic bearing device 201 having the constitution according to this embodiment can be also integrated and used in motors other than the spindle motor described above. FIG. 25 shows an example thereof, and conceptually shows a fan motor integrated in a personal computer or the like and used for cooling heat sources. This fan motor has a constitution different from the above-mentioned spindle motor in that the rotor 36 attached to the shaft member 202 of the fluid dynamic bearing device 201 has integral blades. Otherwise, this embodiment is substantially the same as the constitution shown in FIG. 24 in terms of the components and functions. Therefore, like reference numerals are used to denote like parts, and a redundant description thereof will be omitted.

Example 1

To demonstrate the advantages of the invention according to this embodiment, abrasion test was performed in the mode shown in FIG. 26A. Abrasion test is a simplified test carried out by sliding rotating a body of rotation 291 corresponding to the electroformed part 204 under certain conditions (conditions similar to those under which the fluid dynamic bearing device is used) relative to a test piece 290 corresponding to the shaft member 202 shown in FIG. 19A to determine the amount of abrasion of the test piece 290 and the body of rotation 291. As the test piece 290, nine types of test pieces in which at least the surfaces slid against the body of rotation 291 are formed so as to have the hardnesses of 200 Hv, 280 Hv, 350 Hv, 520 Hv, 650 Hv, 920 Hv, 1180 Hv, 1530 Hv, and 1700 Hv were prepared. The number of samples of each test piece 290 is N=10, and the amount of abrasion shown in FIG. 26B is the average value thereof. As the body of rotation 291, one that is formed so as to have the hardness of 200 Hv in anticipation of the electroformed part 204 and is made of nickel was used.

The results of the abrasion test are shown in FIG. 26B. As can be clearly seen from this drawing, it is confirmed that the amount of abrasion significantly decreases from the point when the test piece 290 having a hardness of 350 Hv or higher is used, that is, from the point when the difference in hardness between the two components is 150 Hv or higher. In contrast, it is confirmed that the amount of abrasion is increased when the test piece 290 having a hardness of 1530 Hv or higher is used, that is, when the difference in hardness between the two components is 1300 Hv or higher.

The fourth embodiment of the present invention will be described below with reference to FIGS. 27 to 36.

FIG. 27 conceptionally shows a fan motor having the fluid dynamic bearing device 301 according to the fourth embodiment of the present invention integrated therein. This fan motor comprises a fluid dynamic bearing device 301 which rotatably supports a shaft member 302, blades which rotate with the shaft member 302, a rotor 303 which is fixed on the shaft member 302, and a stator coil 304 and a rotor magnet 305 which are caused to oppose each other, for example, across a gap in the radial direction. In general, such a motor is referred to as a radial gap type fan motor. The stator coil 304 is attached to the outer periphery of the bracket 306, while the rotor magnet 305 is attached to the rotor 303. A bearing member 307 of the fluid dynamic bearing device 301 is fixed to the inner periphery of the bracket 306. When the stator coil 304 is energized, the rotor 303 rotates integrally with the shaft member 302 by the electromagnetic force between the stator coil 304 and the rotor magnet 305. Although not illustrated, the motor may be in such a form of the so-called axial gap type fan motor, in which the stator coil 304 and the rotor magnet 305 are caused to oppose each other across a gap in the axial direction.

While the blades are in rotation, a thrust in the direction of the arrow Y in the FIG. 27 is exerted on the shaft member 302 as a reaction force of its blowing action. A magnetic force (repulsive force) in such a direction that cancels this thrust is exerted between the stator coil 304 and the rotor magnet 305, and a thrust load produced by the difference in dimension between this thrust and the magnetic force is supported by a thrust bearing portion T21 of the fluid dynamic bearing device 301. A radial load exerted on the shaft member 302 is supported by radial bearing portions R21, R22 of the fluid dynamic bearing device 301.

FIG. 28 is an expanded sectional view of the fluid dynamic bearing device 301 shown in FIG. 27. This fluid dynamic bearing device 301 comprises, as main components, the shaft member 302 and the bearing member 307 having the shaft member 302 inserted at its inner periphery. Moreover, this fluid dynamic bearing device 301 comprises a lubricant reservoir 310 which provides a lubricating fluid (for example, lubricating oil) in the radial bearing gap formed between the outer circumferential surface 302a of the shaft member 302 and the inner circumferential surface 307a of the bearing member 307 as the shaft member 302 rotates. For the sake of explanation, the opening side of the bearing member 307 is referred to as the upper side, and the side opposite to this in the axial direction is referred to as the lower side in the description below.

The shaft member 302 is formed, for example, of a metallic material such as stainless steel into a solid shaft whose one end has the from of a convex sphere. The shaft member 302 shown in this embodiment is formed so as to have its outer circumferential surface 302a in the shape of a perfect circle in cross section free from asperities, and the lower end face 302b in the shape of a convex sphere.

On the outer periphery of the upper end of the shaft member 302, the rotor 303 on the outer circumferential surface having, for example, blades on its outer circumferential surface is fixed. The rotor 303 is constituted of a disk portion 303a which is in the shape of a disk, and A cylindrical cylinder member 303b extending downward from the outer diameter side of the disk portion 303a. The rotor magnet 305 shown in FIG. 27 is attached to the inner circumferential surface of the cylinder member 303b. The rotor 303 can be formed integrally with the shaft member 302 by, for example, by injection-molding of a resin with the shaft member 302 inserted thereto. There are no particular limitations regarding the configuration, mounting method, etc. of the rotor 303 as long as the rotor 303 can rotate integrally with the shaft member 2; for example, it can also be fixed to the shaft member 302 by adhesion or press-fitting. Further, it is also possible for the rotor 303 to be formed of a metal material or a ceramic, as well as a resin material.

The bearing member 307 is constituted of an electroformed part 308 in the form of a bottomed cylinder comprising an electroformed metal formed by the electroforming process described later, and a resin portion 309 formed by injection-molding using the electroformed part 308 as an insert. The resin portion 309 is constituted of a cylindrical side portion 309b, a protrusion 309a in the form of an approximate hemisphere protruding upwardly from the upper end of the side portion 309b and having an opening at its top, and a bottom 309c which seals an opening at the lower end of the side portion 309b. The members 309a to 309c are formed as an integral component with no interfaces.

The inner periphery of the protrusion 309a is sectioned into two regions in the axial direction, and its upper region is formed on a tapered face 309a1 whose diameter gradually increases from bottom to top, while its lower region is formed on a curved surface 309a2 whose diameter gradually increases from top to bottom. The tapered face 309a1 forms a sealing gap S21 between itself and the outer circumferential surface 302a of the shaft member 302, and the curved surface 309a2 forms a lubricant reservoir 310 which provides lubricating oil in the radial bearing gap between itself and the outer circumferential surface 302a of the shaft member 302. The area of a cross section of this lubricant reservoir 310 in the radial direction gradually decreases from bottom to top. The capacity of the lubricant reservoir 310 is equal to desirably or greater than that of a gap (space) formed at least between the inner circumferential surface 307a and inner bottom face 307b of the bearing member 307 and the outer circumferential surface 302a and lower end face 302b of the shaft member 302, and is more preferably three times that of the gap or greater, to allow retaining a sufficient amount of the lubricant.

Two (upper and lower) regions which serve as the radial bearing faces of the radial bearing portions R21, R22 are provided separately in the axial direction on the inner circumferential surface (the inner circumferential surface of the electroformed part 308) 307a of the bearing member 307, and as shown in FIG. 29, a plurality of hydrodynamic grooves 307a1, 307a2 arranged, for example, in a herringbone pattern are formed as hydrodynamic pressure producing parts in the these two regions, respectively. The upper hydrodynamic grooves 307a1 are formed asymmetrically in the axial direction relative to the axial center (axial center of the region between the upper and lower inclined grooves) m2, and the axial dimension X21 of the region above the axial center m2 is larger than the axial dimension X22 of the region therebelow. Meanwhile, the lower hydrodynamic grooves 307a2 are formed symmetrically in the axial direction, and the axial dimensions of the upper and lower regions of the grooves are equal to the above axial dimension X22. In this case, while the shaft member 302 is in rotation, the upper hydrodynamic grooves 307a1 has relatively greater drawing force (pumping force) of the lubricating oil by the hydrodynamic grooves than the symmetrical lower hydrodynamic groove 307a2. In case where the pumping force is unnecessary, the upper hydrodynamic grooves 307a1 can be rendered symmetrical in the axial direction as the lower hydrodynamic grooves 307a2. The configuration of the hydrodynamic grooves may be, for example, a spiral configuration, as well as the above-mentioned herringbone configuration.

The inner bottom face 307b of the bearing member 307 (the electroformed part 308) serves as the thrust bearing face of the thrust bearing portion T21, and is formed to be a flat plane in this embodiment.

Fluid dynamic bearing device 301 comprises the components mentioned above, and the inner space of the bearing member 307, including the lubricant reservoir 310, is filled with the lubricating oil as a lubricating fluid. At this time, the oil level of the lubricating oil is maintained within the range of the sealing gap S21 formed between the outer circumferential surface 302a of the shaft member 302 and the tapered face 309a1 of the bearing member 307 of the protrusion 309a.

The fluid dynamic bearing device 301 is integrated into a motor after it is formed In the manner described above. Integration of the fluid dynamic bearing device 301 into the motor can be carried out, for example, by securing the bearing member 307 of the fluid dynamic bearing device 301 at the inner periphery of the bracket 306 formed of an aluminum alloy and of a metallic material such as stainless steel by means of adhesion, press fitting, press fitting adhesion or the like.

The retaining member 306 shown in FIG. 2 is constituted of a cylindrical side portion 306a, a base portion 306b extending from the lower end of the side portion 306a to the outer diameter side, and a cylinder member 306c extending upwardly from the outer diameter end of the base portion 306b. The components 306a to 306c are formed as an integral part having no interfaces. This retaining member 306 also functions as a casing for accommodating the structural components of the fan motor, and the base portion 306b constitutes the bottom of the fan motor, and the cylinder member 306c constitutes the side portion of the fan motor.

In the fluid dynamic bearing device having the above constitution 301, when the shaft member 302 rotates, the regions formed separately in two (upper and lower) portions of the inner circumferential surface of the bearing member 307, which serve as the radial bearing faces, oppose the outer circumferential surface 302a of the shaft member 302 across the radial bearing gap, respectively. As the shaft member 302 rotates, the hydrodynamic pressure of the lubricating oil is generated in the radial bearing gap, and the oil film rigidity of a film of the lubricating oil generated in the radial bearing gap by the pressure is increased so that the shaft member 302 is supported rotatably in the radial direction in a non-contact manner. Accordingly, the first radial bearing portion R21 and the second radial bearing portion R22 which support the shaft member 302 rotatably in the radial direction in a non-contact manner are formed. Simultaneously, the thrust bearing portion T21 which rotatably supports the shaft member 302 in the thrust direction between the lower end face 302b of the shaft member 302 and the inner bottom face 307b of the bearing member 307 is formed.

Subsequently, the above of the fluid dynamic bearing device 301 manufacturing process will be described, focusing on the manufacturing process of the bearing member 307 with reference to the drawings.

FIGS. 30A to 30C partly show the manufacturing process of the bearing member 307 in the above fluid dynamic bearing device 301. More specifically, FIG. 30A shows a step of producing the master shaft 311; FIG. 30B shows a step of masking required portions of the master shaft 311; and FIG. 30C shows a step of forming the electroformed member 313 by conducting an electroforming process. After conducting these steps, the bearing member 307 is produced by a procedure comprising a step of molding the electroformed part 308 of the electroformed member 313 using a resin to form the resin portion 309, a step of forming the protrusion 309a having a predetermined shape on the resin portion 309, and a step of peeling the electroformed part 308 from the master shaft 311 to separate the electroformed part 308 and the master shaft 311.

In the step shown in FIG. 30A, the master shaft 311 formed of a conductive material, for example, stainless steel subjected to a quenching process, nickel-chromium steel, other nickel alloys, chromium alloys or the like in the form of a solid shaft is formed. The master shaft 311 can be also formed of non-metallic materials such as ceramics which has been subjected to a conductive treatment (for example, forming a conductive coating on the surface), as well as these metallic materials.

A molding portion N2 which molds the electroformed part 308 of the bearing member 307 is formed on the master shaft 311. In this embodiment, the molding portion N2 in a partial region of the outer circumferential surface 311a and the lower end face 311b of the master shaft 311. The outer circumferential surface 311a has the shape of the inverse of the pattern of projections and recesses on the inner circumferential surface of the electroformed part, and in two portions in the axial direction thereon, rows of recesses 311a1, 311a2 in a herringbone configuration which form a bulging portion between the hydrodynamic grooves 307a1 and 307a2 are formed in the circumferential direction. The lower end face 311b is formed to be a smooth plane. The configuration of the recesses 311a1, 311a2 may be a spiral configuration or others with correspondence to the configuration of the hydrodynamic grooves.

In the masking step shown in FIG. 30B, a masking 312 (shown by the dotted pattern in the FIG. 30B) is applied onto the outer surface of the master shaft 311, excluding the molding portion N2. An existing product which is non-conductive and resistant to corrosion by electrolyte solutions is selected and used as a covering material for the masking 312.

The electroforming process is conducted by immersing the master shaft 311 into an electrolyte solution containing metal ions such as Ni and Cu, and then energizing the master shaft 311 to cause a target metal to electrolytically deposit on the molding portion N2 in which the masking 312 is not applied in the outer surface of the master shaft 311. The electrolyte solution may contain sliding material such as carbon, stress relief materials such as saccharin, if necessary, among others. The type of the electrolytically deposited metal of the fluid dynamic bearing device is suitably selected depending on the hardness, fatigue strength and other physical properties and chemical properties required for the bearing face.

The electroformed part 308 can be also formed by methods based on electroless plating, as well as the methods based on electrolytic plating mentioned above. In such a case, conductivity of the master shaft 311 and insulation of the masking 312 are unnecessary.

By carrying out the steps mentioned above, as shown in FIG. 30C, the electroformed member 313 in which the electroformed part 308 is deposited in the form of a bottomed cylinder in the molding portion N2 of the master shaft 311 is formed. At this time, the configuration of the recesses 311a1, 311a2 formed in the molding portion N2 is transferred onto the inner circumferential surface of the electroformed part 308, and a plurality of the hydrodynamic grooves 307a1, 307a2 shown in FIG. 29 are formed separately in the axial direction. If the thickness of the electroformed part 308 is too large, peeling property from the master shaft 311 is lowered, while on the other hand, if it is too small, durability of the electroformed part 308 is lowered, Therefore, it is set to an optimum thickness depending on required bearing performance, bearing size, and applications (about 10 μm to 200 μm).

Subsequently, the electroformed member 313 formed in the above step is transported to be subjected to the molding step. Although not illustrated, in the molding step, the electroformed member 313 is set in a predetermined mold (injection molding mold) as an insert, and then the resin portion 309 which constitutes the bearing member 307 is injection-molded. After the injection of the resin material, the resin material is cured and removed from the mold, obtaining a molded article in which the electroformed member 313 comprising the master shaft 311 and the electroformed part 308, and the resin portion 309, are integrated as a single part, as shown in FIG. 31. At this stage, the resin portion 309 has a diameter larger than side portion 309b, and has a cylindrical portion 309a' having an approximately cylindrical shape and extending upwardly from the upper end of the side portion 309b. In a partial upper region of the inner circumferential surface of the cylindrical portion 309a', a tapered face 309a1' whose diameter gradually increases from bottom to top in the axial direction is formed, The angle of inclination a of the tapered face 309a1' relative to the axis in this state is set to an appropriate angle of inclination in the step described later so that the tapered face 309a1 having a predetermined angle is obtained in forming the protrusion 309a shown in FIG. 28. Moreover, a tapered face 309a3' whose diameter gradually decreases from bottom to top in the axial direction is formed on the outer circumferential surface of the cylindrical portion 309a'.

Because of the characteristics of the electroforming process, the outer surface of the electroformed part 308 is formed to be rough. Accordingly, when the resin portion 309 is formed by injection-mold, the resin material enters into minute asperities on the outer surface of the electroformed part 308, and the electroformed part 308 and the resin portion 309 are firmly stuck to each other by the so-called anchor effect.

A base resin constituting the resin portion 309 is desirably a resin which can be formed by injection molding, and has high heat resistance and ductility, in view of moldability in the following step. For example, crystalline resins such as polybutylene terephthalate (PBT), liquid crystal polymer (LCP) and polyether ether ketone (PEEK), and noncrystalline resins such as polysulfone (PSU), polyethersulfone (PES), and polyphenylsulfone (PPSU), polyamideimide (PEI) are usable. These are merely examples of usable base resins, and of course, other base resins can be also used. The resin material may contain, if necessary, various kinds of fillers such as reinforcements (regardless of whether fibrous, powder, etc.) conductive agents, and lubricants, singly or in combination of two or more kinds.

The above-mentioned molded article is transported to be subjected to the step of forming the protrusion 309a shown in FIG. 28. In this step, the radially inward pressurizing force is applied with heating to deform the cylindrical portion 309a' of the resin portion 309, whereby the protrusion 309a having the form shown in FIG. 28 is formed.

Specifically, as shown in FIG. 32A, among the stationary mold 315 and a movable mold 316 which are coaxially disposed, the molded article is disposed on the inner periphery of the stationary mold 315 and positioning is carried out. The tip portion of the movable mold 316 is formed approximately cylindrically, and at its inner periphery, the outer periphery tapered face 309a3' of the cylindrical portion 309a', and a curved surface 316a which is in conformity with the outer diameter curved surface when the cylindrical portion 309a' is deformed. In the movable mold 316, at least the curved surface 316a is heated by a heat source, or has a heat source, which is not illustrated. At this time, from a perspective of softening the cylindrical portion 309a' to increase the ease and the precision of the process, rendering the protrusion 309a into a kind of permanent set state by modifying the resin, and preventing deformation of the protrusion 309a during use, the temperature (heating temperature) of the curved surface 316a is desirably set to be not lower than the glass transition temperature of the selected base resin. For example, when the resin portion 309 is formed from a resin composition containing polybutylene terephthalate PBT) as the base resin, the curved surface 316a may be heated at a temperature of 60° C. or higher, since the glass transition temperature of PBT is 60° C. The resin portion 309 (cylindrical portion 309a') can be heated not only by heating the movable mold 316, but also by providing a separate heat source and directly heating the same, and further both the movable mold 316 and the resin portion 309 can be heated.

When the above-mentioned movable mold 316 is brought close to the stationary mold 315 and in contact with the cylindrical portion 309a' of the molded article, the cylindrical portion 309a' is softened by the heat imparted via the contacting portion. When the mold is then clamped, the radially inward pressurizing force is imparted to the cylindrical portion 309a', the tip portion of the cylindrical portion 309a' is deformed by this pressurizing force while the cylindrical portion 309a' is guided by the curved surface 316a. The mold is further clamped until the inner periphery tapered face 309a1' comes in contact with outer circumferential surface 311a of the master shaft 311 as shown in FIG. 32B. Thereafter, as shown in FIG. 32C, the mold is opened and the pressurizing force is released, whereby the inner periphery of the cylindrical portion 309a' is slightly increased in diameter by the spring back of the resin portion 309, and the protrusion 309a having the tapered face 309a1, and curved surface 309a2 shown in FIG. 28 is formed. A this time, since the amount of spring back especially of the tapered face 309a1 determines the shape of the sealing gap S21, heating temperature, heating time, applied pressure and other process conditions are set so that the sealing gap S21 having a specific dimension is obtained so that the sealing gap S21 having a specific dimension is obtained. Mold clamping only in the straight line direction may cause variation in the pressurizing force applied to the components in the circumferential direction, and therefore it may not be able to form the protrusion 309a throughout its circumference in the same shape. Accordingly, before the mold is opened, it is desirable to relatively rotate the movable mold 316 and the molded article to apply a shearing force in the circumferential direction (tangent direction) to the cylindrical portion 309a'.

This molded article is then transported to be subjected to the separation step. In the separation step, the electroformed part 308 is peeled from the surface of the master shaft 311, whereby they are divided into an article (bearing member 307) in which the electroformed part 308 and resin portion 309 are united, and the master shaft 311. In this separation step, for example, the master shaft 311 or the bearing member 307 is impacted to expand the inner face of the electroformed part 308 in diameter in the radial direction and the axial direction and form a fine gap (about 1 μm to several μm) between itself and the outer surface of the master shaft 311, and the master shaft 311 is withdrawn from the inner face of the electroformed part 308. Otherwise, the electroformed part 308 can be peeled from the master shaft 311 by utilizing a difference in the amount of thermal expansion between the electroformed part 308 and the master shaft 311.

The shaft member 302 produced separately from the master shaft 311 is inserted into the bearing member 307 which has been separated from the master shaft 311 in the manner mentioned above, and the inner space of the bearing member 307 is filled with the lubricating oil, whereby the fluid dynamic bearing device 301 shown in FIG. 28 is accomplished. The separated master shaft 311 can be repeatedly used in the electroforming process, and therefore highly accurate bearing member 307 can be produced in quantity stably and at low costs.

In the above description, the protrusion 309a is formed is formed before the electroformed part 308 is peeled off from the master shaft 311, but the protrusion 309a can be also formed by using the molds 315, 316 similar to that mentioned above after the shaft member 302 is inserted into the bearing member 307.

As shown in the above, in this embodiment, the lubricant reservoir 310 is provided adjacent to the sealing space S and radial bearing gap between the protrusion 309a of the resin portion 309 and the outer circumferential surface 302a of the shaft member 302 by deforming the resin portion 309 formed by injection-molding with heating. Therefore, the number of parts and assembling man-hour can be fewer than in a conventional constitution in which these are provided between a separate component fixed on the bearing member and the shaft member, thereby achieving cost reduction of the fluid dynamic bearing device 301. Since the protrusion 309a is not formed by machining such as cutting, cutting powder is not produced, and therefore a step of removing cutting powder can be dispensed with. Cost reduction of the fluid dynamic bearing device 301 can be also achieved.

In this constitutional example, the inner circumferential surface 307a (radial bearing face) of the bearing member 307 facing the radial bearing gap face, and the inner bottom face 307b (thrust bearing face) which is in sliding contact with the lower end face 302b of the shaft member 302 are formed on the electroformed part 308, which is a metal layer. Because of the characteristics of the electroforming process, in the electroformed part 308, the precision of the inner face which is contact with master shaft 311 is formed on a dense face having the shape of the surface of the master shaft 311 transferred at high accuracy. Therefore, by forming, of all outer surface of the master shaft 311, especially the molding portion N2 at high accuracy, the precision the inner circumferential surface 307a, and inner bottom face 307b including the hydrodynamic grooves 307a1, 307a2 can be easily increased without conducting any special finishing process. Since the radial bearing face and thrust bearing face are metal faces, changes in temperature and characteristics due to abrasion and other causes are inhibited in the radial bearing portion, abrasion resistance is increased in the thrust bearing portion, whereby the long-life fluid dynamic bearing device 301 can be obtained at low costs.

A constitutional example of the fluid dynamic bearing device 301 according to the fourth embodiment of the present invention has been described above, but the constitution is not limited to the fluid dynamic bearing device 301 having the above-described form, and can be favorably used for the fluid dynamic bearing device having other forms. The constitutional examples thereof will be described below with reference to drawings. For simplification of description, having the components, and parts the same constitutions and functions as in the forms shown above will be denoted by the same reference numerals, and redundant explanation will be omitted.

FIG. 33 shows the second constitutional example of the fluid dynamic bearing device 301. The fluid dynamic bearing device 301 shown in this Fig. is integrated and used in a fan motor, as the fluid dynamic bearing device shown in this drawing, and its constitution is different from the fluid dynamic bearing device shown in FIG. 28 mainly in that the above-mentioned retainer 306 is formed integrally with resin portion 309 of the bearing member 307.

FIG. 34 shows the third constitutional example of the fluid dynamic bearing device 301. The constitution of the fluid dynamic bearing device 301 shown in this drawing is different from that of the fluid dynamic bearing device shown in FIG. 28 mainly in that the bearing member 307 is constituted of the housing 317 (resin portion) made of a resin and the separate bearing sleeve 318 fixed at the inner periphery of the housing 317. Also in this constitutional example, the retainer 306 can be formed integrally from the resin portion 309 as in the constitution shown in FIG. 33.

The constitution in which the electroformed part 308 and the bearing sleeve 318 are provided at the inner periphery of the bearing member 307 is shown above as an example, but the electroformed part 308 and bearing sleeve 318 may not be provided at the inner periphery of the bearing member 307 and the bearing member 307 may be constituted of a resin solely.

In the constitutional example shown in the above, of all surface of the protrusion 309a, the curved surface 309a2 which faces the lubricant reservoir 310 is rendered a smooth surface, but the curved surface 309a2 may have other constitutions than the smooth surface. FIG. 35 shows an example thereof (fourth constitutional example), in which a spiral groove 319 is provided on the curved surface 309a2 of the protrusion 309a. The direction of the spiral groove 319 is the direction in which the lubricating oil is drawn into the bearing gap while the shaft member 302 is in rotation. By providing the spiral groove 319 on the curved surface 309a2 of the protrusion 309a in such a manner, the lubricating oil is drawn toward the inside of the bearing member 307, that is, in the direction away from the sealing gap S21 when the bearing is in operation, which achieves further increase in the sealing performance. Although not illustrated, in the constitutional examples shown in FIGS. 33 and 34, the spiral groove 319 can be provided on the curved surface 309a2 of the protrusion 309a, as in this constitutional example. Moreover, as in the constitutional example shown in FIG. 33, the portion which serves as the retaining member 306 can be formed integrally with the resin portion 309.

In the constitutional example shown above, the lower region of the cylindrical portion 309a' is formed to have a constant thickness in the axial direction, but this may increase the elasticity of the cylindrical portion 309a' so that the protrusion 309a having a desired shape may not be formed. In particular, when the spiral groove 319 is formed with depth in the constitution in which the spiral groove 319 is provided on the curved surface 309a2 of the protrusion 309a, the degree of forced extraction increases. Therefore, the precision the shape of the spiral groove 319 may be lowered.

To avoid such an situation, although not illustrated, it is desirable that the entire outer circumferential surface of the cylindrical portion 309a' is formed in a tapered face which gradually contracts in diameter from bottom to top in the axial direction, the region in which the spiral groove 319 is formed in the inner circumferential surface is formed to be a tapered face which gradually expands in diameter from bottom to top in the axial direction (the cylindrical portion 309a' is gradually decreased in thickness from bottom to top). By providing this constitution, the cylindrical portion 309a' is easily deformed, and the protrusion 309a having a desired shape can be easily formed. In molding of the cylindrical portion 309a', a so-called draft is ensured and lowered precision of the cylindrical portion 309a', especially of the spiral groove 319 can be avoided.

In the above, the case where the fluid dynamic bearing device 301 having the constitution according to this embodiment is integrated and used in a fan motor has been described, but the fluid dynamic bearing device 301 having the constitution according to this embodiment can be integrated and used not only in fan motors, but also in spindle motors of magnetic disks, polygon scanner motors of laser beam printers (LBP), among others.

A spindle motor for a magnetic disk apparatus for HDD and other apparatuses having the fluid dynamic bearing device 331 according to this embodiment integrated therein is shown in FIG. 36 as an example. In this spindle motor, unlike in the fan motor shown in FIG. 27, a disk hub 323 on which one or a plurality of disks D2 are mounted is fixed to the upper end of the shaft member 302.

In the above description, the constitution in which the hydrodynamic pressure is produced by the hydrodynamic grooves arranged in a herringbone pattern or a spiral pattern is shown as an example as the constitution of the radial bearing portions R21, R22, but the invention according to this embodiment is not limited to this constitution. For example, so-called multi-arc bearings, step bearings, and non-cylindrical bearings may be also employed as the radial bearing portion R21, R22. In these bearings, a plurality of arcuate faces, axial grooves and harmonic waveform surfaces are formed in the regions which serve as the radial bearing face, respectively (not illustrated).

In the above description, the constitution such that the radial bearing portions are provided in two portions separate in the axial direction, as the radial bearing portions R21, R22 is provided, but the radial bearing portions may be provided in one portion or three or more portions in the axial direction.

In the above description, the case where the hydrodynamic pressure producing parts are formed on the inner circumferential surface 307a of the bearing member 307 is shown as an example, but the hydrodynamic pressure producing parts may be provided on the outer circumferential surface 302a of the shaft member 302 which opposes the inner circumferential surface 307a across the radial bearing gap. In this case, the inner circumferential surface 307a of the bearing member 307 is formed as a cylindrical surface with no surface asperities.

In the above description, there is shown as an example a case where the hydrodynamic pressure producing parts are provided on the inner circumferential surface 307a of the bearing member 307 or the outer circumferential surface 302a of the shaft member 302, and the hydrodynamic pressure is generated in the radial bearing gap by the hydrodynamic pressure producing parts and the radial bearing portions R21, R22 are constituted of the hydrodynamic bearings. However, forming the inner circumferential surface 307a of the bearing member 307 so as to be a cylindrical surface with no asperities, and forming the outer circumferential surface 302a of the shaft member 302 so as to have a perfectly circular cross section free of asperities allows the radial bearing portions R21, R22 to be constituted of cylindrical bearings (not illustrated).

Furthermore, in the above description, the form in which the thrust bearing portion T21 is constituted of a pivot bearing is shown as an example, but, for example, forming the lower end of the shaft member 302 so as to be a flat surface, and providing a plurality of hydrodynamic grooves or the like arranged in a spiral configuration or a herringbone configuration this flat surface or the end face of the bearing member opposing this allows constructing the thrust bearing portion constituted of the hydrodynamic bearings (not illustrated).

In the above description, the lubricating oil is used as the lubricating fluid, but other fluids which can form a film of a lubricating fluid, for example, lubricating greases, magnetic fluids, among others, can be also used.

The fifth embodiment of the present invention below will be described below with reference to FIGS. 37 to 45.

FIG. 37 is a cross-sectional view of a hydrodynamic bearing device 401 according to a constitutional example of the fifth embodiment. The hydrodynamic bearing device 401 is constituted of a bearing 403 which serves as a fixing-side member, and a shaft member 402 inserted at the inner periphery of the bearing 403 and serving as a rotation side portion member. Radial bearing faces A31 and A32 are formed on the inner circumferential surface 403a of the bearing 403 separately in the axial direction, and a radial bearing gap is formed between the radial bearing faces A31, A32 and the outer circumferential surface 402a of the shaft member 402.

The bearing 403 is constituted of a metal part 404, and a resin portion 405 retaining the metal part 404 at its inner periphery, and is formed by injection molding of a resin using the metal part 404 as an insert. Hydrodynamic pressure producing parts G1, G2 formed on the radial bearing faces A31, A32 are uneven surfaces such as herringbone hydrodynamic grooves. As show in the expanded drawing, of all surface of the hydrodynamic pressure producing part G1 (G2), a first region G11 (G21) is formed on the inner circumferential surface 404a of the metal part 404, and a second region G12 (G22) is formed on the inner circumferential surface 405a of the resin portion 405. In this embodiment, the first region G11 (G21) is a convex surface, and the second region G12 (G22) is a concave surface. The first region G11 (G21) is closer to the outer circumferential surface 402a of the shaft member 402 than the second region G12 (G22) is.

An example of the manufacturing process of the bearing 403 will be described below. The bearing 403 is manufactured by the procedure comprising a step of forming by deposition the metal part 404 on the outer circumferential surface of the master shaft 407 (electroforming process step), a step of molding the resin portion 405 using the metal part 404 and master shaft 407 as inserts (insert molding step), and a step of separating the bearing 403 and the master shaft 407 (separation step).

The master shaft 407 is formed, for example, from stainless steel which has been subjected to a baking process into a cylindrical shape. Materials of the master shaft 407 are not limited to that mentioned above, and can be optionally selected as long as it has masking property, conductivity and chemical resistance. Usable examples include such metallic materials as chromium-based alloys and nickel-based alloys, as well as non-conductive materials such as ceramics if they are coated by conductive resins and the like. Moreover, when the master shaft 407 is used as the shaft member 402, the materials are desirably those having satisfactory mechanical strength, rigidity, sliding property and heat resistance in addition to the above characteristics. In this case, to improve the sliding property with the bearing 403, for example, a fluorine-based resin coating is desirably applied.

The master shaft 407 may be a solid shaft, hollow shaft, or a solid shaft whose hollow portion is filled with other materials (resins, etc.). Moreover, since the precision of the outer circumferential surface of the master shaft 407 directly affects the surface accuracy of the first regions G11, G21 and second regions G12, G22 constituting the hydrodynamic pressure producing parts G1, G2 of the bearing 403, it is desirable that the outer circumferential surface of the master shaft 407 is finished at as high accuracy as possible.

In the outer surface of the master shaft 407, masking is applied in advance to the portion excluding the region in which the metal part 404 is expected to be formed. In this embodiment, as shown in FIG. 38, the case where masked portion 408 is formed in a herringbone configuration is shown as an example. As a coating for forming the masked portion 408, a material which is non-conductive and resistant to corrosion caused by electrolyte solutions is selected and used.

The electroforming process step is conducted by immersing the master shaft 407 which has been subjected to the above process into an electrolyte solution, and by energizing the electrolyte solution to cause a target metal to deposit on the surface of the master shaft 407. One that contains a metal which is a deposition material of the metal part 404 (for example, Ni, Cu, etc.) is used as an electrolyte solution. The type of the above deposition metal is suitably selected depending on the required characteristics, such as hardness or resistance to a lubricating oil (oil resistance) and other properties required for the bearing faces A31, A32. Moreover, the electrolyte solution may contain, if necessary, a sliding material such as carbon, and a stress relief material such as saccharin. In such a manner, the electroformed metal (metal part) 404 having a herringbone configuration is formed by deposition on the outer circumferential surface of the master shaft 407 as in FIG. 39. This step can be conducted not only by the so-called electrolytic plating, in which the solution is energized as mentioned above, but also by the so-called electroless plating, in which the object metal is caused to deposit without energizing the solution. At this time, as the coating of the masked portion 408, a material on which surface the object metal is not deposited is used.

The metal part 404 and master shaft 407 (hereinafter referred to as an electroformed shaft 409) produced by the above steps are provided in the mold forming the resin portion 405 as an insert.

FIG. 40 conceptionally shows the insert molding step of the resin portion 405, and a runner 412, a gate 413, and a cavity 414 are provided in a mold comprising a stationary mold 410 and a movable mold 411. In this embodiment, the gates 413 are point-like gates, and are formed on the molding surface of the forming mold (stationary mold 410) in several portions (for example, three portions) at regular intervals in the circumferential direction. The gate areas of the gates 413 are set to have appropriate values depending on the viscosity of the molten resin to be charged and the shape of the molded article.

In the mold having the above constitution, the movable mold 411 is brought close to the stationary mold 410 and clamped in a state that the electroformed shaft 409 is positioned in a predetermined position. In such a state, for example, a molten resin P of a liquid crystal polymer (LCP) is injected and charged into the cavity 414 via a sprue (not illustrated), the runner 412, and the gate 413, and the resin portion 405 is formed integrally with the electroformed shaft 409.

The molten resin P may contain various kinds of fillers. For example, fibrous fillers such as glass fibers, whisker-like fillers such as potassium titanate, scale-like fillers such as mica, and fibrous or powdery conductive fillers such as carbon fiber, carbon black, graphite, carbon nanomaterials and metal powders can be used. These filler may be used solely or in combination of two or more kinds.

Immediately after the molten resin P is charged into the cavity 414, the inner circumferential surface of the resin portion 405 reaches the outer circumferential surface of the master shaft 407, and reaches the same position as the inner circumferential surface 404a of the metal part 404 in the radial direction (shown by the dotted line in FIG. 41), but the inner circumferential surface 405a of the resin portion 405 is moved in the direction of expansion of the diameter by the molding shrinkage due to hardening of the resin. By the expansion of the inner circumferential surface 405a of the resin portion 405 in diameter, a stepped portion is formed between the second regions G12, 22 comprising the resin injected (LCP in this embodiment) into the radial bearing faces A31, A32 and the first regions G11, G21 comprising a material (electroformed metal in this embodiment) other than the resin injected, and the hydrodynamic pressure producing parts G1, G2, which produce the hydrodynamic effect in the lubricating oil charged in the radial bearing gap these second regions G12, 22 and the first regions G11, 21, are formed. This molding shrinkage is occurring to a certain extent in a state that the resin material is cured to such a degree that it can be removed from the forming molds 410, 411, and proceeds until the resin is completely cured after the removal from the molds.

In this manner, according to this embodiment of the invention, even in the case where the outer circumferential surface of the master shaft 407 which serves as an inner mold is in the form of a perfect circle free of asperities in cross section, The stepped portion formed by molding shrinkage of the resin allows the embattled hydrodynamic pressure producing parts G1, G2 to be formed. Therefore, the outer circumferential surface of the master shaft 407 and the recesses and projections of the hydrodynamic pressure producing parts G1, G2 of the master shaft 407 do not interfere with each other in the axial direction when removed from the molds so that the damage in the hydrodynamic pressure producing parts G1, G2 by interference can be avoided, and the hydrodynamic pressure producing parts can be produced at higher accuracy. Moreover, production of the bearing 403 is made easier, less costly and better in productivity than in the formation methods using the mold having recesses and projections corresponding to the configuration of the hydrodynamic pressure producing parts and by machining or other means.

After the molds are opened, a molded article in which the master shaft 407, the metal part 404, and the resin portion 405 are united is removed from the molds 410, 411. This molded article is separated into a bearing 403 (refer to FIG. 37) comprising the metal part 404 and the resin portion 405 in the following separation step, and the master shaft 407.

In this separation step, the inner circumferential surface of the metal part 404 is expanded in diameter by releasing the internal stress stored in the metal part 404 so that it is peeled off from the outer circumferential surface of the master shaft 407. Releasing the internal stress is conducted by impacting the master shaft 407 or bearing 403, or by applying pressure in the axial direction between the inner circumferential surface of the metal part 404 and the outer circumferential surface of the master shaft 407. The inner circumferential surface of the metal part 404 is expanded in diameter in the radial direction by releasing the inner stress and a gap having an appropriate dimension is formed between the inner circumferential surface of the metal part 404 and the outer circumferential surface of the master shaft 407, whereby the master shaft 407 can be smoothly removed from the inner circumferential surface of the metal part 404 in the axial direction. At this time, since the outer circumferential surface of the master shaft 407 is a cylindrical surface free of asperities, the master shaft 407 and the hydrodynamic pressure producing parts G1, G2 do not interfere with each other in the axial direction. Therefore, the damage in the hydrodynamic pressure producing parts G1, G2 by interference can be avoided, and the hydrodynamic pressure producing parts can be produced at higher accuracy.

The amount of expansion of the metal part 404 in diameter can be controlled, for example, by changing the wall thickness of the metal part 404, the proportion of constituents of the electrolyte solution, and electroformed conditions. Moreover, when the inner periphery of the metal part 404 solely by impacting cannot be sufficiently expanded in diameter solely by impacting, the bearing 403 and the master shaft 407 can be separated by heating or cooling the metal part 404 and the master shaft 407 to produce a difference in the amount of thermal expansion between them.

Accordingly, the bearing 403 in which the hydrodynamic pressure producing parts G1, G2 are formed on the inner circumferential surface 403a is obtained. The shaft member 402 produced separately is inserted into the thus-obtained bearing 403, and the inside of the hydrodynamic bearing device 401 is filled with, for example, the lubricating oil as the lubricating fluid, whereby the hydrodynamic bearing device 401 which rotatably supports the shaft member 402 is accomplished. When the shaft member 402 is rotated, the hydrodynamic effect is generated in the lubricating oil in of the radial bearing gap by the hydrodynamic pressure producing parts G1, G2, and the shaft member 402 is supported rotatably in the radial direction. Usable examples of the lubricating fluid other than the lubricating oil include gases such as air, lubricants having fluidity such as magnetic fluids, and lubricating greases.

The master shaft 407 can be also used as the shaft member 402 inserted into the bearing 403. At this time, the fine gap formed in the peeling step of the metal part 404 and the master shaft 407 between the raised first regions G11, G21 (the inner circumferential surface 404a of the metal part 404) constituting the hydrodynamic pressure producing parts G1, G2 and the outer circumferential surface of the master shaft 407 characteristically has an extremely small clearance and high accuracy, because of the electroforming process characteristic. Accordingly, the bearing which can produce excellent hydrodynamic pressure effect and has high rotational accuracy or sliding property can be provided. As mentioned above, if the shaft member 402 is separately produced and used to constitute the hydrodynamic bearing device 401, the master shaft 407 can be repeatedly reused once it is produced. Therefore, production cost of the master shaft 407 can be reduced so that further cost reduction of the hydrodynamic bearing device 401 can be achieved.

The invention according to this embodiment is not limited to the above constitutional example. For example, as the resin material injected in the injection molding step, resin materials such that the inner circumferential surface 405*a* contracts in diameter by molding shrinkage can be also used. In this case, as shown in FIG. 42, the inner circumferential surface 405*a* of the resin portion 405 moves in the direction of contraction of diameter by molding shrinkage, and the concave first regions G11, G21 comprising an electroformed metal and the raised second regions G12, G22 comprising a resin are formed on the inner circumferential surface 430*a* of the bearing 430.

In this manner, the convex faces of the hydrodynamic pressure producing parts G1, G2 are formed by the second regions G12, G22 made of a resin, whereby the hydrodynamic pressure producing parts G1, G2 having excellent abrasion resistance to the contact between the second regions G12, G22 and the outer circumferential surface 402*a* of the shaft member 402 during low-speed rotation of the device, for example, when the device is started and stopped is obtained. At this time, using as the resin material a substance having excellent sliding property such as a fluorine resin or a resin containing a fluorine resin dispersed therein can further improve abrasion resistance.

Such a bearing 430 in which the convex faces of the hydrodynamic pressure producing parts G1, G2 is formed from the second regions G12, G22 comprising a resin advantageously have excellent sliding property as mentioned above, while in contrast, it has a linear expansion coefficient greatly different from that of the shaft member 402 comprising a metallic material. Therefore, the bearing gap, especially the fine gap between the second regions G12, G22 and the outer circumferential surface 402*a* of the shaft member 402 may be altered by changes in temperature. When the hydrodynamic bearing device is used for applications where such changes in the bearing gap are unfavorable, it is desirable to position the first regions G11, G21 of the metal part 404 closer to the outer circumferential surface 402*a* of the shaft member 402 than the second regions G12, G22 of the resin portion 405. Moreover, according to this constitution, abrasion of the second regions G12, G22 by the sliding contact with the outer circumferential surface 402*a* of the shaft member 402 can be prevented, and thus the merits that the lifetime of the bearing is increased and occurrence of contamination due to abrasion powder is prevented can be obtained.

In the above, the case where the bearing 403 has a complex structure of resin and metal is shown as an example, but as the metal part 404 having the first regions, other components formed of materials other than metals (for example, ceramics) can be also used. Moreover, a portion which is equivalent to the metal part 404 can be formed a resin composition (different type resin composition) whose base resin is different from that of the resin composition (resin composition for molding) forming the resin portion 405. In this case, it is necessary to select as the different type resin composition a resin composition having a glass transition temperature higher than that of the resin composition for molding so that it can endure high temperature during injection molding.

In the above description, the case where the bearing 403 is opened at both ends is shown as an example, but the bearing 403 is not limited to such a constitution, and for example, as shown in FIG. 43, the opening at one end of the bearing 403 may be sealed by a thrust plate 415. In this constitutional example (second constitutional example), the shaft member 402 has a convex spherical surface portion 402*b* on its edge, and a thrust bearing portion T31 (so-called pivot bearing) is formed by the tip portion of the convex spherical surface portion 402*b* and an upper end face 415*a* of the thrust plate 415 so that the shaft member 402 is supported in the thrust direction. Moreover, although not illustrated, the thrust bearing portion T31 may be constituted of the hydrodynamic bearing in which the shaft member 402 is supported in the thrust direction by the hydrodynamic effect of the lubricating oil produced in the thrust bearing gap between the lower end face of the shaft member 402 and the thrust plate 415.

As shown in FIG. 44, a flange portion 402*c* may be provided on the lower end of the shaft member 402 (third constitutional example). At this time, a first thrust bearing portion T32 is formed by an upper end face 402*c*1 of the flange portion 402*c* and a lower end face 405*b* of the resin portion 405 opposing this face across the thrust bearing gap, and a second thrust bearing portion T33 is formed by a lower end face 402*c*2 of the flange portion 402*c* and an upper end face 415*a* of the thrust plate 415 opposing this face across the thrust bearing gap.

When the thrust bearing portions T31, T32, T33 are constituted of hydrodynamic bearings, hydrodynamic pressure producing parts are formed on an end face of one of fixing-side members and rotation side members which oppose each other across the thrust bearing gap. These hydrodynamic pressure producing parts are constituted of, for example, hydrodynamic grooves in a herringbone pattern or a spiral pattern, step bearings, corrugated bearing or the like.

In the above description, the hydrodynamic grooves arranged in a herringbone pattern formed on the radial bearing faces A31, A32 as hydrodynamic pressure producing parts are shown as an example, but the hydrodynamic pressure producing parts are not limited to this, and the hydrodynamic pressure producing parts can be constituted of other hydrodynamic groove shapes, so-called step bearings, corrugated bearings, or multi-arc bearings by modifying the shape of the masked portion 408 applied to the master shaft 407.

In the above description, the case where the hydrodynamic pressure producing parts G1, G2 are formed on the fixing-side member (bearing 403), but it may be provided on the rotation side member (shaft member 402) opposing this. In this case, the rotation side member is formed by molding an insert with a resin.

A sealing portion forming a sealing space for preventing leakage of the lubricating oil inside the bearing may be disposed in the bearing opening portion as shown in the above.

The bearing device described above can be integrated and used in various kinds of motors. An example in which the hydrodynamic bearing device 401 is used as a rotation shaft supporting apparatus for a fan motor will be described below with reference to FIG. 45.

FIG. 45 is a cross-sectional view which conceptionally shows a fan motor having the hydrodynamic bearing device 401 according to this embodiment integrated therein. This fan motor comprises the hydrodynamic bearing device 401 which rotatably supports the shaft member 402 in a non-contact manner, a rotor 423 attached to the shaft member 402, a fan 424 attached to the outer diameter end of the rotor 423, a stator coil 426*a* and a rotor magnet 426*b* which are caused to oppose each other, for example, across a gap in the radial direction, and a casing 425 which accommodates these components, part of the upper end face and side face thereof being opened. In general, such a motor is referred to as a radial gap type fan motor. The hydrodynamic bearing device 401 comprises the bearing 403 having the resin portion 405 in the form of a bottomed cylinder cup, and the shaft member 402 inserted at its inner periphery. A so-called pivot bearing is constituted of a lower end of the shaft member 402 which is in the form of a convex spherical surface, and the inner bottom face of the resin portion 405. The stator coil 426a is attached to the outer periphery of the hydrodynamic bearing device 401, and the rotor magnet 426b is attached to the rotor 423. The hydrodynamic bearing device 401 has a casing 425 and a retainer 405 united as a single part. The form of the fan motor may be a so-called axial gap type fan motor, in which the stator coil 426a and the rotor magnet 426b are caused to oppose each other across a gap in the axial direction (not illustrated).

When the stator coil 426a is energized, the rotor magnet 426b is rotated by the electromagnetic force between the stator coil 426a and the rotor magnet 426b, whereby the rotor 423 and the fan 424 are rotated integrally with the shaft member 402. When the fan 424 rotates, outside air is drawn toward the direction of an arrow Y3 in FIG. 45 from the upper end opening portion 425a of the casing 425, and the air in the casing is discharged from the side face opening portion 425b toward the direction of an arrow X3. Such a fan motor can cool other apparatuses and the like by the airflow discharged from the side face opening portion 425b. Alternatively, it can be placed in such a manner that its lower end face faces other apparatuses (shown by the chain line in FIG. 45) so that the heat of other apparatuses is transferred to the fan motor and the heat transferred to the fan motor by the above-mentioned airflow is radiated to the outside, thereby cooling the apparatus. As shown in FIG. 45, since the rotor magnet 426b extends in a portion higher than the position facing the stator coil 426a, a component in the axial direction of the attraction between this extending portion and the stator coil 426a acts as slip-off prevention of the shaft member 402.

The bearing device of the invention according to this embodiment can be suitably used not only for examples described above, but also for small motors for information appliances used in high-speed rotation such as spindle motors for disk drives, for supporting rotation shafts in polygon scanner motors in laser beam printers, and as a bearing for collar wheel motors in projectors.

A sixth embodiment of the present invention below will be described below with reference to FIGS. 46 to 55.

FIG. 46 is longitudinal sectional view of a fan motor 550 having a fluid dynamic bearing device (hydrodynamic bearing device) 501 according to the sixth embodiment integrated therein, and FIG. 47 is a plan view of the fan motor 550. This fan motor 550 is a so-called sirocco fan motor, and comprises a shaft member 502 which rotatably supports the hydrodynamic bearing device 501, a stator coil 504 and a rotor magnet 505 which, for example, oppose each other across a gap in the radial direction, and a casing 506 accommodating these components. The fan motor 550 is attached to a part to be cooled (part shown by the dashed line in FIG. 46). The rotor magnet 505 is fixed to the inside diameter side of the hub 503, and a plurality of fans (blades) 507 are vertically provided on its outer diameter side in the circumferential direction. An opening portion 506b is provided in a partial region in the circumferential direction on an outer wall portion 506a of the casing 506. This opening portion 506b functions as an outlet of the exhaust airflow transferred to the outer diameter side while the fan motor 550 is driven. A hole 506c1 is formed on an upper surface 506c of the casing 506.

When the stator coil 504 is energized, the rotor magnet 505 is rotated by the excitation between the stator coil 504 and the rotor magnet 505, whereby the shaft member 502, the hub 503, and a plurality of the fans 507 attached to the hub 503 are rotated integrally. By the rotation of this fan 507, the intake airflow is drawn from the hole 506d1 toward the lower side (the direction of arrow X4 in FIG. 46) in the axial direction and an airflow toward the outer radial direction (the direction of arrow Y4 in FIG. 46) is produced. Airflow Z is discharged from the opening portion 506b in a manner of being pushed out by this airflow.

As shown in FIG. 48, the hydrodynamic bearing device 501 mainly comprises the shaft member 502, and the bearing member 509 having the shaft member 502 inserted at the inner periphery. The bearing member 509 is constituted of a cup-like metal part 510 in the form of a bottomed cylinder, and a resin portion 511 which retains the metal part 510 at its inner periphery. The hub 503 is fixed on the upper end portion of the shaft member 502, and the resin portion 511 is formed integrally with the casing 506. For the sake of explanation, the opening side of the bearing member 509 is referred to as the upper side, and the opposite side is referred to as the lower side in the description provided below.

The shaft member 502 is cylindrically formed of a metallic material such a SUS steel, and has a spherical projection 502b. A radial bearing portion R4 is formed between the outer circumferential surface 502a of the shaft member 502 and the inner circumferential surface 510a1 of the metal part 510, and a thrust bearing portion T4 (pivot bearing) is formed between the tip portion of the spherical projection 502b of the shaft member 502 and the inner bottom face 510b1 of the metal part 510.

The metal part 510 is formed in the form of a cup comprising a cylinder member 510a and a bottom 510b. The cross sectional shape of the inner circumferential surface 510a1 of the metal part 510 is constant in the axial direction, and has a so-called step shape, in which large-diameter inner circumferential surfaces 510a1 and small-diameter inner circumferential surfaces 510a12 alternately appears in the circumferential direction (refer to FIG. 49). The inner circumferential surfaces 510a1 of this step shape functions as the radial bearing face of the radial bearing portion R4 while the shaft member 502 is in rotation.

The bearing member 509 is formed in the following manner. First, the metal part 510 is formed by a so-called electroforming process. Specifically, the master shaft 512 is energized in a state of being immersed in an electrolyte solution, and then the metal part 510 is caused to deposit in a predetermined position on the outer periphery of the master shaft 512 (refer to FIG. 50). At this time, a molding portion (not illustrated) corresponding to the shape of the inner circumferential surface 510a1 of the metal part 510 (step shape in this embodiment) is provided in advance on the outer circumferential surface 512a of the master shaft 512, and the inner circumferential surface 510a1 of the metal part 510 is formed into a predetermined shape by transferring the shape of this molding portion. At this time, by processing the master shaft 512 at high accuracy and increasing the surface property of the outer circumferential surface 512a, the surface precision the inner circumferential surface 510a1 of the metal part 510 can be increased.

The thus-formed article in which the master shaft 512 and the metal part 510 are integrated is provided in the injection molding molds shown in FIG. 51. This mold is constituted of a movable mold 513 and a stationary mold 514. The movable mold 513 comprises a molded surface 513a which forms the resin portion 511 and casing 506, and a hole 513b provided on the axis of the molded surface 513a. The upper end of the master shaft 512 is inserted into this hole 513b. The stationary mold 514 comprises a molded surface 514a which forms the bearing member 509 and casing 506, and a point-like injection gate 516 provided on the axis of the molded surface 514*a*. By clamping the movable mold 513 and the stationary mold 514, a cavity 515 is formed. At this time, the gate 516 opposes the bottom 510*b* of the metal part 510 in the axial direction. A molten resin P4' is injected into this cavity 515 via the gate 516. In this embodiment, a substance used as the molten resin P4' is prepared, for example, by adding a fibrous filler (for example, carbon fiber) to a liquid crystal polymer as a reinforcing agent. The injected molten resin P4' goes around the lower end corner of the metal part 510, and flows over the outer circumference of the metal part 510 in the axial direction (shown by the dotted line in FIG. 51). Accordingly, the resin portion 511 after being cured exhibits resin orientation in the axial direction (shown by P4 in the expanded drawing of FIG. 48) on the outer periphery of the metal part 510.

After the resin is cured, an integrated article of the metal part 510, resin portion 511, casing 506, and master shaft 512 is removed from the molds. At this time, a gate mark, which is the cut mark produced by cutting the resin cured in the gate 516, or a gate removal mark, which is a mark produced when it is removed by machining or other means in the central portion of the bottom face 511*b* of the resin portion 511, is formed.

Thereafter, the inner circumferential surface 510*a*1 of the metal part 510 is peeled off from the outer circumferential surface 512*a* of the master shaft 512. This peeling can be carried out, for example, in the following manner. As mentioned above, when a liquid crystal polymer is used as the resin material of the resin portion 511, the inner circumferential surface 511*a* of the cylindrical resin portion 511 is expanded in diameter due to molding shrinkage when the resin is cured. By appropriately adjusting the wall thickness of the cylinder member 510*a* of the metal part 510, adhesion between the metal part 510 and the resin portion 511 and other conditions, the cylinder member 510*a* of the metal part 510 is expanded in diameter as the diameter of the inner circumferential surface 511*a* of the resin portion 511 is expanded. Because of the orientation of the resin portion 511 in the axial direction, the amount of molding shrinkage in the radial direction becomes relatively large, and the amount of expansion of the cylinder member 510*a* of the metal part 510 in diameter is also increased. This expansion of the diameter of the cylinder member 510*a* of the metal part 510 allows the metal part 510 to be peeled off from the master shaft 512.

In addition to the above-mentioned method, if the molded article is impacted in the axial direction, the metal part 510 can be peeled off from the master shaft 512 more reliably. Alternatively, the master shaft 512 and metal part 510 can be peeled off from each other by heating or cooling, utilizing the difference in thermal shrinkage between them.

As mentioned above, rigidity against a load in the radial direction can be improved by disposing the metal part 510 at the inner periphery of the resin portion 511. Therefore, even when the resin portion 511 undergo dimensional change due to changes in temperature, deformation of the radial bearing face can be suppressed, and therefore the precision of the gap width of the radial bearing gap is maintained and a decrease in the supporting force in the radial direction can be avoided.

In general, resins have better dimensional stability in the orientation direction than in the direction perpendicular to the orientation direction. Therefore, since the resin portion 511 exhibits resin orientation in the axial direction on the outer periphery of the metal part 510 (refer to the expanded drawing of FIG. 48), the dimensional stability of the bearing member 509 in the axial direction can be improved. This resin orientation can be confirmed, for example, by the orientation of the fibrous filler (especially carbon fiber) added to the resin material. Moreover, confirmation of resin orientation is preferably conducted in the vicinity of in the axial center of the metal part 510 where orientation appears strongly of all surface of the resin portion 511.

The shaft member 502 is inserted into the thus-formed bearing member 509 and, for example, a lubricating oil is injected in the gap formed between these components as a lubricant, thereby accomplishing the hydrodynamic bearing device 501.

When the shaft member 502 rotates, of all surface of the radial bearing gap, the lubricating oil in between the large-diameter inner circumferential surface 510*a*11 of the metal part 510 and the outer circumferential surface 502*a* of the shaft member 502 (wide-width portion) is pushed towards between the small-diameter inner circumferential surface 510*a*12 of the metal part 510 and the outer circumferential surface 502*a* of the shaft member 502 (narrow-width portion) so that the pressure is increased. By this hydrodynamic effect, a radial bearing portion R4 which supports the shaft member 502 in the radial direction in a non-contact manner is formed. Simultaneously, a so-called pivot bearing is constituted of the spherical projection 502*b* on the lower end of the shaft member 502 and the inner bottom face 510*b*1 of the metal part 510, so that a thrust bearing portion T4 which supports the shaft member 502 in the thrust direction is formed.

This embodiment is not limited to the above-mentioned constitution. Another constitutional example of this embodiment will be described below. In the description provided below, portions having constitutions and functions similar to those in the above constitutional example are denoted by the same numerals, and their explanation will be omitted.

FIG. 52 shows a fluid dynamic bearing device 521 according to the second constitutional example of this embodiment. In this fluid dynamic bearing device 521, the cylinder member 510*a* of the metal part 510 is opening at both sides in the axial direction, and a flange portion 510*c* extending from its upper end toward the outer diameter is integrally provided. Hydrodynamic grooves, for example, in a spiral configuration are formed on the upper end face 510*c*1 of this flange portion 510*c* (not illustrated), and a region in which these hydrodynamic grooves are formed serves as a thrust bearing face. When the shaft member 502 and hub 503 rotate, these hydrodynamic grooves produce the hydrodynamic effect in the lubricating oil in the thrust bearing gap formed between the lower end face 503*a* of the hub 503 and the upper end face 510*c* of the flange portion 510*c*, which supports the shaft member 502 in the thrust direction. In this manner, by providing the flange portion 510*c* on the metal part 510, the dimensional stability of the bearing member 509 can be further increased. Moreover, by forming the thrust bearing face on the flange portion 510*c*, abrasion resistance of the thrust bearing face can be increased.

In this fluid dynamic bearing device 521, as in the above constitutional example, the resin portion 511 exhibits resin orientation in the axial direction on the outer circumference of the cylinder member 510*a* of the metal part 510 (refer to the lower expanded drawing of FIG. 52). Accordingly, the rigidity of the bearing member 509 in the axial direction is ensured, and therefore the flatness and position accuracy of the thrust bearing face in the axial direction can be maintained well, and stable thrust load performance can be obtained. Furthermore, since the resin portion 511 exhibits resin orientation in the radial direction in the lower region of the flange portion 510*c* (refer to the upper expanded drawing of FIG. 52), the rigidity of the resin in the radial direction in this portion is ensured. In particular, when the flange portion 510*c* of the metal part 510 does not reach the edge of the outer diameter of the bearing member 509, ensuring such rigidity in the radial direction is effective.

In the constitutional examples described above, a liquid crystal polymer is used as the resin material of the resin portion 511, but it is not limited to this example. For example, crystalline resins such as polyphenylene sulfide (PPS) and polyether ether ketone (PEEK), and noncrystalline resins such as polyphenylsulfone (PPSU), polyethersulfone (PES) and polyamideimide (PEI) can be also used. When such resins are used, the inner circumferential surface 511a of the resin portion 511 contracts in diameter due to the molding shrinkage when the resin is cured, whereby adherence strength between the resin portion 511 and the metal part 510 can be increased. However, the rigidity in the radial direction which can endure the pressurizing force due to the contraction of the resin portion 511 in diameter is required for the metal part 510 at this time.

In the constitutional example described above, the point-like gate 516 is provided on the axis of the molded surface 514a of the stationary mold 514, but the shape and portion to be formed of the gate as long as the resin portion 511 can be orientated in the axial direction are not limited to these examples. For example, an annular gate may be formed on the molded surface 514a of the stationary mold 514.

In the constitutional example described above, the case where the metal part 510 is formed by the electroforming process is shown, but it can be formed not only by this process, but also by, for example, press forming and forging process. Moreover, in the above, the resin portion 511 is formed with the metal part 510 as an insert, but these may be fixed together after they are separately formed.

In the constitutional example described above, the case where the inner circumferential surface 510a1 of the metal part 510 which serves as the radial bearing face is formed in the shape of steps is shown, but this should not be construed restrictively. For example, as shown in FIG. 53, the inner circumferential surface 510a1 may be constituted of three arcuate faces 510a13, 510a14, 510a15 (so-called three-arc bearing). The center of curvature O' of the three arcuate faces 510a13, 510a14, 510a15 are offset from the shaft center O of the bearing member 509 (shaft member 502) at equal distances. In each region demarcated by the three arcuate faces 510a13, 510a14, 510a15, the radial bearing gap is a wedge-shaped gap gradually diminished in a wedge-like fashion in both circumferential directions. When the shaft member 502 rotates, the lubricating oil in the wide-width portion of the radial bearing gap is forced into the minimum gaps of the wedge-shaped gaps and its pressure increases. By this hydrodynamic action of the lubricating oil, the shaft member 502 and is supported in the radial direction in a non-contact fashion. It is also possible to form axial grooves one step deeper and called separation grooves in the boundary portions between the three arcuate surfaces 510a13, 510a14, 510a15.

FIG. 54 shows an example in which the inner circumferential surface 510a1 of the metal part 510 is constituted of another multi-arc bearing. Also in this example, the inner circumferential surface 510a1 of the metal part 510 is composed of three arcuate surfaces 510a13, 510a14, 510a15 (so-called three-arc bearing); in each of the regions demarcated by the three arcuate surfaces 510a13, 510a14, 510a15, the radial bearing gap is a wedge-shaped gap gradually diminished in one circumferential direction in a wedge-like fashion. A multi-arc bearing of this construction is also referred to as tapered bearing. In the boundary portions between each of the three arcuate surfaces 510a13, 510a14, 510a15, there are formed axial grooves one step deeper and called separation grooves 517. Thus, when the shaft member 502 makes a relative rotation in a predetermined direction, the lubricating oil in the wide-width portion of the radial bearing gap is forced into the minimum gaps of the wedge-shaped gaps, and its pressure increases. By this hydrodynamic action of the lubricating oil, the shaft member 502 is supported in the radial direction in a non-contact fashion.

FIG. 55 shows an example in which the inner circumferential surface 510a1 of the metal part 510 is constituted of another multi-arc bearing. In this example, the construction shown in FIG. 54 is modified such that predetermined regions θ on the minimum gap side of the three arcuate surfaces 510a13, 510a14, 510a15 are formed as concentric arcuate surfaces whose centers of curvature is the axial center O of the bearing member 509 (shaft member 502). Thus, each of the predetermined regions O exhibits a fixed radial bearing gap (minimum gap). A multi-arc bearing of this construction is also called a tapered flat bearing.

While all of the above-described multi-arc bearings of the examples are three-arc bearings, they should not be construed restrictively. It is also possible to adopt a so-called four-arc bearing, five-arc bearing, or a multi-arc bearing formed by six or more arcuate surfaces.

Alternatively, as the radial bearing face, hydrodynamic grooves arranged in a herringbone pattern and a spiral pattern on the inner circumferential surface 510a1 of the metal part 510 may be formed. At this time, if the hydrodynamic grooves are formed in two spaced portions in the axial direction, the moment rigidity of the bearing device can be improved.

In the above description, the case where the thrust bearing portion T4 is constituted of a pivot bearing or a thrust bearing face on which hydrodynamic grooves are formed in a spiral configuration is shown, but this should not be construed restrictively. For example, it is also possible to form the thrust bearing portion T4 by hydrodynamic grooves arranged in a herringbone configuration, a step bearing, a corrugated bearing (with corrugated step form), etc.

In the above description, the case where the hydrodynamic pressure producing parts which produce the hydrodynamic effect in the lubricating oil in the radial bearing gap are formed on the inner circumferential surface 510a1 of the metal part 510 is shown, but the hydrodynamic pressure producing parts can be also formed on the outer circumferential surface 502a of the shaft member 502, which opposes the inner circumferential surface 510a1 across the radial bearing gap. Moreover, in the above description, the case where the hydrodynamic pressure producing parts which produce the hydrodynamic effect in the lubricating oil in the thrust bearing gap are formed on the upper end face 510c1 of the flange portion 510c of the metal part 510 is shown, but the hydrodynamic pressure producing parts can be also formed on the lower end face 503a of the hub 503 opposing the upper end face 510c1 across the thrust bearing gap.

Alternatively, it is also possible to form both the outer circumferential surface 502a of the shaft member 502 and the inner circumferential surface 510a1 of the metal portion 510 as cylindrical surfaces, thus forming a so-called cylindrical bearing.

While in the above description, lubricating oil is used as the lubricating fluid, it is also possible to use a gas such as air, a lubricating grease, a magnetic fluid or other fluids.

The bearing device of this embodiment can be applied not only to a fan motor which produces an airflow in the radial direction as mentioned above, but also to, for example, a so-called axial fan which produces and airflow in the axial direction, and other fan motors. Moreover, the bearing device of this embodiment can be suitably used not only for fan motors, but also for spindle motors used in magneto-optic disk drives for optical disks, small motors for information appliances used at high-speed rotation, and for supporting rotation shafts in polygon scanner motors in laser beam printers.

BRIEF DESCRIPTION OF THE DRAWINGS

FIG. 29 is a cross-sectional view of the bearing member.

FIG. 30A is a perspective view of the master shaft; FIG. 30B is a perspective view which shows a state of the master shaft subjected to the masking; and FIG. 30C is a perspective view of the electroformed member.

DESCRIPTION OF THE NUMERALS

Figure 1:
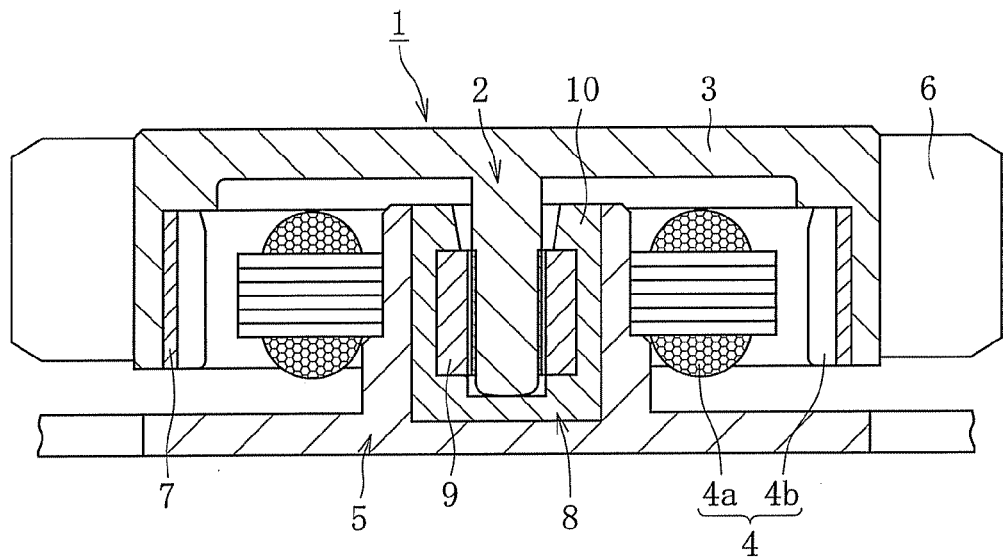
FIG. 1 is a cross-sectional view of a motor which comprises the fluid dynamic bearing device according to the first embodiment of the present invention.
Figure 2:
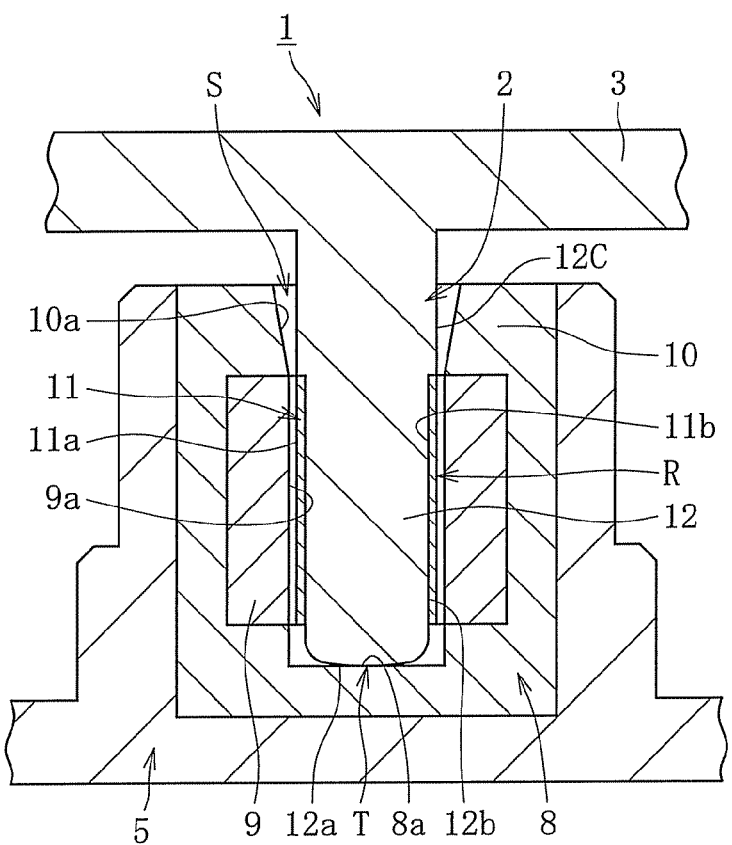
FIG. 2 is a cross-sectional view of the fluid dynamic bearing device.
Figure 3:
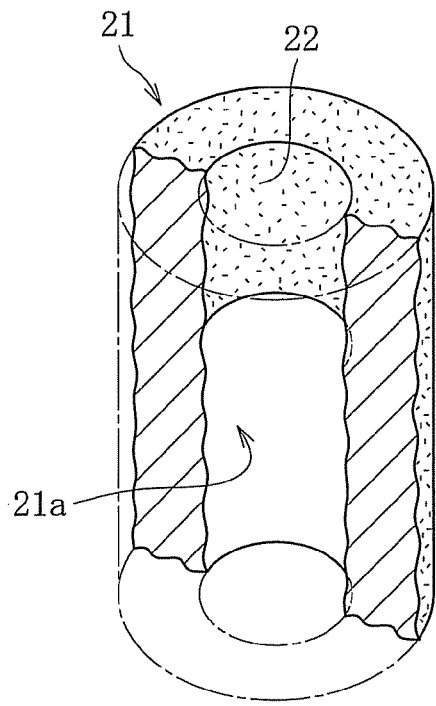
FIG. 3 is a longitudinal sectional view of the master in which a masked portion is provided.
Figure 4:
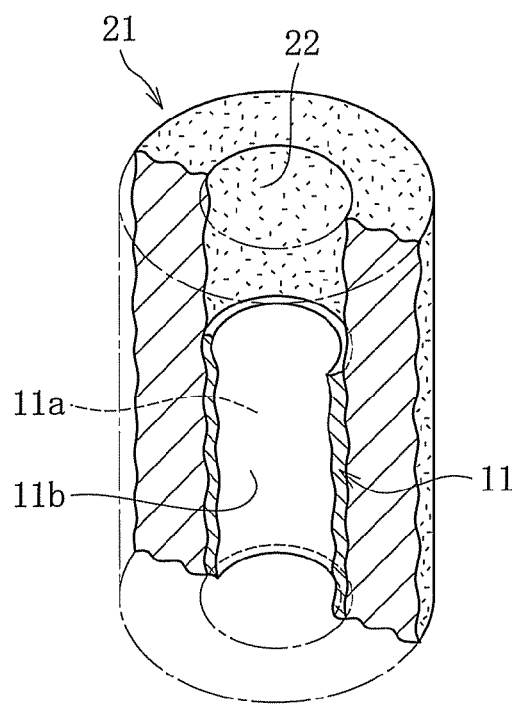
FIG. 4 is a longitudinal sectional view of the master in which the electroformed part is formed.
Figure 5:
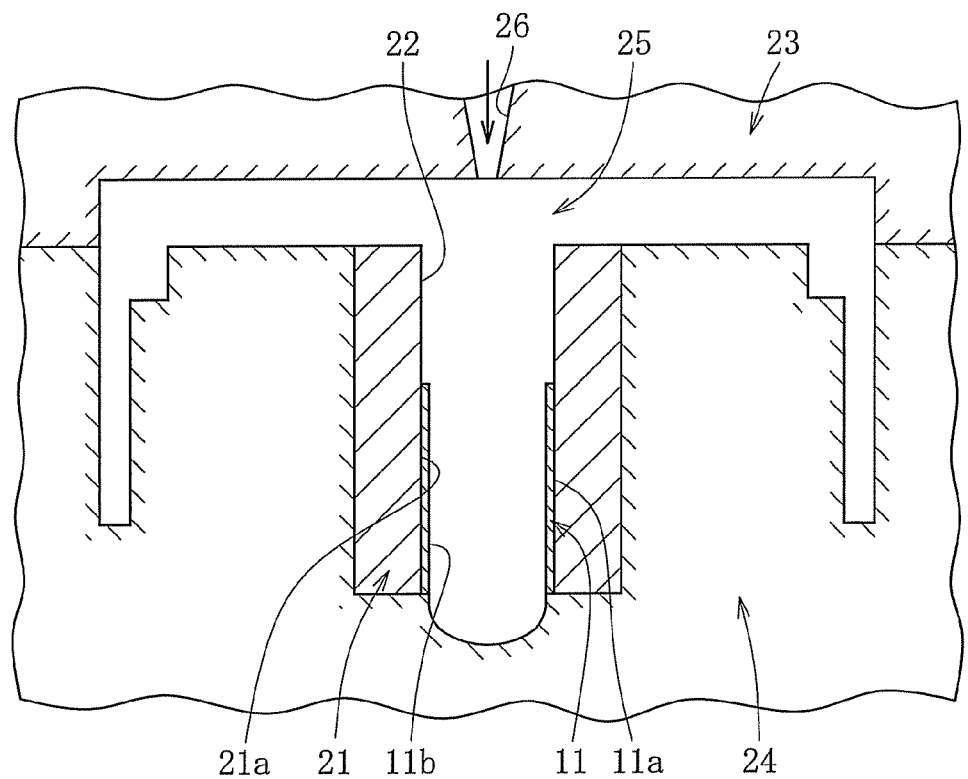
FIG. 5 is a cross-sectional view of the forming mold of the shaft with the electroformed part inserted thereinto.
Figure 6:
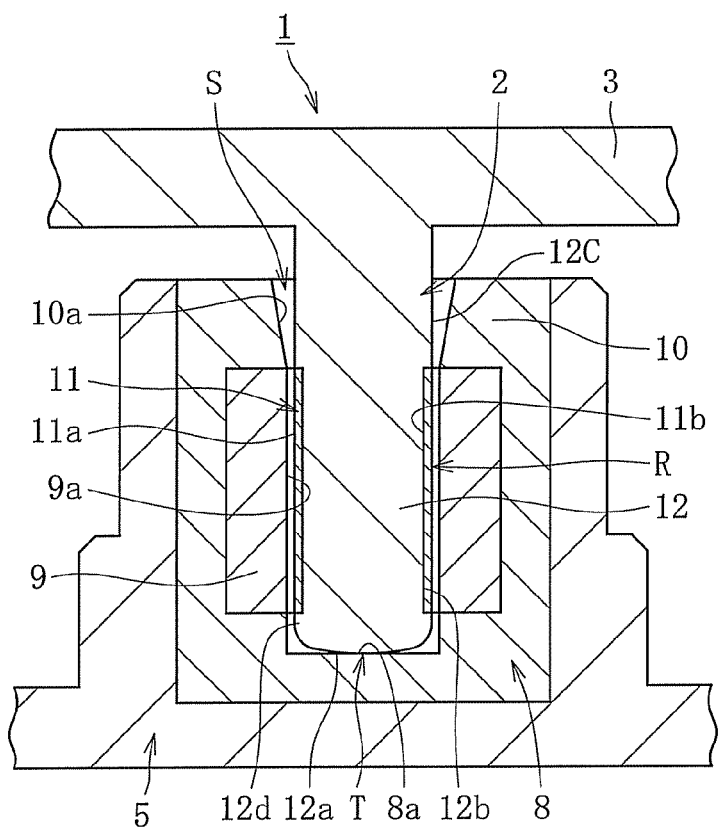
FIG. 6 is a cross-sectional view of the fluid dynamic bearing device comprising the shaft of another constitution.
Figure 7:
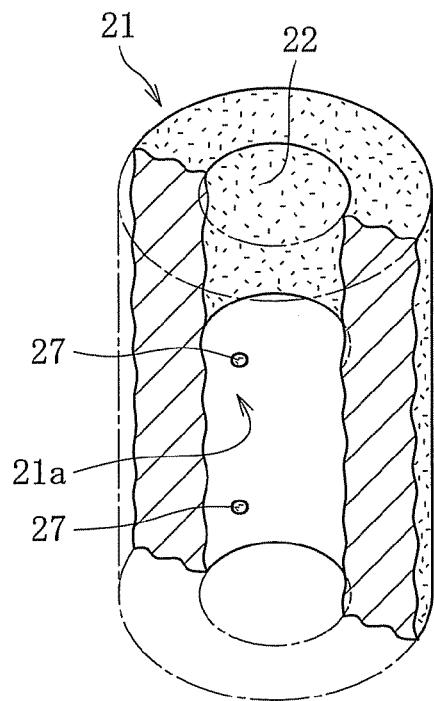
FIG. 7 is a longitudinal sectional view of the master provided with the masked portion of another constitution.
Figure 8:
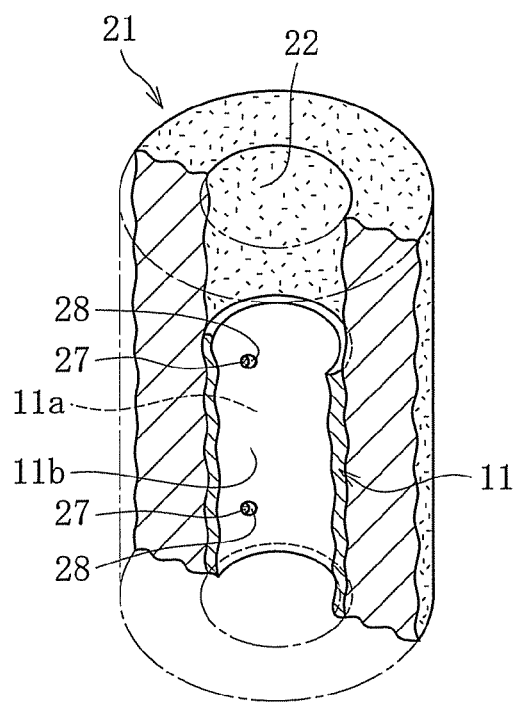
FIG. 8 is a longitudinal sectional view of the master in which the electroformed part of another constitution is formed.
Figure 9:
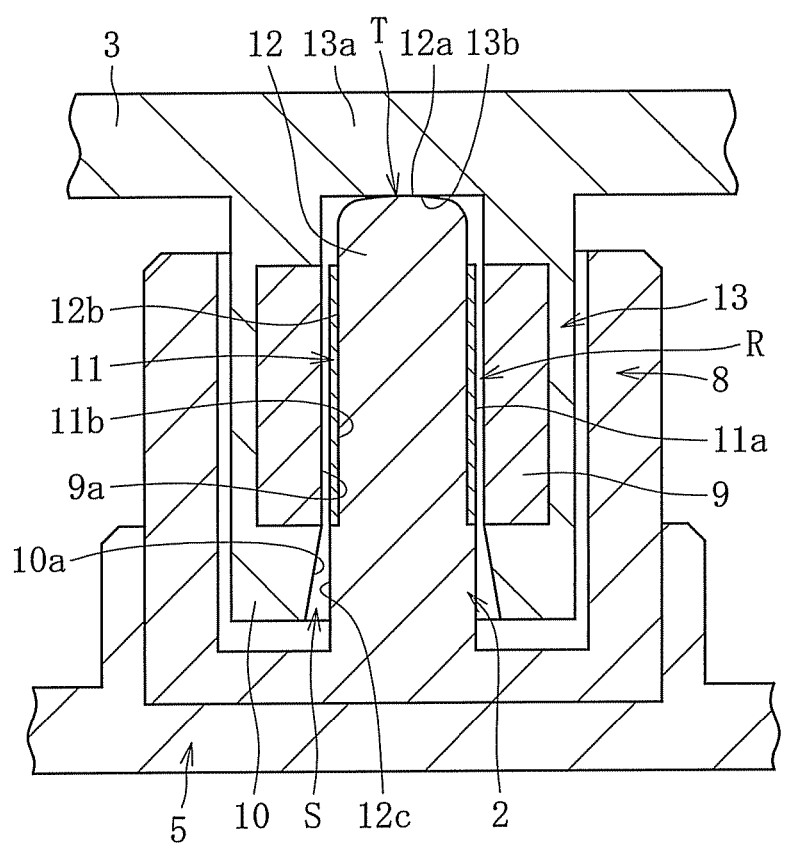
FIG. 9 is a cross-sectional view showing the second constitutional example of the fluid dynamic bearing device.
Figure 10:
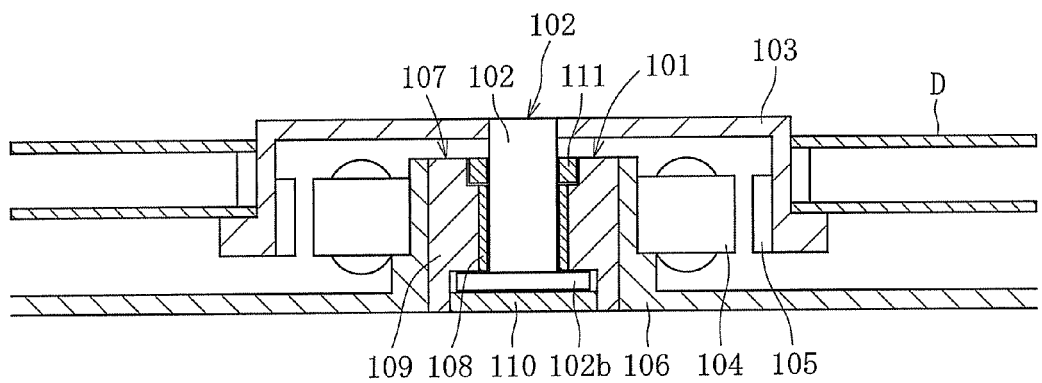
FIG. 10 is a cross-sectional view of a spindle motor for information appliances having the hydrodynamic bearing device according to the second embodiment of the present invention integrated therein.
Figure 11:
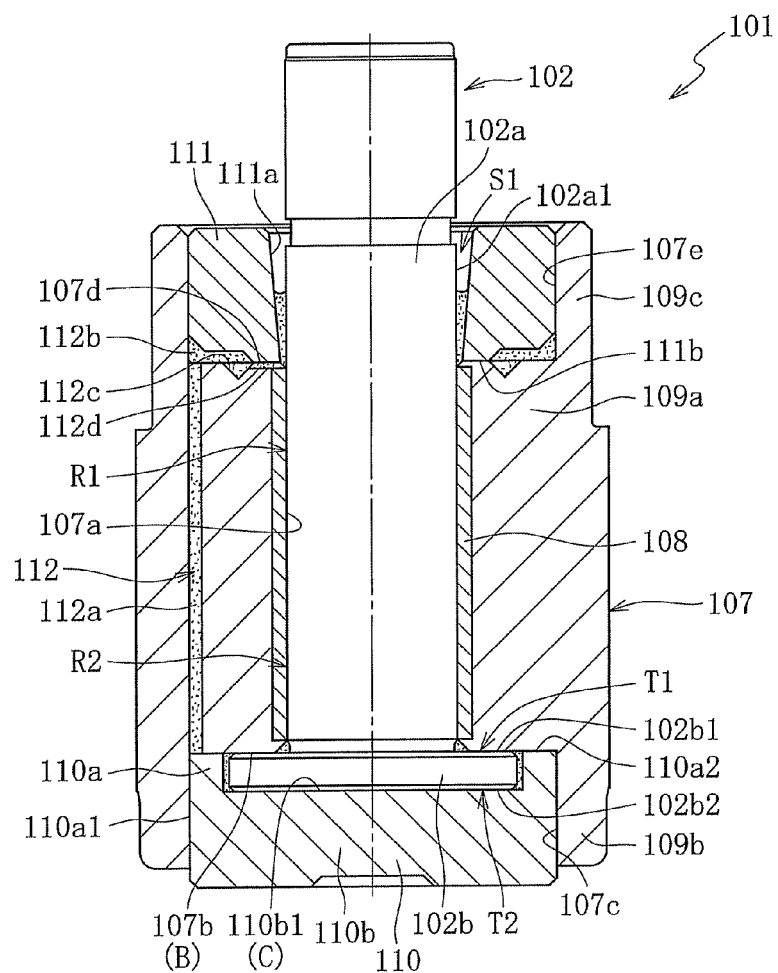
FIG. 11 is a cross-sectional view of the hydrodynamic bearing device.
Figure 12A:
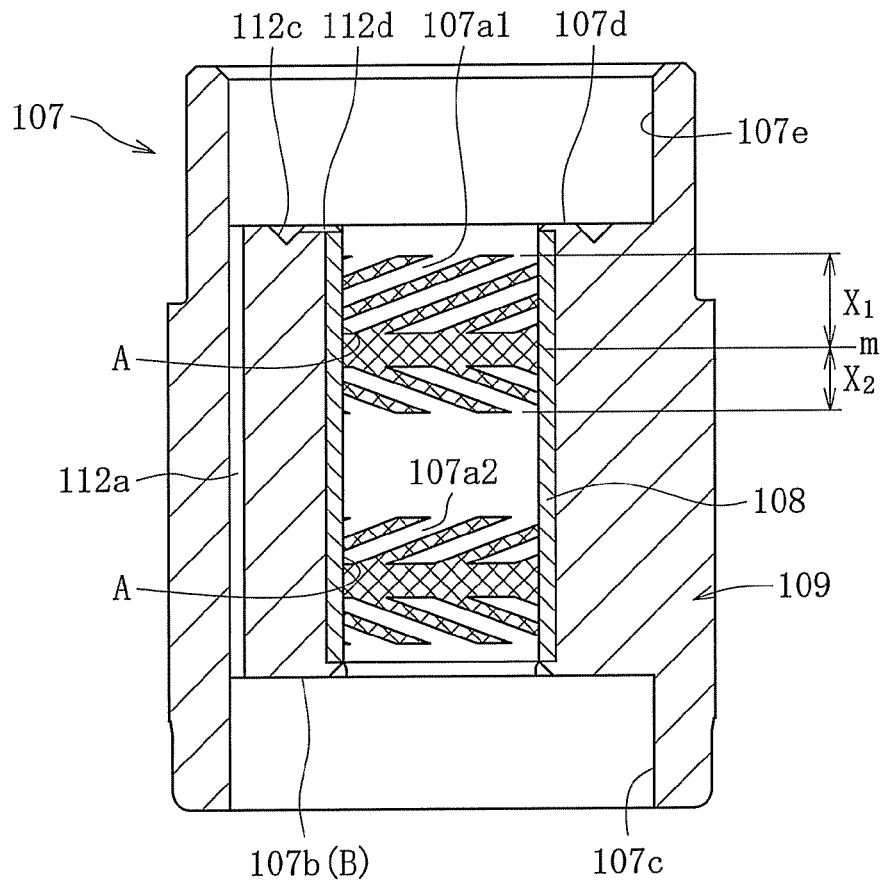
FIG. 12A is a longitudinal sectional view of the bearing member.
Figure 12B:
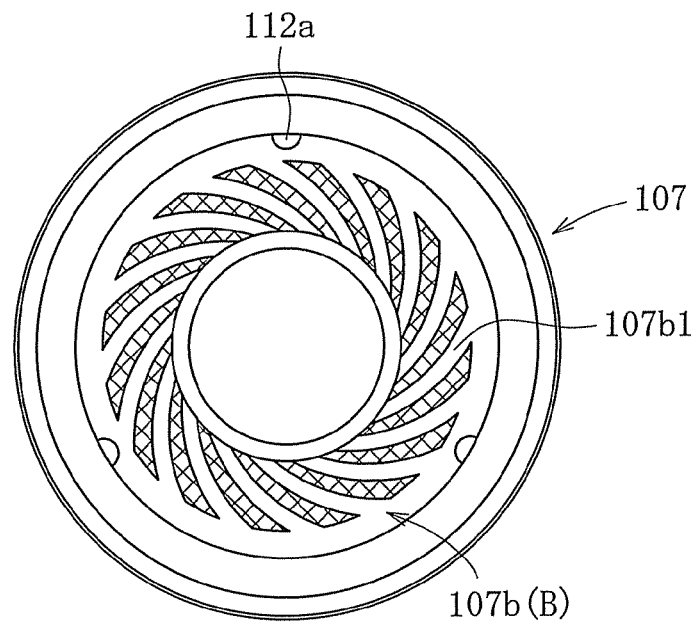
FIG. 12B is drawing which shows the first end face of the bearing member.
Figure 13A:
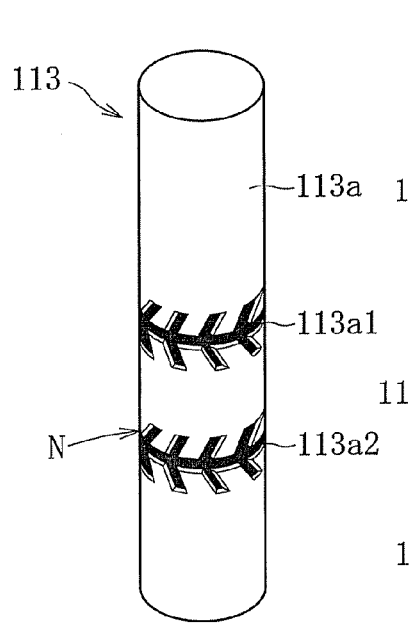
FIG. 13A is a perspective view of the master member.
Figure 13B:
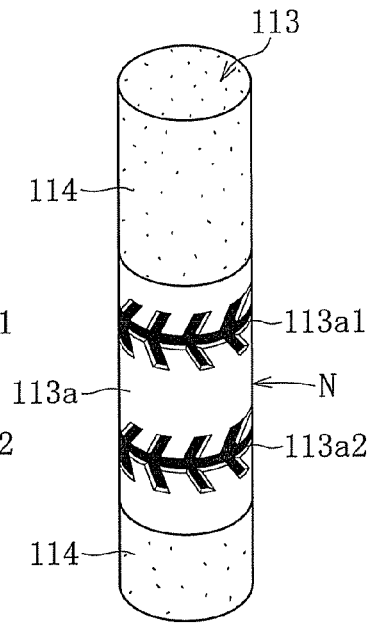
FIG. 13B is a perspective view showing the state of the master member subjected to the masking.
Figure 13C:
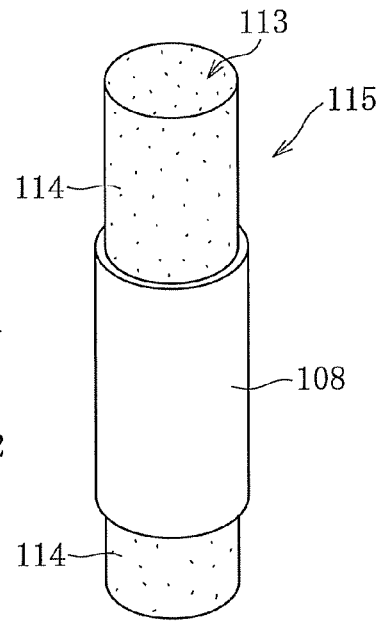
FIG. 13C is a perspective view of the electroformed member.
Figure 14:
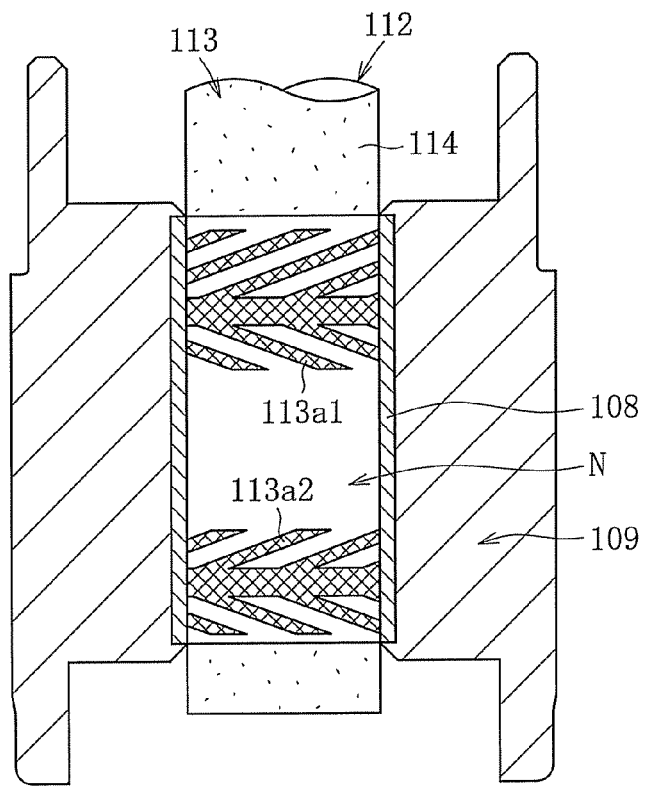
FIG. 14 is a cross-sectional view of the bearing member immediately after the insert molding.
Figure 15:
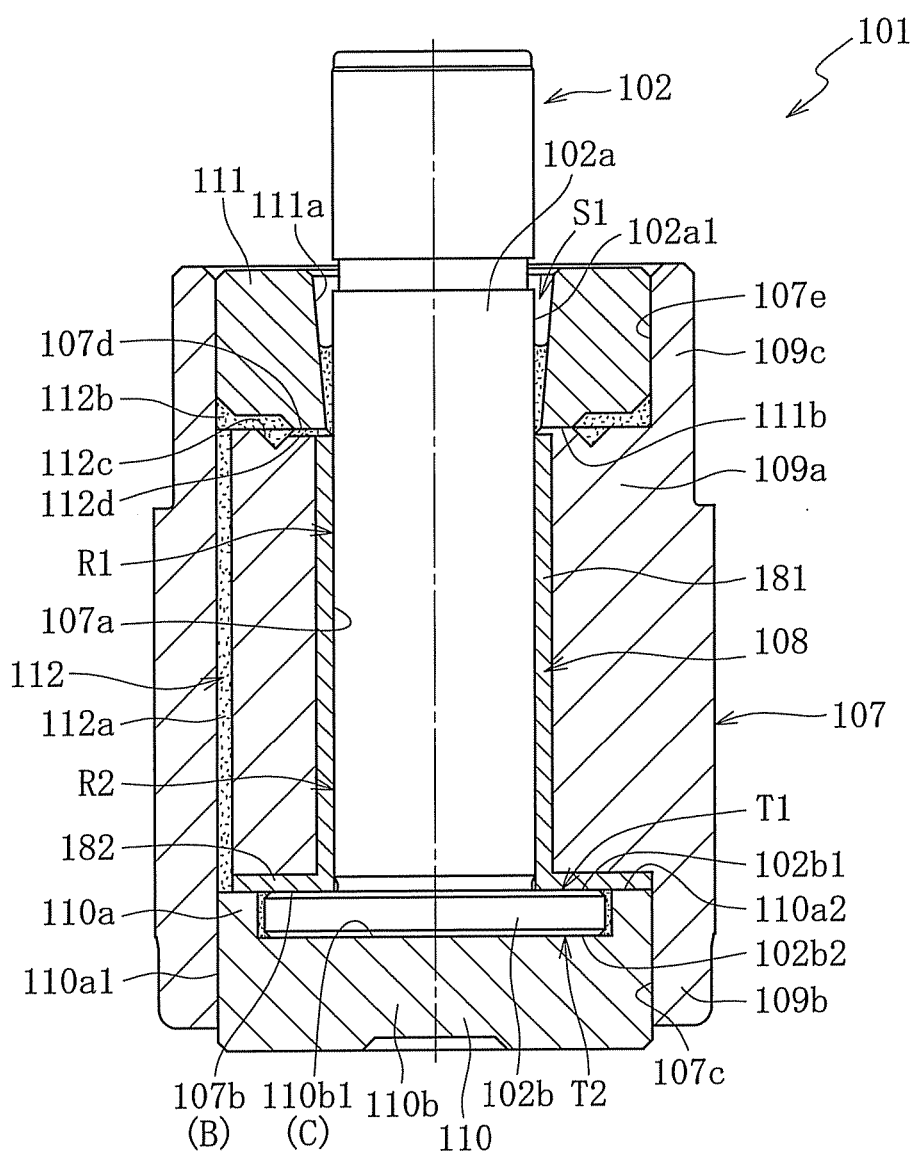
FIG. 15 is a cross-sectional view which shows the second constitutional example of the hydrodynamic bearing device.
Figure 16:
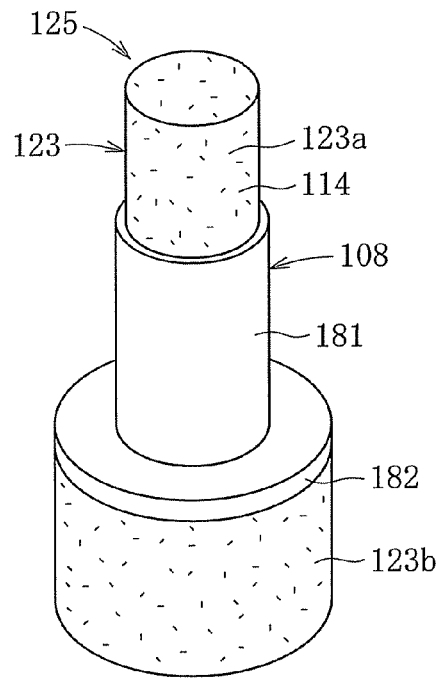
FIG. 16 is a perspective view which shows another form of the electroformed member.
Figure 17:
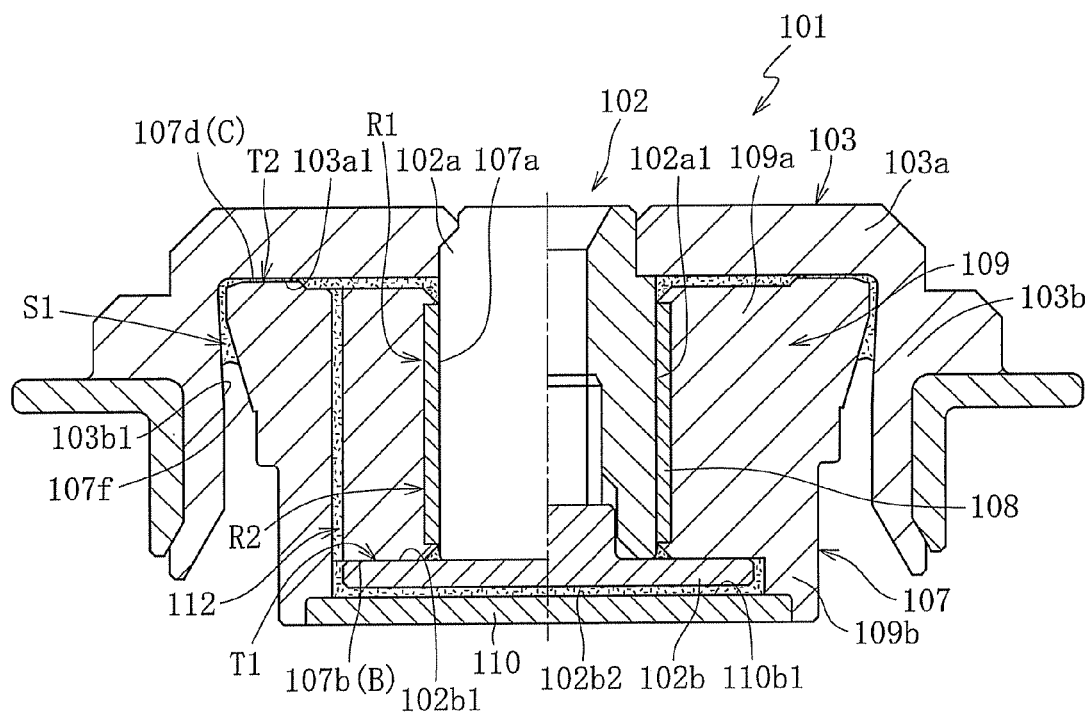
FIG. 17 is a cross-sectional view which shows the third constitutional example of the hydrodynamic bearing device.
Figure 18:
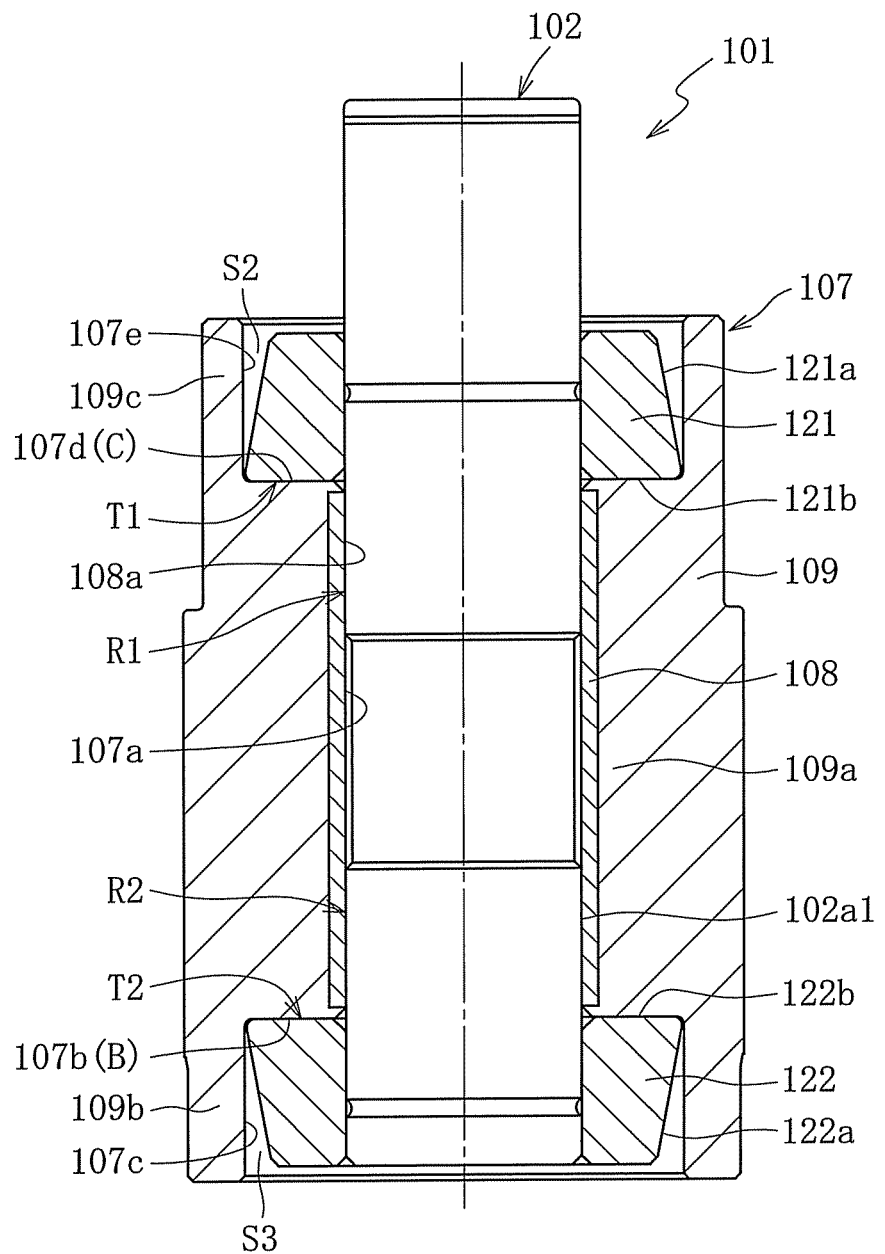
FIG. 18 is a cross-sectional view which shows the fourth constitutional example of the hydrodynamic bearing device.
Figure 19A:
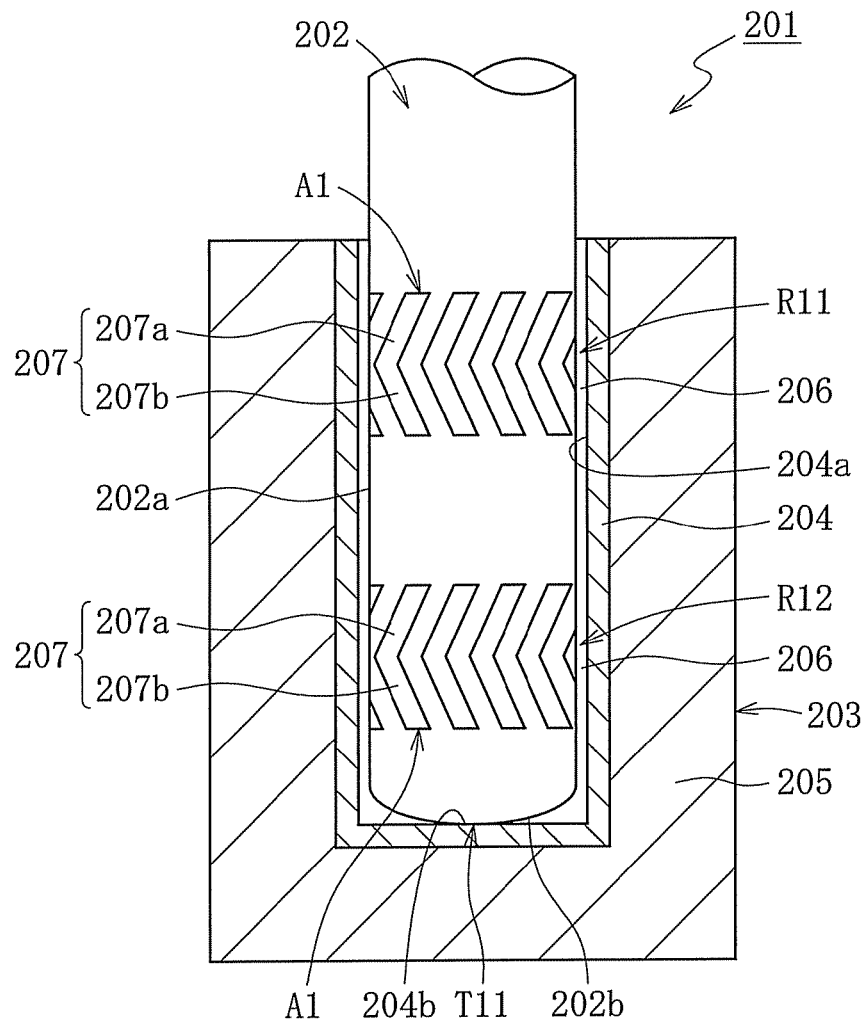
FIG. 19A is a cross-sectional view of the fluid dynamic bearing device according to the third embodiment of the present invention.
Figure 19B:
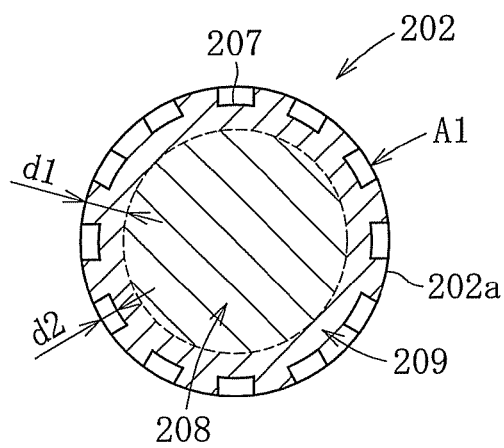
FIG. 19B is a cross-sectional view of the shaft member.
Figure 20:
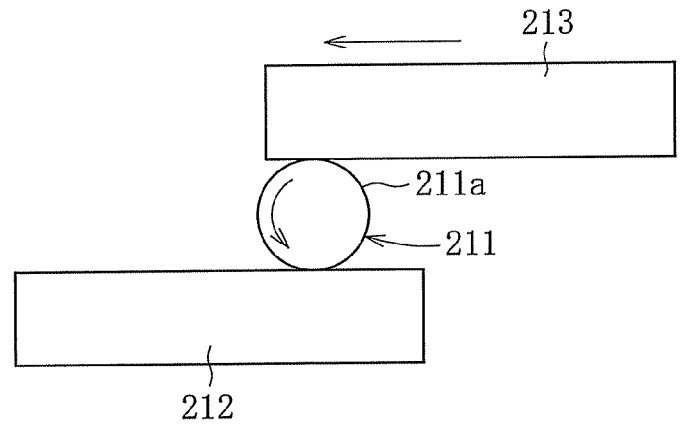
FIG. 20 is a drawing which conceptionally shows the step of forming recesses by rolling on the shaft member.
Figure 21A:
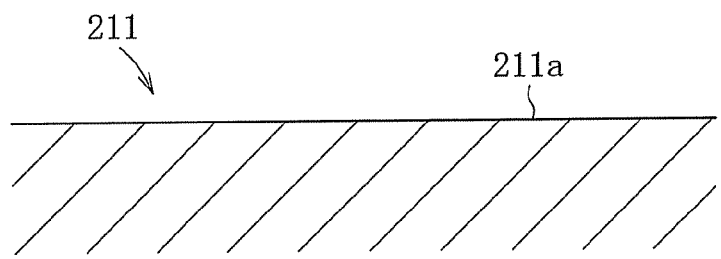
FIG. 21A is a cross-sectional view which shows the vicinity of the surface layer drawing of the shaft member before rolling is conducted.
Figure 21B:
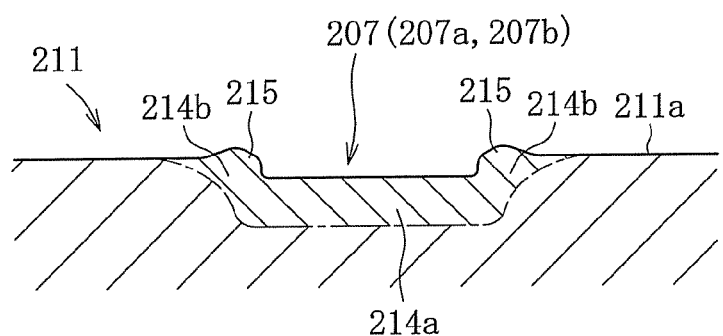
FIG. 21B is a cross-sectional view which shows the vicinity the surface layer of the shaft member after rolling is conducted.
Figure 21C:
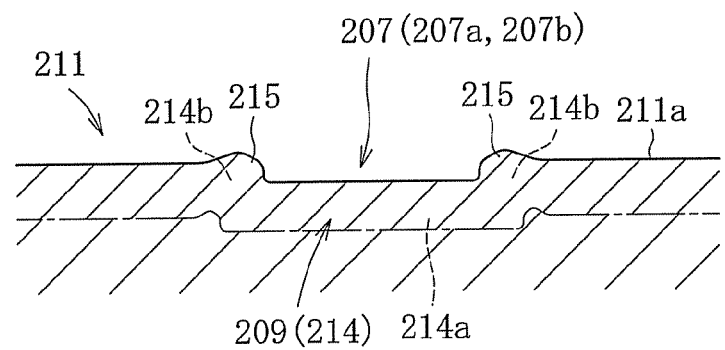
FIG. 21C is a cross-sectional view which shows the vicinity of the surface layer of the shaft member after the nitriding process.
Figure 22:
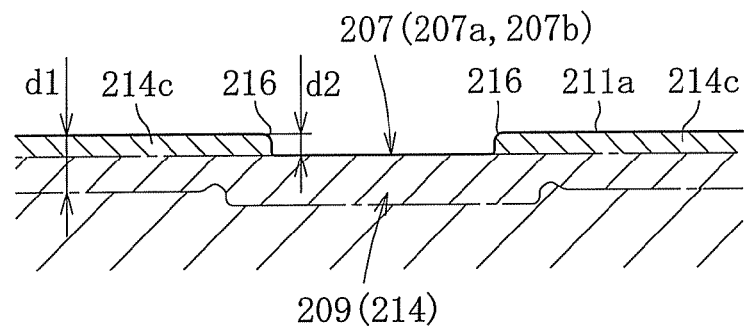
FIG. 22 is a cross-sectional view which shows the vicinity of the surface layer of the shaft member after the barrel processing is conducted.
Figure 23:
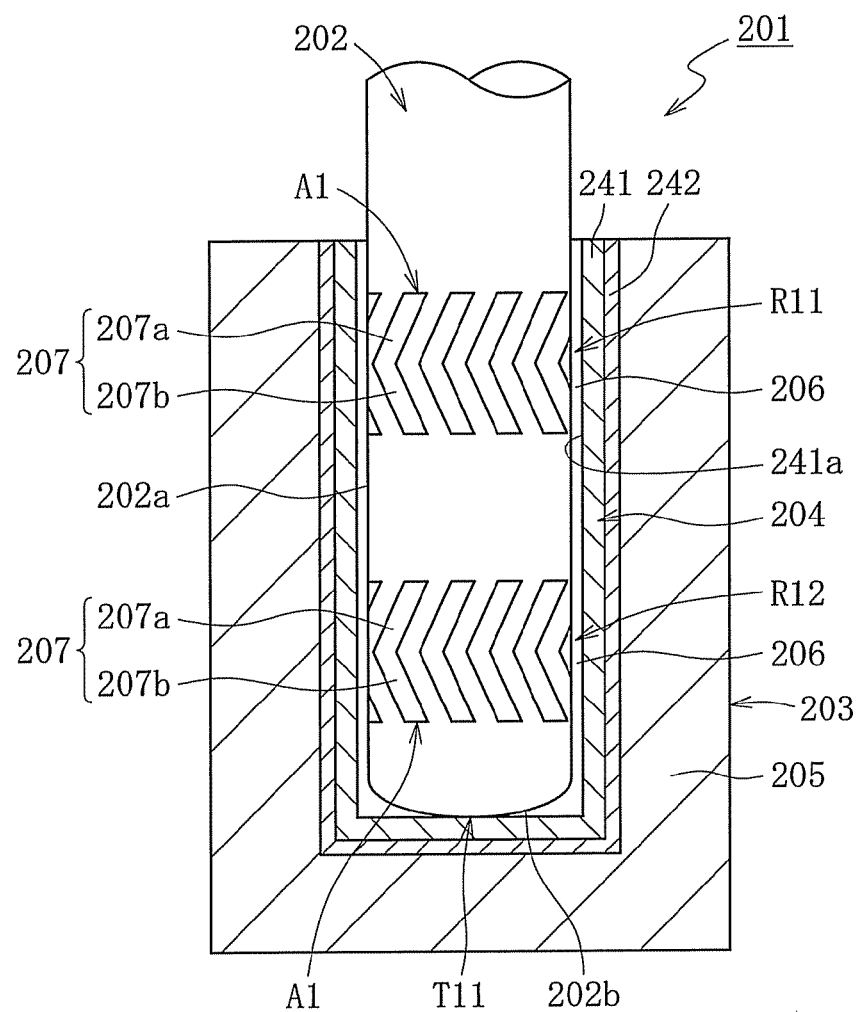
FIG. 23 is a cross-sectional view which shows the second constitutional example of the fluid dynamic bearing device.
Figure 24:
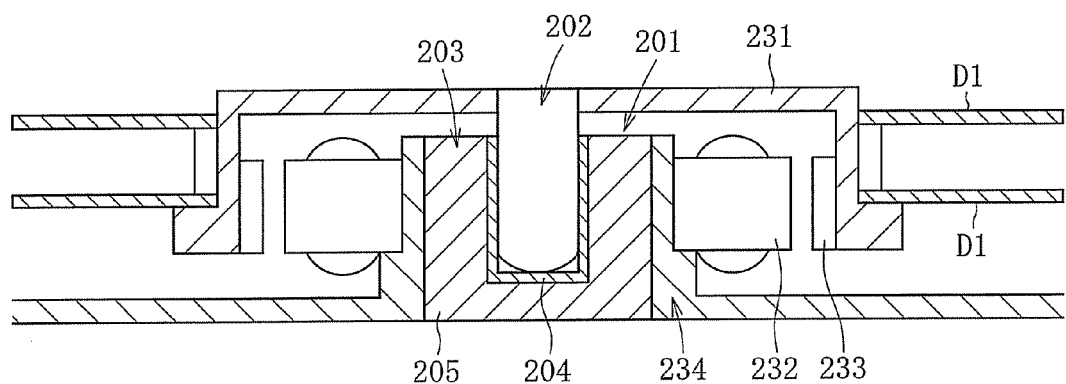
FIG. 24 is a cross-sectional view showing a constitutional example of a spindle motor having the fluid dynamic bearing device integrated therein.
Figure 25:
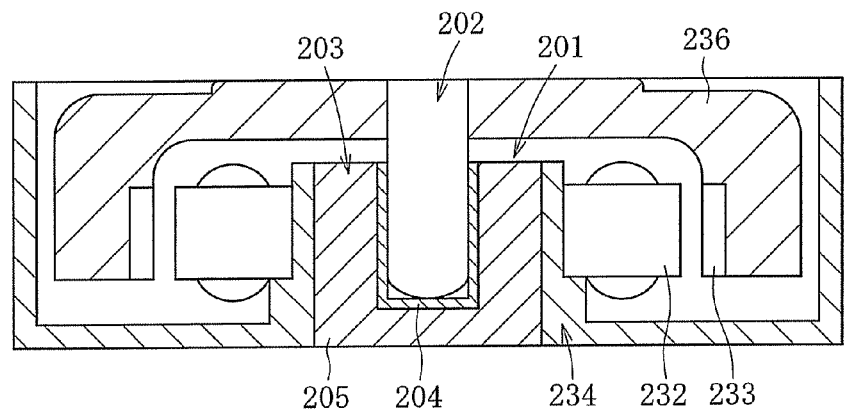
FIG. 25 is a cross-sectional view showing a constitutional example of a fan motor having the fluid dynamic bearing device integrated therein.
Figure 26A:
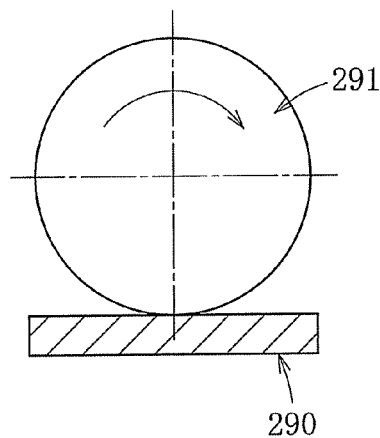
FIG. 26A is a cross-sectional view which briefly shows, the summary of the abrasion test.
Figure 26B:
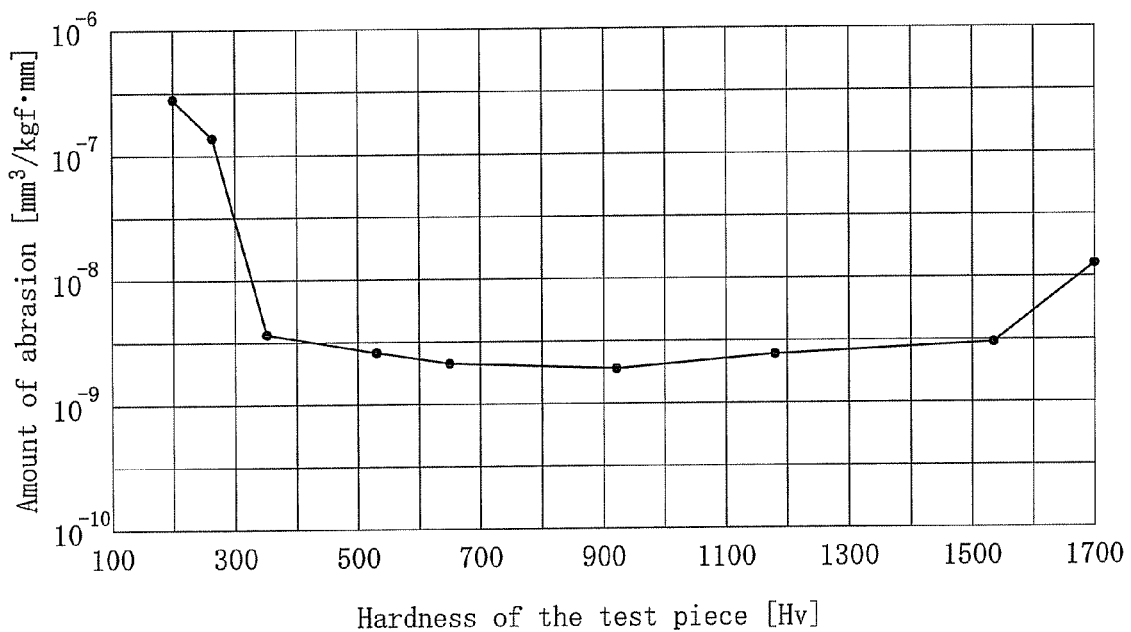
FIG. 26B is a drawing which shows the results of the abrasion test.
Figure 27:
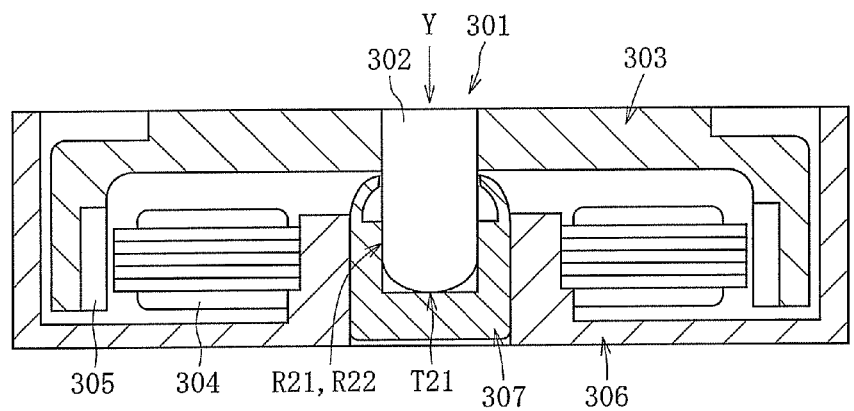
FIG. 27 is a cross-sectional view of a fan motor having the fluid dynamic bearing device integrated therein according to the fourth embodiment of the present invention.
Figure 28:
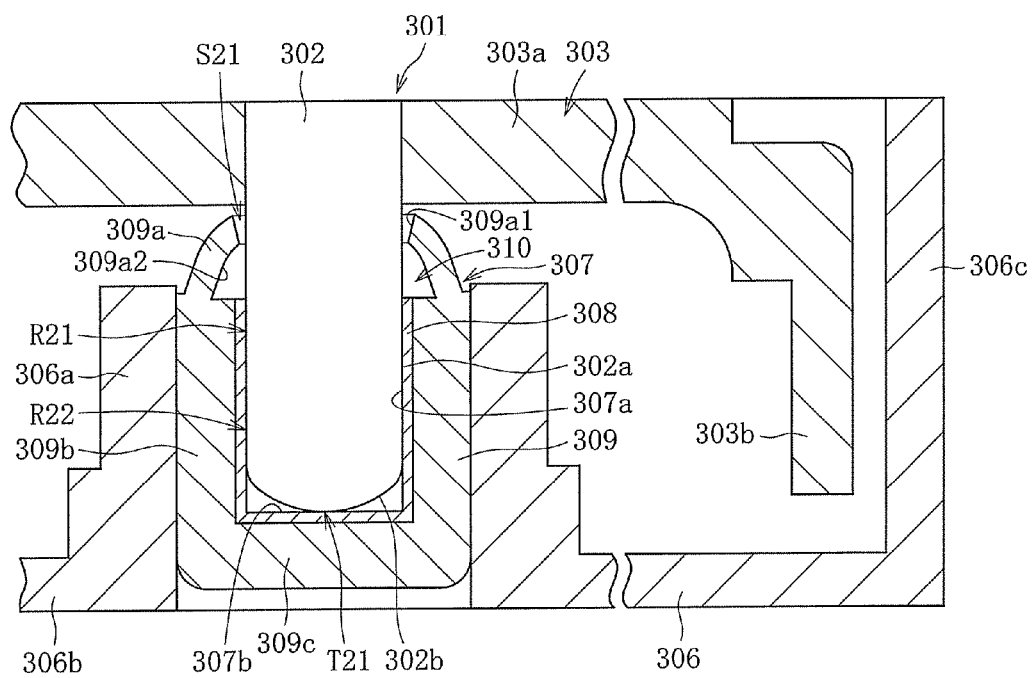
FIG. 28 is an expanded sectional view of the relevant part of the fluid dynamic bearing device.
Figure 31:
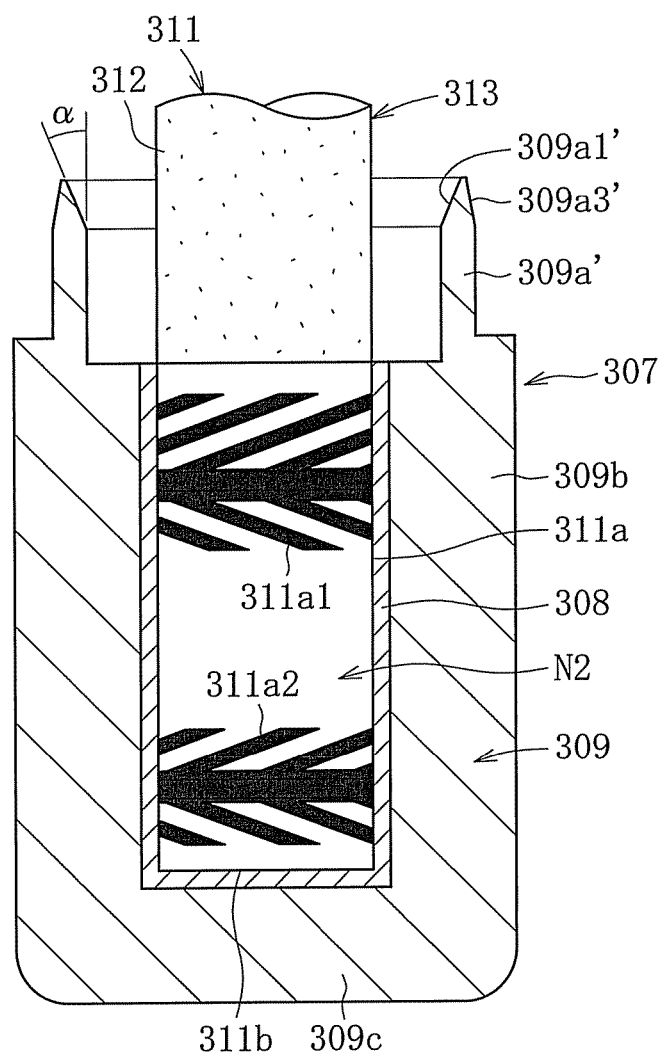
FIG. 31 is a cross-sectional view of the bearing member immediately after the insert molding.
Figure 32A:
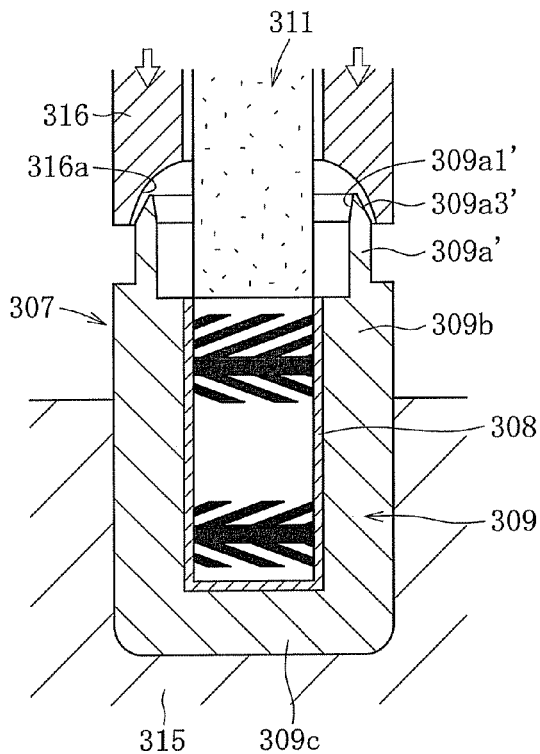
FIGS. 32A to 32C are all schematic diagrams which show the molding step of the protrusions.
Figure 32B:
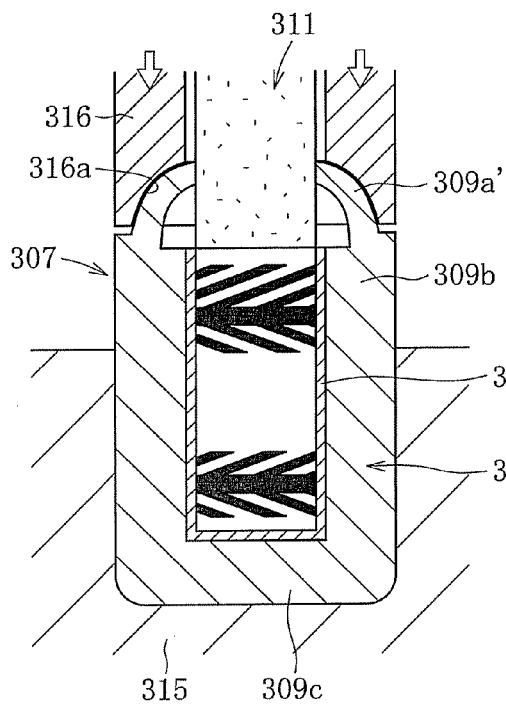
Figure 32C:
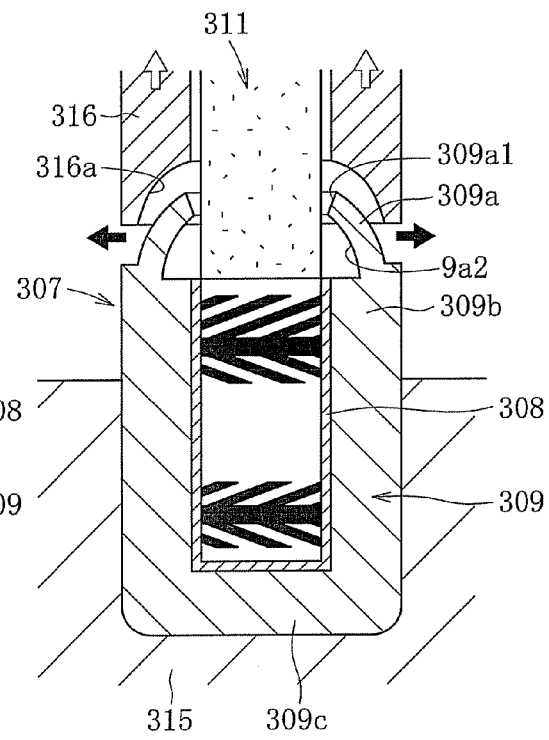
Figure 33:
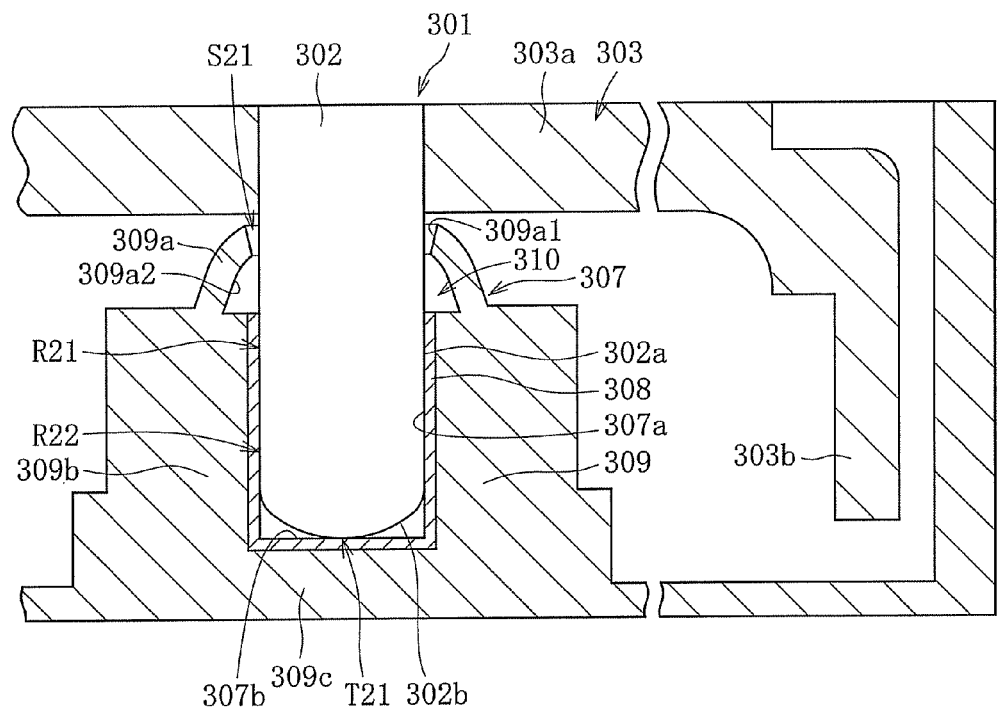
FIG. 33 is a cross-sectional view which shows the second constitutional example of the fluid dynamic bearing device.
Figure 34:
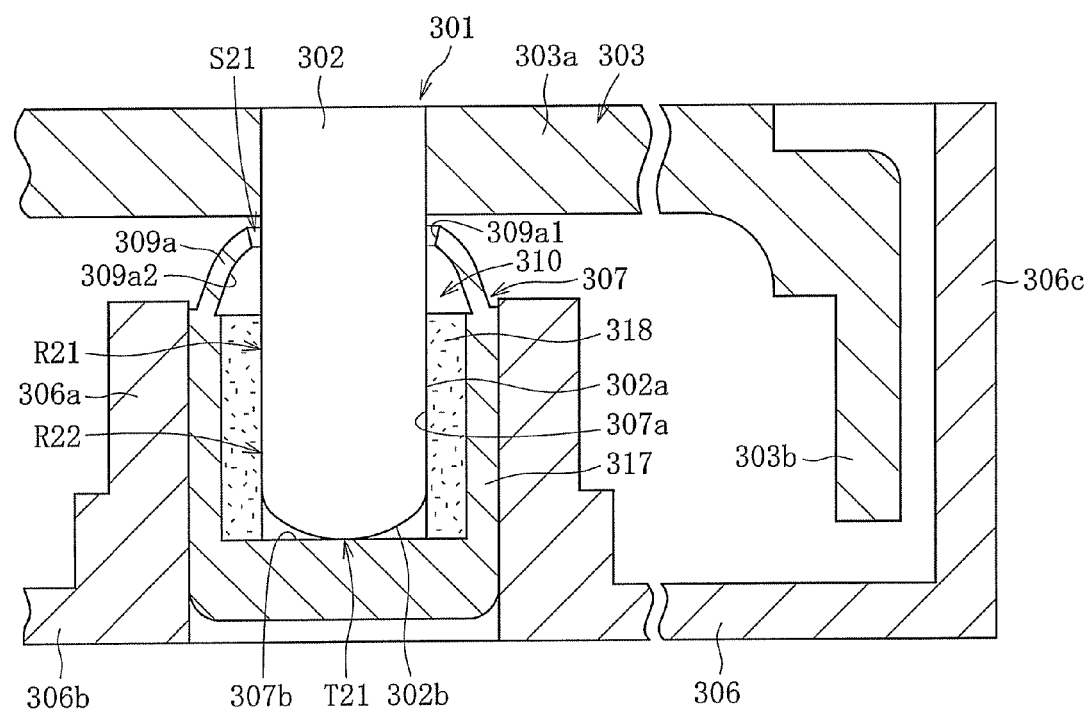
FIG. 34 is a cross-sectional view which shows the third constitutional example of the fluid dynamic bearing device.
Figure 35:
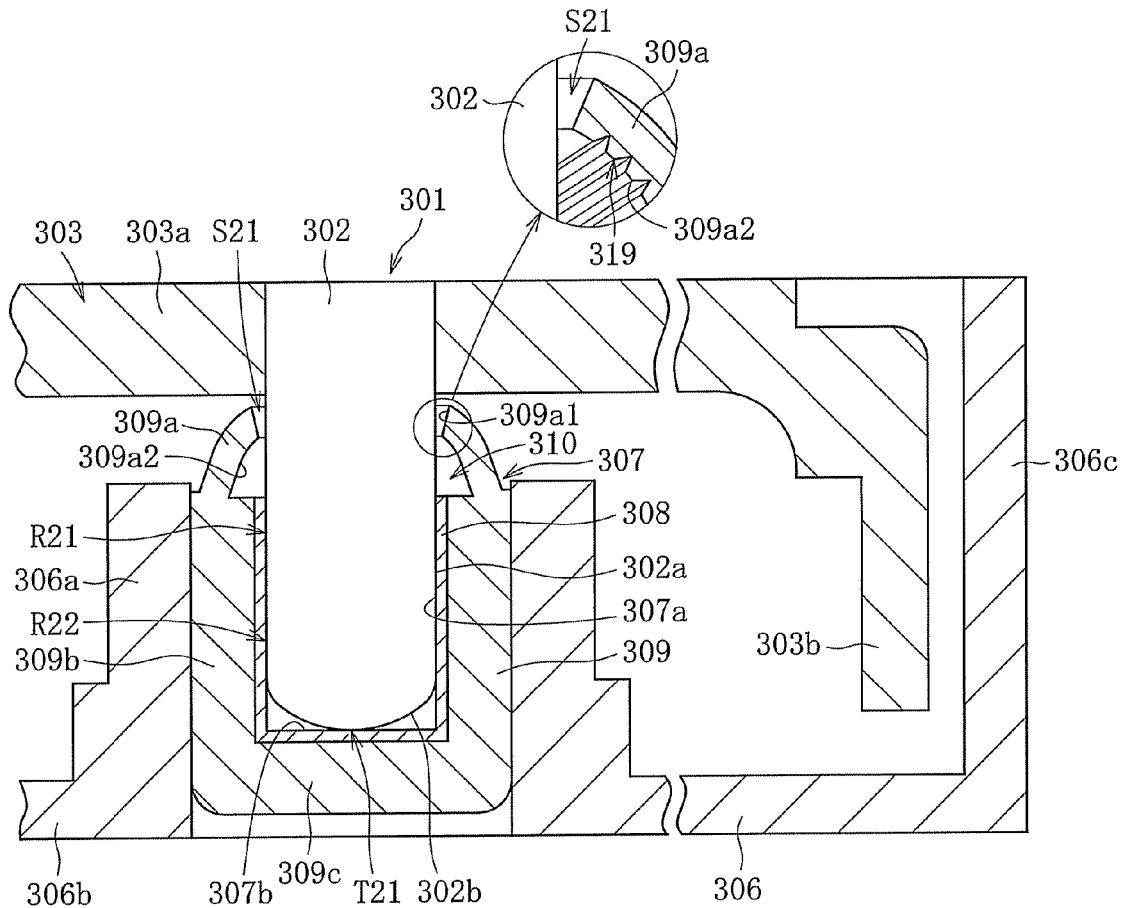
FIG. 35 is a cross-sectional view which shows the fourth constitutional example of the fluid dynamic bearing device.
Figure 36:
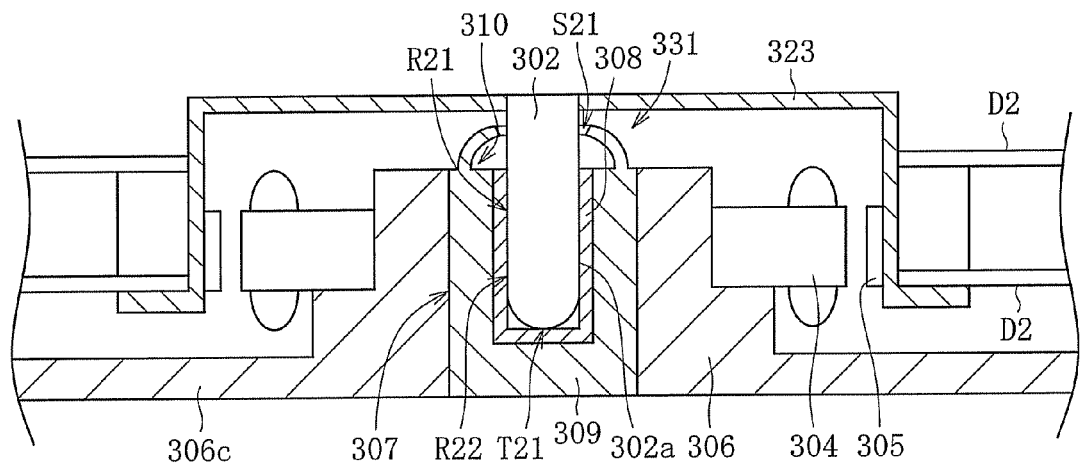
FIG. 36 is a cross-sectional view showing a constitutional example of a spindle motor having the fluid dynamic bearing device integrated therein.
Figure 37:
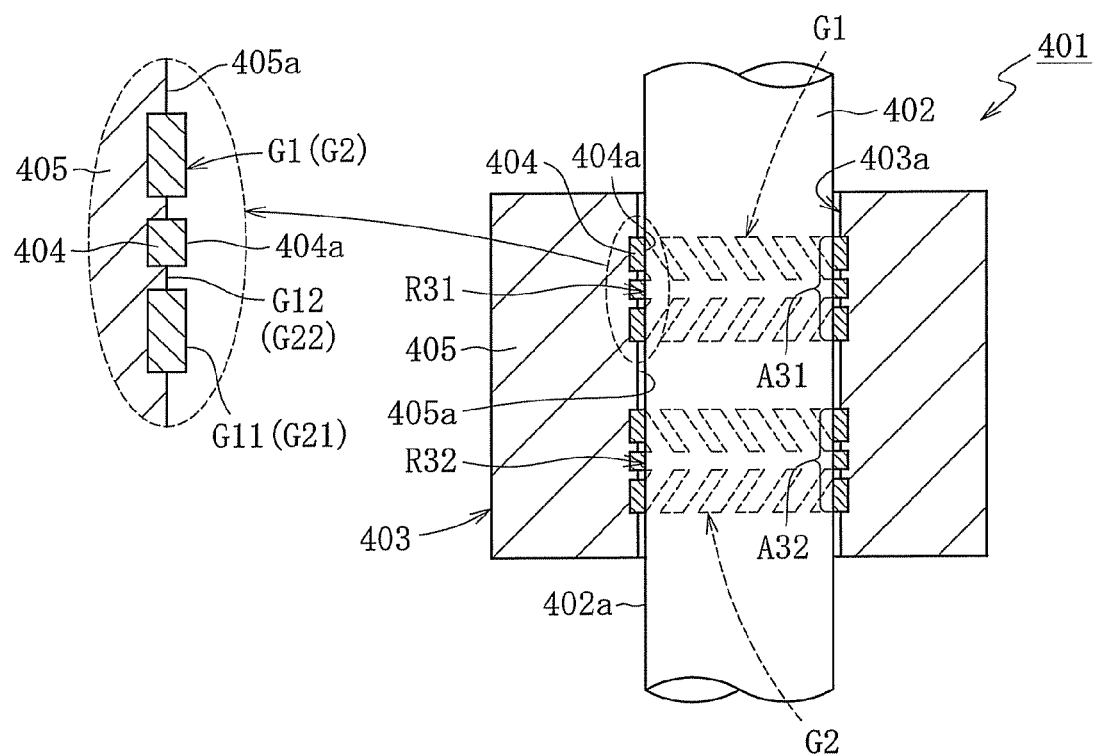
FIG. 37 is a cross-sectional view of the hydrodynamic bearing device according to the fifth embodiment of the present invention.
Figure 38:
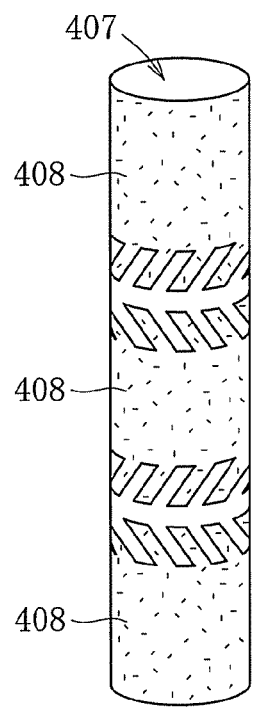
FIG. 38 is a perspective view of the master shaft subjected to the masking.
Figure 39:
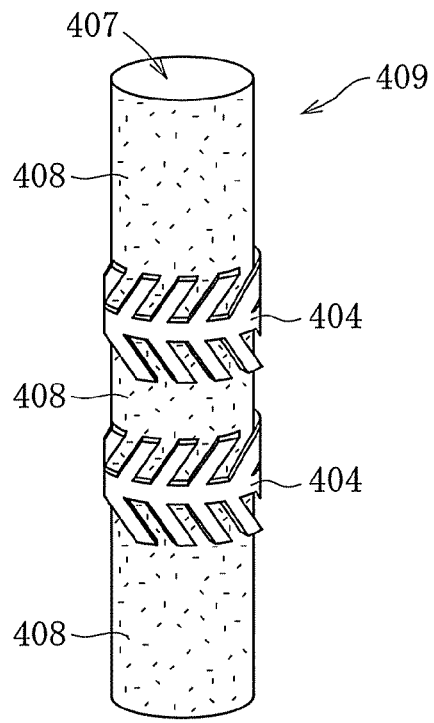
FIG. 39 is a perspective view of the electroformed shaft.
Figure 40:
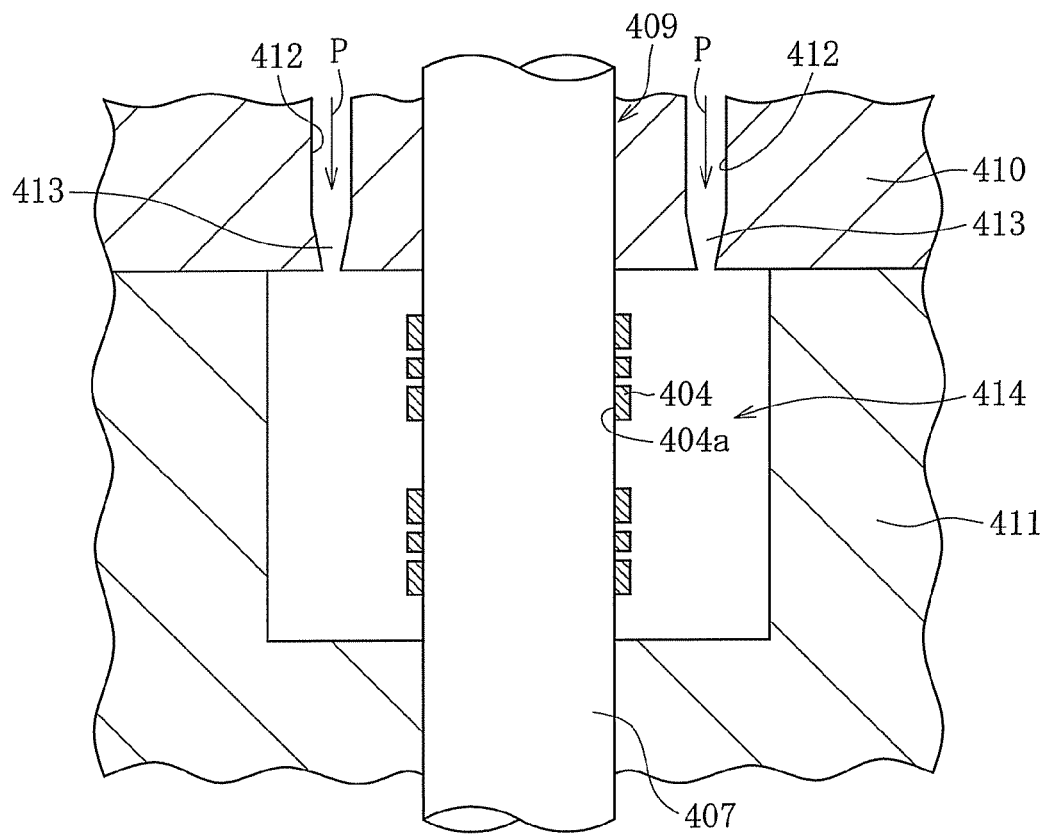
FIG. 40 is a cross-sectional view which conceptionally shows the injection molding step.
Figure 41:
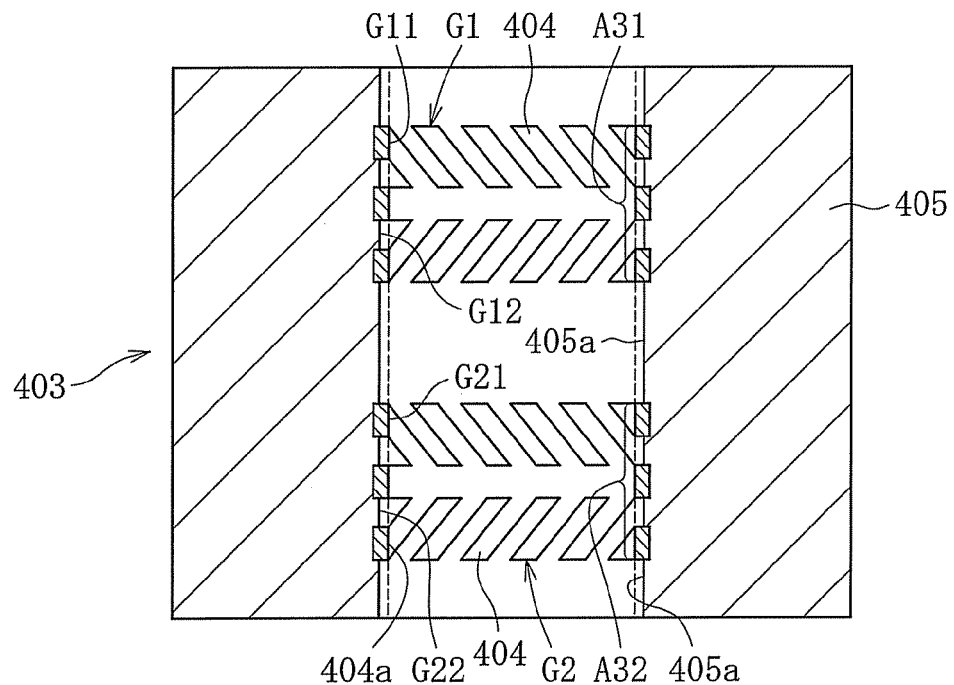
FIG. 41 is a cross-sectional view of the bearing.
Figure 42:
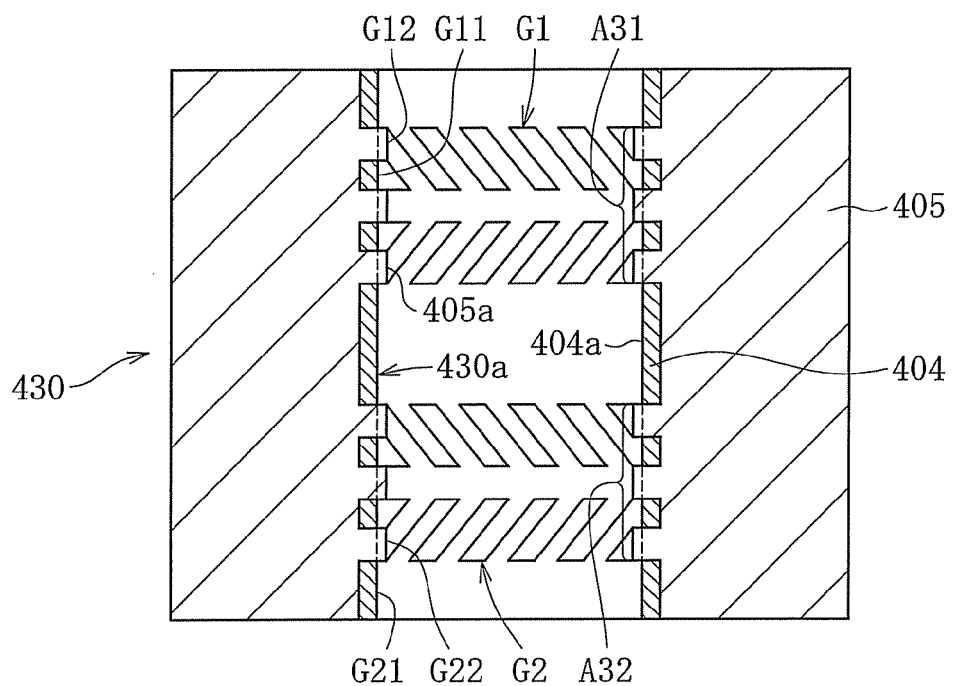
FIG. 42 is a cross-sectional view of the bearing of another constitution.
Figure 43:
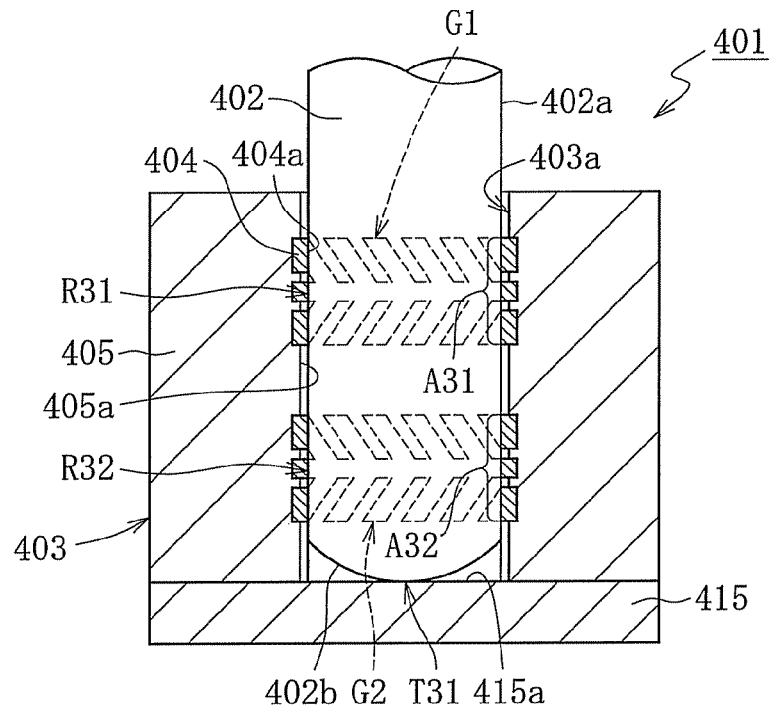
FIG. 43 is a cross-sectional view which shows the second constitutional example of the hydrodynamic bearing device.
Figure 44:
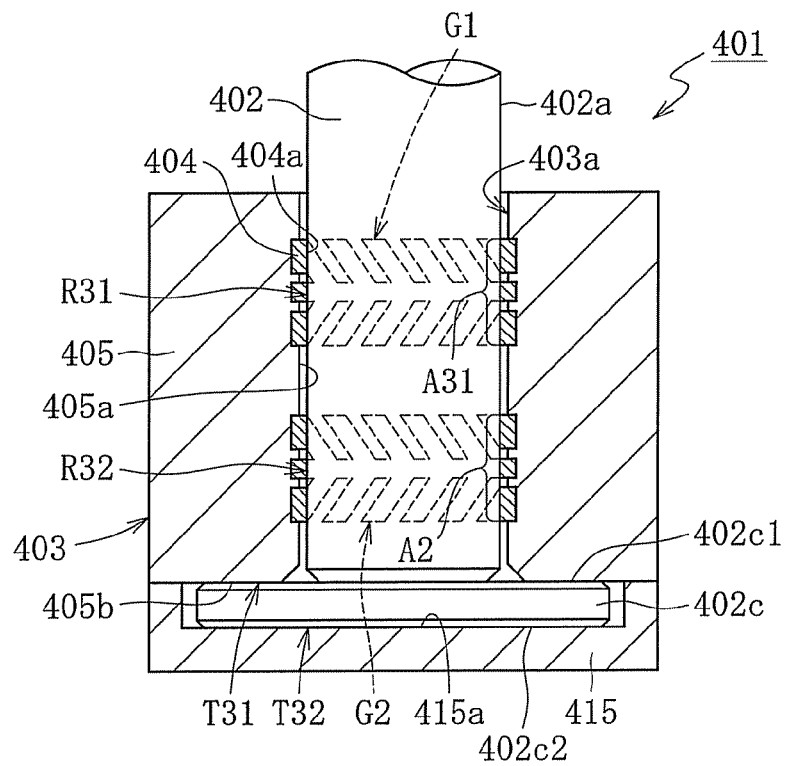
FIG. 44 is a cross-sectional view which shows the third constitutional example of the hydrodynamic bearing device.
Figure 45:
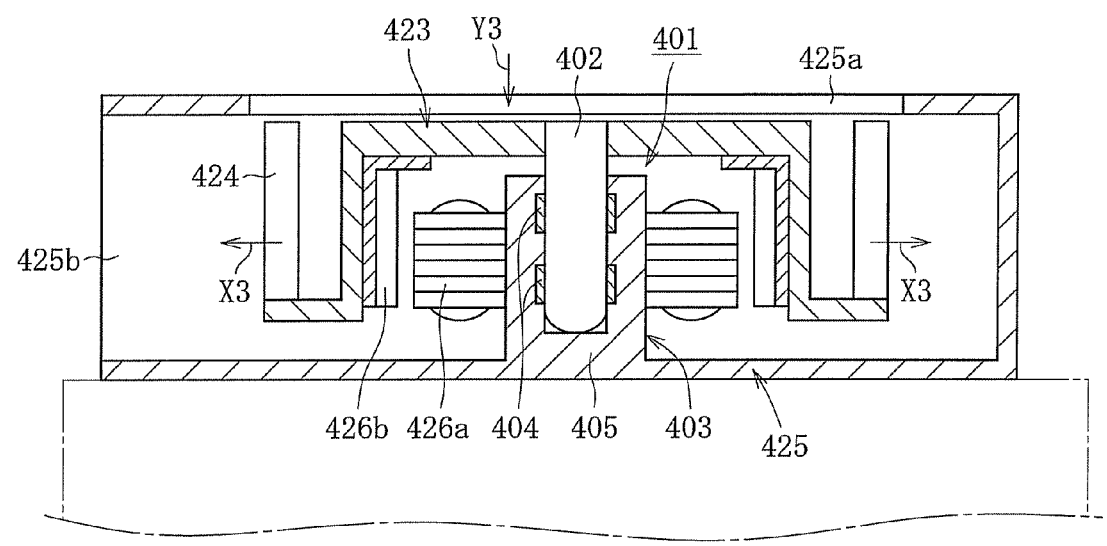
FIG. 45 is a cross-sectional view showing a constitutional example of a fan motor having the hydrodynamic bearing device integrated therein.
Figure 46:
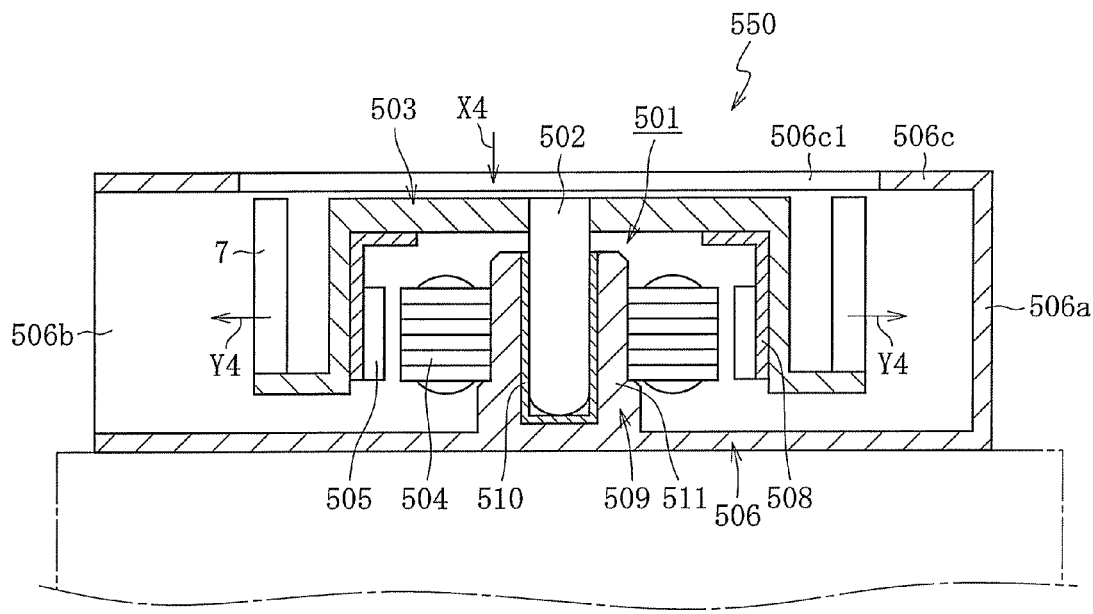
FIG. 46 is a cross-sectional view of a fan motor having the hydrodynamic bearing device integrated therein according to the sixth embodiment of the present invention.
Figure 47:
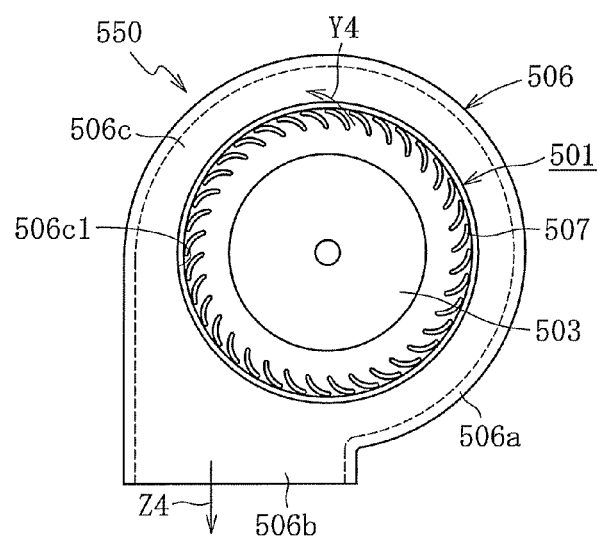
FIG. 47 is a plan view of the fan motor.
Figure 48:
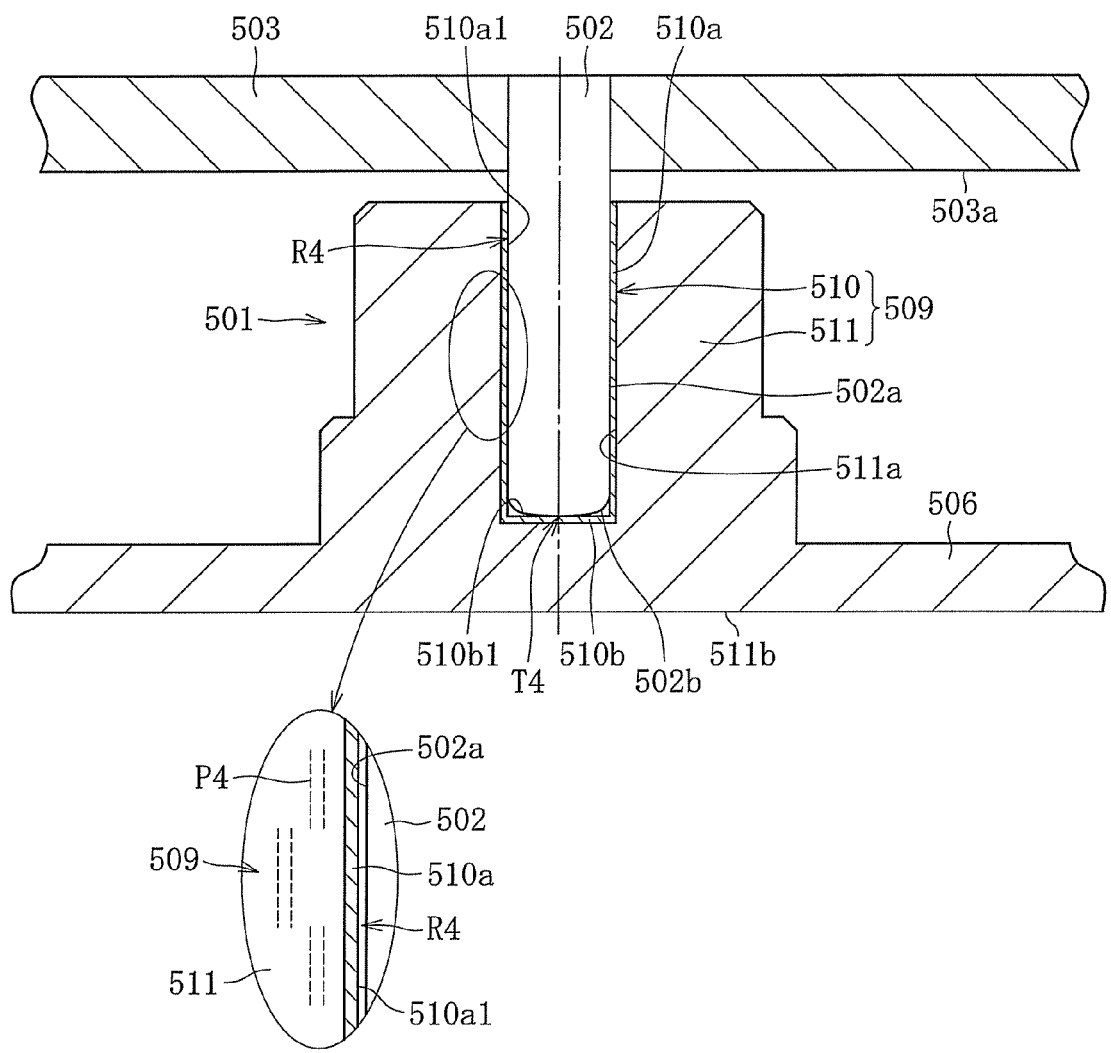
FIG. 48 is a cross-sectional view of the hydrodynamic bearing device comprising the shaft.
Figure 49:
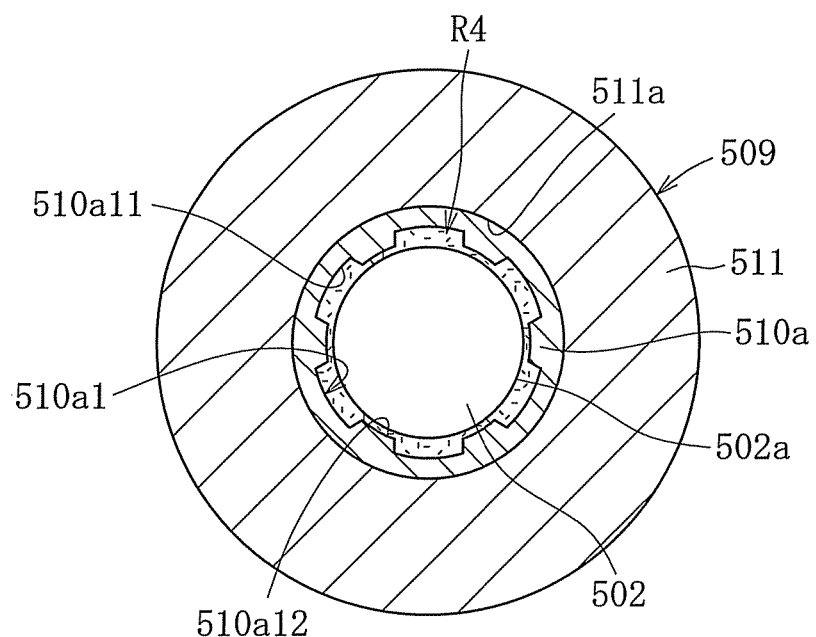
FIG. 49 is a cross-sectional view of the hydrodynamic bearing device viewed perpendicularly to the shaft.
Figure 50:
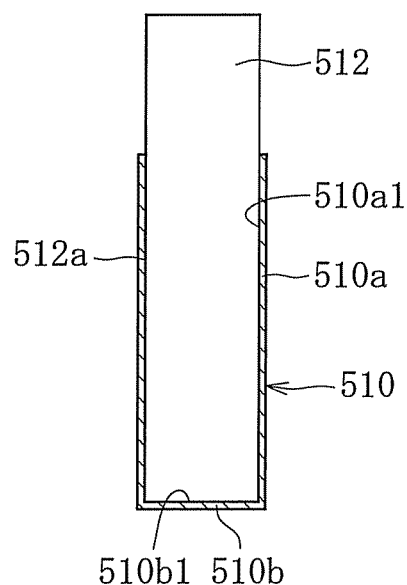
FIG. 50 is a cross-sectional view of the master shaft and metal part.
Figure 51:
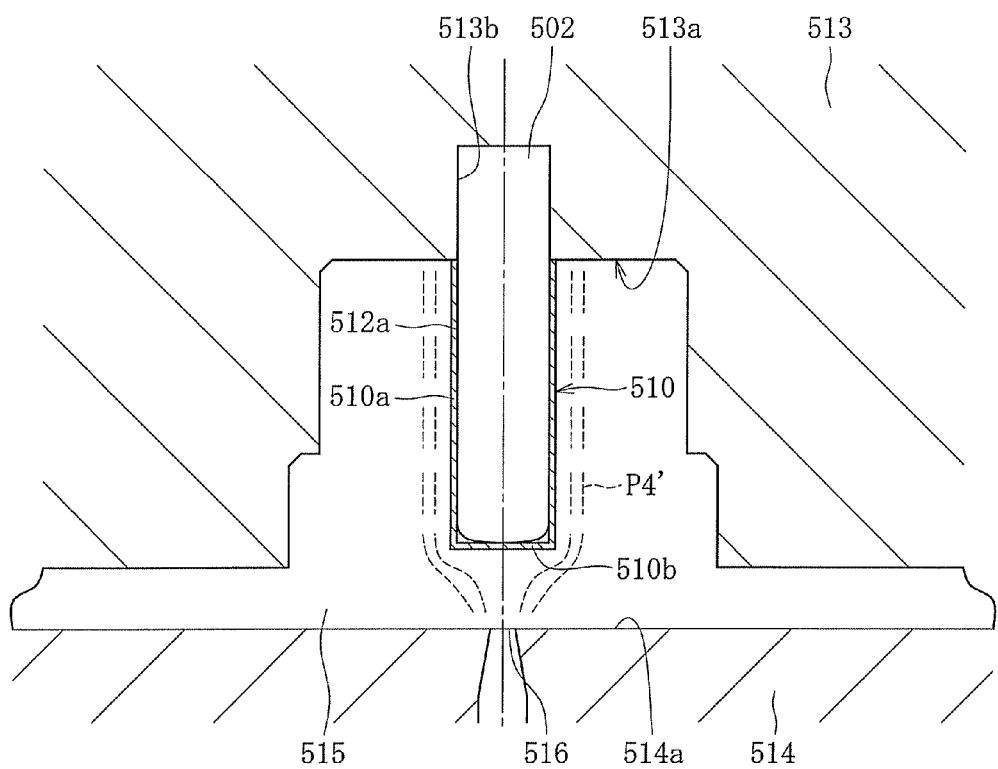
FIG. 51 is a cross-sectional view of the molds for forming the resin portion.
Figure 52:
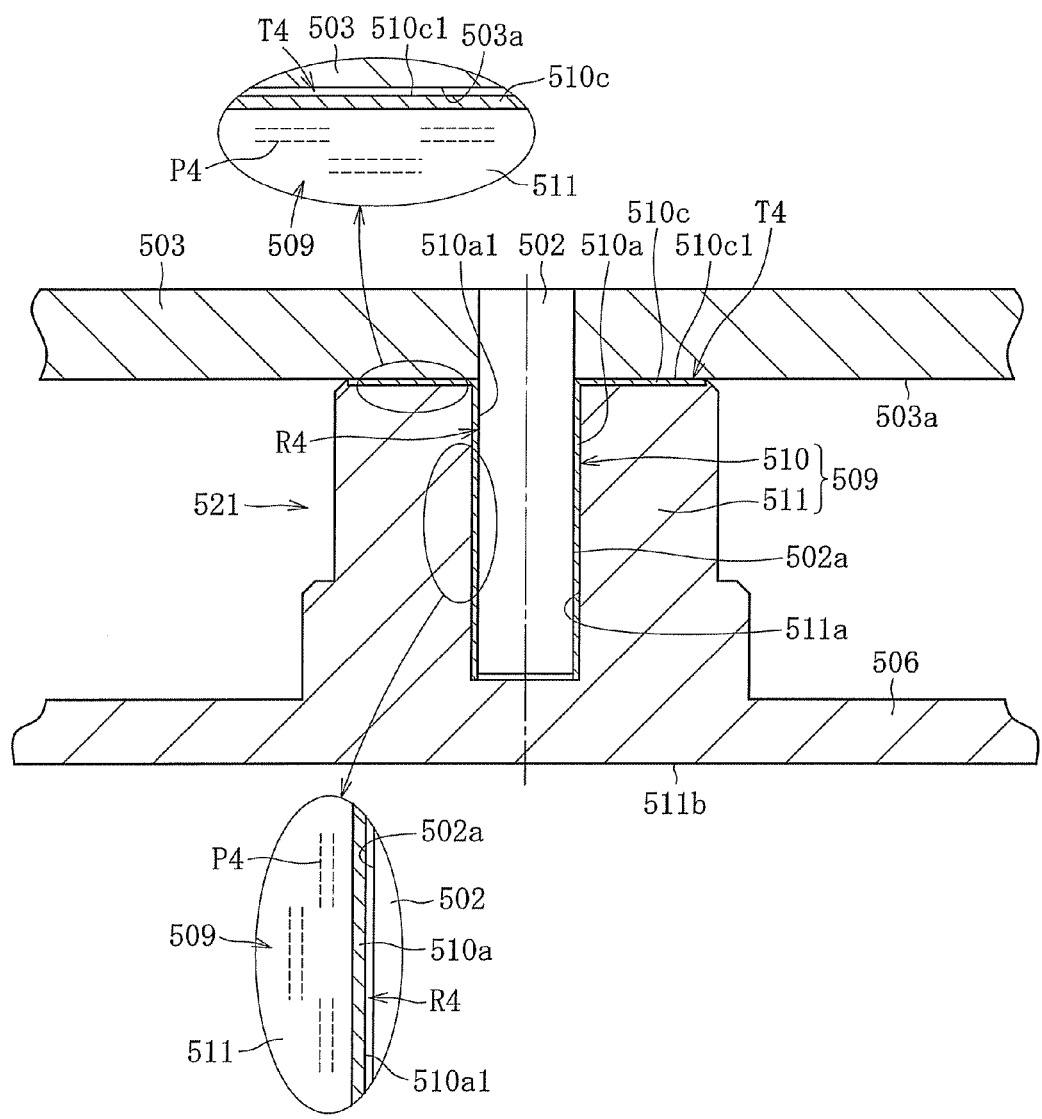
FIG. 52 is a cross-sectional view which shows the second constitutional example of the hydrodynamic bearing device.
Figure 53:
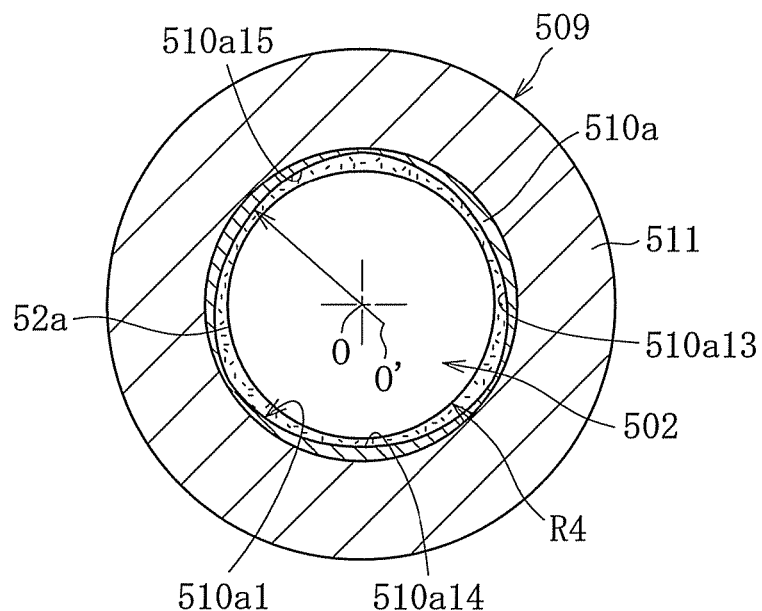
FIG. 53 is a cross-sectional view which shows another constitution of another radial bearing face.
Figure 54:
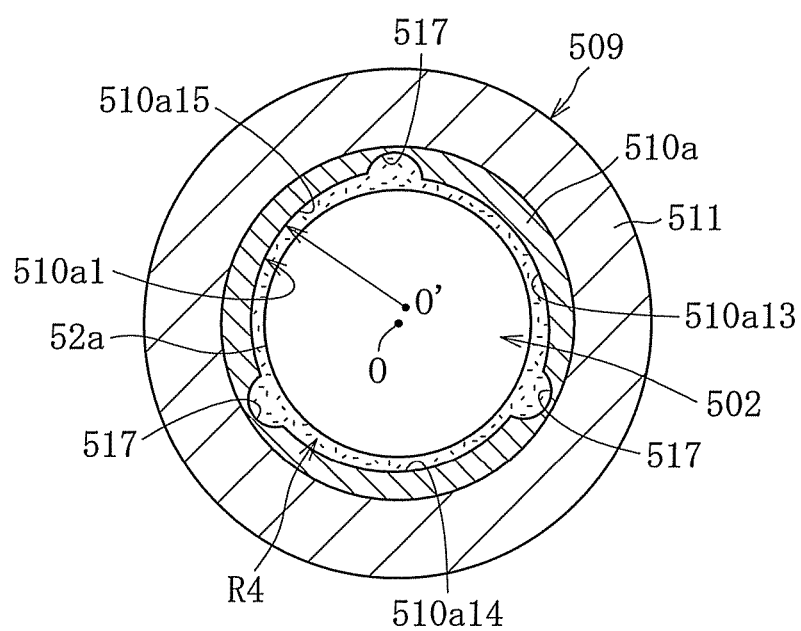
FIG. 54 is a cross-sectional view which shows another constitution of the radial bearing face of another example.
Figure 55:
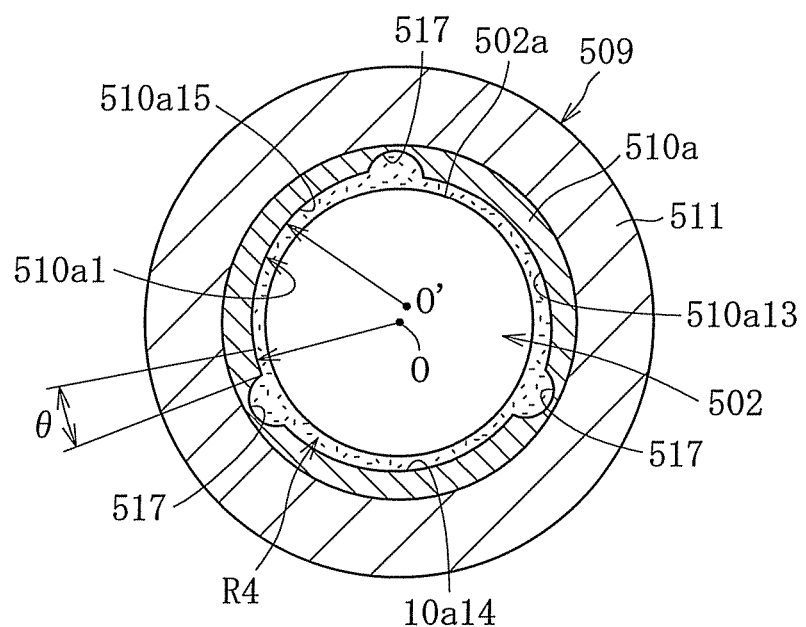
FIG. 55 is a cross-sectional view which shows another constitution of the radial bearing face of another example.

1 Fluid dynamic bearing device
2 Shaft
9 Bearing member
11 Electroformed part
11*a* Outer circumferential surface
12 Resin portion
21 Master
R Radial bearing portion
101 Hydrodynamic bearing device
107 Bearing member
108 Electroformed part
109 Retainer
113, 123 Master member
R1, R2 Radial bearing portion
T1, T2 Thrust bearing portion
201 Fluid dynamic bearing device
203 Bearing member
204 Electroformed part
206 Radial bearing gap
207 Recess
209 Surface layer portion
211 Shaft material
212, 213 Rolling die
214 Nitriding layer
d1 Thickness of surface layer portion in region which demarcates the recesses
d2 Depth of recess
R11, R12 Radial bearing portion
301, 331 Fluid dynamic bearing device
308 Electroformed part
309 Resin portion
309*a'* Cylindrical portion
310 Lubricant reservoir
319 Spiral groove
S21 Sealing gap
401 Hydrodynamic bearing device
404 Metal part
405 Resin portion
407 Master shaft
409 Electroformed shaft
G1, G2 Hydrodynamic pressure producing part
G11, G21 First region
G12, G22 Second region
R31, R32 Radial bearing portion
501 Hydrodynamic bearing device
509 Bearing member
510 Metal part
511 Resin portion
512 Master shaft
515 Cavity
516 Gate
550 Fan motor
P4 Molten resin
R4 Radial bearing portion

The invention claimed is:

1. A fluid dynamic bearing device, comprising:
a fixed member having a bearing member,
a rotational member having a shaft member which is inserted at an inner periphery of the bearing member and comprises a shaft and a flange portion, and
a radial bearing gap formed between the bearing member and the shaft member, the rotational member being supported by a film of a fluid formed in the bearing gap, wherein
the bearing member is an injection-molded article having an electroformed part as a metal plated portion and a retainer which retains the electroformed part and is formed by the injection-molding integrally with the electroformed part, the electroformed part has a first axial end surface and a second axial end surface orthogonal to a central axis of the electroformed part, the retainer has an adherence face at an inner periphery of the retainer, a first engaging portion, and a second engaging portion,
the adherence face adheres to an outer circumferential surface of the electroformed part,
the first engaging portion extends inwardly from the adherence face and engages the first axial end surface of the electroformed part,
the second engaging portion extends inwardly from the adherence face and engages the second axial end surface of the electroformed part, and
the bearing member having a small-diameter inner circumferential surface which forms the radial bearing gap between the small-diameter inner circumferential surface and an outer circumferential surface of the shaft, a large-diameter inner circumferential surface positioned on an outer diameter side of the flange portion, and an attachment surface attachable to a base member,
the small-diameter inner circumferential surface is constituted by an inner circumferential surface of the electroformed part,
the large-diameter inner circumferential surface is constituted by an inner circumferential surface of the retainer, the inner circumference surface of the retainer is provided on a position different from the adherence face in the axial direction of the retainer,
the attachment surface is formed on an outer circumferential surface of the fluid dynamic bearing device, and the outer circumferential surface of the fluid dynamic bearing device is constituted by an outer circumferential surface of the retainer.

2. A fluid dynamic bearing device according to claim 1, wherein the bearing member further has a first end face provided between the small-diameter inner circumferential surface and the large-diameter inner circumferential surface and forming a stepped portion between the small-diameter and the large-diameter inner circumferential surface.

3. A fluid dynamic bearing device according to claim 2, wherein a through hole in the axial direction, with respect to the bearing member, which has an opening at the first end face is provided on the bearing member.

4. A fluid dynamic bearing device according to claim 2, wherein the device has a thrust hydrodynamic pressure producing part which produces pressure by the hydrodynamic effect of the fluid in a thrust bearing gap between the first end face of the bearing member and one end face of the flange portion.

5. A motor comprising a fluid dynamic bearing device according to claim 1.

* * * * *